US007914374B2

(12) United States Patent
Walker et al.

(10) Patent No.: US 7,914,374 B2

(45) **Date of Patent: *Mar. 29, 2011**

(54) BUDGET-DEFINED FLAT RATE PLAY CONTRACT PARAMETERS

(75) Inventors: Jay S. Walker, Ridgefield, CT (US); James A. Jorasch, New York, NY (US); Robert C. Tedesco, Fairfield, CT (US)

(73) Assignee: Walker Digital, LLC, Stamford, CT (US)

( * ) Notice: Subject to any disclaimer, the term of this patent is extended or adjusted under 35 U.S.C. 154(b) by 156 days.

This patent is subject to a terminal disclaimer.

(21) Appl. No.: 11/423,492

(22) Filed: Jun. 12, 2006

(65) Prior Publication Data

US 2006/0229127 A1 Oct. 12, 2006

Related U.S. Application Data

(63) Continuation of application No. 11/273,170, filed on Nov. 14, 2005, now abandoned.

(60) Provisional application No. 60/627,670, filed on Nov. 12, 2004.

(51) Int. Cl.
*A63F 13/00* (2006.01)

(52) U.S. Cl. ................. 463/25; 463/20; 463/29; 463/42

(58) Field of Classification Search .................... 463/20, 463/25, 29, 42

See application file for complete search history.

(56) References Cited

U.S. PATENT DOCUMENTS

| | | | | |
|---|---|---|---|---|
| 3,810,627 | A | 5/1974 | Levy | |
| 4,150,827 | A | 4/1979 | Barnett | |
| 4,363,485 | A | 12/1982 | Edwall | |
| 4,467,424 | A | 8/1984 | Hedges et al. | 364/412 |
| 4,593,904 | A | 6/1986 | Graves | 463/9 |
| 4,636,951 | A | 1/1987 | Harlick | 364/412 |
| 4,669,731 | A | 6/1987 | Clarke | 273/143 R |
| 4,764,666 | A | 8/1988 | Bergeron | 235/380 |
| 4,880,237 | A | 11/1989 | Kishishita | 273/138 A |
| 4,991,848 | A | 2/1991 | Greenwood et al. | 273/143 R |
| 5,018,737 | A | 5/1991 | Okada | |
| 5,042,809 | A | 8/1991 | Richardson | 463/18 |
| 5,069,453 | A | 12/1991 | Koza et al. | 463/17 |
| 5,079,524 | A | 1/1992 | Goldfarb et al. | |
| 5,112,050 | A | 5/1992 | Koza et al. | 463/17 |
| 5,123,649 | A | 6/1992 | Tiberio | 273/143 R |
| 5,135,224 | A | 8/1992 | Yamamoto et al. | 463/20 |

(Continued)

OTHER PUBLICATIONS

Grochowski, John, "Computers Help Players Learn Winning Strategy", Chicago Sun-Times, Jun. 30, 1995, Section: Weekend Plus, Gaming, p. 13, NC, 2pp.

(Continued)

*Primary Examiner* — David L. Lewis
*Assistant Examiner* — Omkar Deodhar
(74) *Attorney, Agent, or Firm* — Fincham Downs, LLC

(57) ABSTRACT

According to some embodiments, systems, methods, and/or articles of manufacture are associated with operating a gaming device having a flat rate play session or contract costing a flat rate price. The flat rate play session or contract spans multiple plays on the gaming device over a pre-established duration. In some embodiments, an expected cost of the flat rate play session or contract may be determined. In some embodiments, a flat rate play session or contract and/or one or more parameters thereof may be determined based upon a price (or other parameter) that a player is willing to pay for flat rate play at a gaming device.

20 Claims, 29 Drawing Sheets

U.S. PATENT DOCUMENTS

| | | | | | |
|---|---|---|---|---|---|
| 5,178,390 | A | | 1/1993 | Okada | 273/143 R |
| 5,257,179 | A | | 10/1993 | DeMar | 463/25 |
| 5,275,400 | A | | 1/1994 | Weingardt et al. | 273/85 |
| 5,287,269 | A | * | 2/1994 | Dorrough et al. | 705/17 |
| 5,290,033 | A | | 3/1994 | Bittner et al. | 463/25 |
| 5,308,065 | A | | 5/1994 | Bridgeman et al. | 463/13 |
| 5,326,104 | A | | 7/1994 | Pease et al. | 463/18 |
| 5,331,546 | A | | 7/1994 | Webber et al. | 705/6 |
| 5,356,140 | A | | 10/1994 | Dabrowski et al. | 463/12 |
| 5,377,975 | A | | 1/1995 | Clapper, Jr. | 463/16 |
| 5,401,023 | A | | 3/1995 | Wood | 273/85 |
| 5,401,024 | A | | 3/1995 | Simunek | 273/138 A |
| 5,429,361 | A | | 7/1995 | Raven et al. | 273/138 A |
| 5,457,306 | A | | 10/1995 | Lucero | |
| 5,501,455 | A | | 3/1996 | Hirata et al. | |
| 5,511,781 | A | | 4/1996 | Wood et al. | 273/85 |
| 5,531,441 | A | | 7/1996 | Dabrowski et al. | 463/12 |
| 5,536,008 | A | | 7/1996 | Clapper, Jr. | 463/16 |
| 5,542,669 | A | | 8/1996 | Charron et al. | 463/13 |
| 5,551,692 | A | | 9/1996 | Pettit et al. | 273/143 R |
| 5,569,082 | A | | 10/1996 | Kaye | 463/17 |
| 5,570,885 | A | | 11/1996 | Ornstein | 463/27 |
| 5,580,311 | A | | 12/1996 | Haste, III | 463/17 |
| 5,595,538 | A | | 1/1997 | Haste, III | 463/17 |
| 5,601,488 | A | | 2/1997 | Kadlic | 463/13 |
| 5,609,337 | A | | 3/1997 | Clapper, Jr. | 273/138.2 |
| 5,613,912 | A | | 3/1997 | Slater | 463/25 |
| 5,621,200 | A | | 4/1997 | Irwin et al. | 235/375 |
| 5,629,980 | A | | 5/1997 | Stefik et al. | |
| 5,634,012 | A | | 5/1997 | Stefik et al. | 395/239 |
| 5,638,443 | A | | 6/1997 | Stefik et al. | |
| 5,640,569 | A | * | 6/1997 | Miller et al. | 710/241 |
| 5,647,592 | A | | 7/1997 | Gerow | 273/139 |
| 5,647,798 | A | | 7/1997 | Falciglia | |
| 5,653,635 | A | | 8/1997 | Breeding | |
| 5,657,899 | A | | 8/1997 | Stoken | 463/17 |
| 5,715,403 | A | | 2/1998 | Stefik et al. | |
| 5,735,432 | A | | 4/1998 | Stoken et al. | 211/1 |
| 5,741,183 | A | | 4/1998 | Acres et al. | 463/42 |
| 5,743,800 | A | | 4/1998 | Huard et al. | |
| 5,749,784 | A | | 5/1998 | Clapper, Jr. | 463/17 |
| 5,749,785 | A | | 5/1998 | Rossides | |
| 5,758,875 | A | | 6/1998 | Giacalone, Jr. | 273/143 R |
| 5,762,552 | A | | 6/1998 | Vuong et al. | |
| 5,766,075 | A | | 6/1998 | Cook et al. | 463/25 |
| 5,768,382 | A | | 6/1998 | Schneier et al. | 380/23 |
| 5,770,533 | A | | 6/1998 | Franchi | 463/42 |
| 5,772,509 | A | | 6/1998 | Weiss | 463/16 |
| 5,800,268 | A | | 9/1998 | Molnick | 463/40 |
| 5,816,917 | A | | 10/1998 | Kelmer et al. | 463/16 |
| 5,816,918 | A | | 10/1998 | Kelly et al. | 463/16 |
| 5,830,063 | A | | 11/1998 | Byrne | |
| 5,830,067 | A | | 11/1998 | Graves et al. | 463/40 |
| 5,833,538 | A | | 11/1998 | Weiss | 463/21 |
| 5,853,325 | A | | 12/1998 | Kadlic | 463/13 |
| 5,885,158 | A | | 3/1999 | Torango et al. | |
| 5,910,048 | A | | 6/1999 | Feinberg | 463/25 |
| 5,915,588 | A | | 6/1999 | Stoken et al. | |
| 5,957,776 | A | | 9/1999 | Hochne | |
| 5,970,143 | A | | 10/1999 | Schneier et al. | 380/23 |
| 5,980,384 | A | | 11/1999 | Barrie | |
| 6,001,016 | A | | 12/1999 | Walker et al. | 463/42 |
| 6,012,983 | A | | 1/2000 | Walker et al. | 463/20 |
| 6,024,643 | A | | 2/2000 | Begis | |
| 6,033,306 | A | | 3/2000 | De Souza | 463/18 |
| 6,077,163 | A | * | 6/2000 | Walker et al. | 463/26 |
| 6,113,493 | A | | 9/2000 | Walker et al. | |
| 6,139,430 | A | | 10/2000 | Huard et al. | |
| 6,142,872 | A | | 11/2000 | Walker et al. | |
| 6,146,270 | A | | 11/2000 | Huard et al. | |
| 6,168,522 | B1 | | 1/2001 | Walker et al. | 463/25 |
| 6,193,606 | B1 | | 2/2001 | Walker et al. | 463/20 |
| 6,203,428 | B1 | | 3/2001 | Giobbi et al. | 463/16 |
| 6,203,429 | B1 | | 3/2001 | Demar et al. | |
| 6,244,957 | B1 | | 6/2001 | Walker et al. | 463/20 |
| 6,244,958 | B1 | | 6/2001 | Acres | |
| 6,254,483 | B1 | * | 7/2001 | Acres | 463/26 |
| 6,273,820 | B1 | | 8/2001 | Haste, III | |
| 6,299,533 | B1 | | 10/2001 | Parra et al. | 463/17 |
| 6,306,035 | B1 | | 10/2001 | Kelly et al. | |
| 6,306,038 | B1 | | 10/2001 | Graves | |
| 6,315,662 | B1 | | 11/2001 | Jorasch et al. | 463/20 |
| 6,318,721 | B1 | | 11/2001 | Randall et al. | |
| 6,319,125 | B1 | | 11/2001 | Acres | |
| 6,319,127 | B1 | | 11/2001 | Walker et al. | 463/26 |
| 6,331,144 | B1 | | 12/2001 | Walker et al. | 463/20 |
| 6,336,636 | B1 | | 1/2002 | Smart | |
| 6,343,989 | B1 | | 2/2002 | Wood et al. | 463/23 |
| 6,389,538 | B1 | | 5/2002 | Gruse et al. | 705/1 |
| 6,394,899 | B1 | | 5/2002 | Walker | |
| 6,402,148 | B1 | | 6/2002 | Saruwatari | 273/292 |
| 6,409,172 | B1 | | 6/2002 | Vancura | |
| 6,409,602 | B1 | | 6/2002 | Wiltshire et al. | |
| 6,508,710 | B1 | | 1/2003 | Paravia et al. | 463/42 |
| 6,527,638 | B1 | | 3/2003 | Walker et al. | 463/25 |
| 6,537,150 | B1 | | 3/2003 | Luciano et al. | |
| 6,565,434 | B1 | | 5/2003 | Acres | |
| 6,578,735 | B1 | | 6/2003 | Mothwurf | |
| 6,605,001 | B1 | | 8/2003 | Tarantino | 463/22 |
| 6,620,045 | B2 | | 9/2003 | Berman et al. | |
| 6,623,357 | B2 | | 9/2003 | Chowdhury | |
| 6,634,942 | B2 | | 10/2003 | Walker et al. | |
| 6,663,486 | B2 | | 12/2003 | D'Aurora et al. | |
| 6,695,700 | B2 | | 2/2004 | Walker et al. | |
| 6,709,331 | B2 | | 3/2004 | Berman | 463/16 |
| 6,722,983 | B2 | | 4/2004 | Kaminkow et al. | 463/26 |
| 6,726,563 | B1 | | 4/2004 | Baerlocher et al. | 463/25 |
| 6,733,389 | B2 | | 5/2004 | Webb et al. | 463/20 |
| 6,769,983 | B2 | | 8/2004 | Slomiany | 463/16 |
| 6,846,238 | B2 | | 1/2005 | Wells | 463/39 |
| 6,896,616 | B2 | | 5/2005 | Weiss | |
| 6,916,245 | B1 | | 7/2005 | Vancura | |
| 6,935,949 | B1 | | 8/2005 | Murphy | |
| 6,969,317 | B2 | | 11/2005 | Walker et al. | |
| 7,076,652 | B2 | | 7/2006 | Ginter et al. | 713/153 |
| 7,140,964 | B2 | | 11/2006 | Walker et al. | 463/25 |
| 7,156,739 | B2 | | 1/2007 | Walker et al. | 463/25 |
| 7,210,141 | B1 | | 4/2007 | Nathan et al. | |
| 7,213,005 | B2 | | 5/2007 | Mourad et | 705/64 |
| 7,526,447 | B2 | | 4/2009 | Rowe | |
| 7,740,534 | B2 | | 6/2010 | Walker et al. | |
| 2001/0009316 | A1 | | 7/2001 | Krise et al. | |
| 2001/0009317 | A1 | | 7/2001 | Sines et al. | |
| 2001/0009865 | A1 | | 7/2001 | Demar et al. | |
| 2001/0031654 | A1 | | 10/2001 | Walker et al. | |
| 2002/0014740 | A1 | | 2/2002 | Ainsworth | |
| 2002/0058542 | A1 | | 5/2002 | Roethel et al. | 463/13 |
| 2002/0112171 | A1 | | 8/2002 | Ginter et al. | |
| 2002/0125641 | A1 | | 9/2002 | Moody | 273/292 |
| 2002/0132660 | A1 | | 9/2002 | Taylor | 463/16 |
| 2002/0147040 | A1 | | 10/2002 | Walker et al. | 463/25 |
| 2002/0188576 | A1 | | 12/2002 | Peterson et al. | 705/400 |
| 2003/0092477 | A1 | | 5/2003 | Luciano et al. | |
| 2003/0144053 | A1 | | 7/2003 | Michaelson | 463/25 |
| 2003/0162586 | A1 | | 8/2003 | Ikeya et al. | |
| 2003/0224854 | A1 | | 12/2003 | Joao | 463/40 |
| 2003/0232651 | A1 | | 12/2003 | Huard et al. | |
| 2004/0102238 | A1 | | 5/2004 | Taylor | 463/16 |
| 2004/0147308 | A1 | | 7/2004 | Walker et al. | 463/25 |
| 2005/0059452 | A1 | | 3/2005 | Harti | 463/13 |
| 2005/0181854 | A1 | | 8/2005 | Moshal | |
| 2005/0192087 | A1 | | 9/2005 | Friedman et al. | |
| 2006/0025207 | A1 | | 2/2006 | Walker et al. | |

OTHER PUBLICATIONS

Pledger, Marcia, "Going for the gold at slot tournaments", Las Vegas Review-Journal, Dec. 24, 1995, p. 5, 4pp.

Hawley, David, "Those one armed bandits; Slot-machine tournaments lure throngs to Midwest casinos", The Houston Chronicle, Apr. 9, 1996, Section: Houston, p. 3, 3pp.

Grochowski, John, "Slot tourney prospers under Indiana rules", Chicago Sun-Times, Apr. 6, 1997, Section: SHO, Casinos, p. 15, NC, 1pg.

"Station Announces formation of GameCast Live, LLC and Release of Remote Play eSlots for In-Room Gaming Applications", PR Newswire, Jun. 6, 2001, Financial News Section, 2pp.

Website, "Extending the Casino Floor", GameCast Live, (http //www gamecastlive com/presentation/toronto_files/slide0012 htm), download date: Jun. 6, 2001, 12pp.
U.S. Examiner's Office Action for U.S. Appl. No. 11/423,486, dated Mar. 5, 2008, 10 pp.
U.S. Examiner's Office Action for U.S. Appl. No. 11/456,726, dated Jun. 6, 2008, 7 pp.
U.S. Examiner's Office Action for U.S. Appl. No. 11/456,758, dated Jun. 12, 2008, 5 pp.
U.S. Examiner's Office Action for U.S. Appl. No. 11/266,625, dated Apr. 29, 2008, 15 pp.
U.S. Examiner's Office Action for U.S. Appl. No. 11/273,368, dated May 13, 2008, 10 pp.
U.S. Examiner's Office Action for U.S. Appl. No. 11,266,875, dated May 7, 2008, 12 pp.
U.S. Examiner's Office Action for U.S. Appl. No. 11/273,170, dated Feb. 5, 2008, 8 pp.
U.S. Examiner's Office Action for U.S. Appl. No. 11/423,486, dated Sep. 5, 2007, 6 pp.
Notice of Allowance for U.S. Appl. No. 11/423,486, dated Oct. 20, 2008, 6 pp.
Ritchie, Lauren "Orange Man Sought in Betting Probe", Orlando Sentinel Tribune, May 30, 1990 at p. B2, 3pp.
Mayo, Michael, "Win-Or-Lose-Cruise, You Can Bet Sports Legally Around Here—Just Wait Till the Boat Is 3 Miles Out", Sun-Sentinel, Dec. 28, 1994 at p. 1C, 3pp.
Cave, Kathy, "The Lake Effect", Milwaukee Journal Sentinel, Mar. 27, 1996 at p. 8, 2pp.
Busch, Melanie, "Tulsa Firm Explores Internet Gaming", Tulsa World, Aug. 1, 1996, Section: Business, p. E1, 3pp.
"Electronic Bingo System", Network Gaming International Corporation, (http://network-bingo com/bingo htm), download date: Nov. 13, 1996, 5pp.
"MGAM Signs Agreement With Lac Vieux Desert Chippewa Tribe", Business Wire, May 18, 2001, 2pp.
Brochure, "Flying Bet Roulette" DEQ Casinos Ltd.., undated, 2pp.
"GameCast Live—PowerPoint Presentation", (http //www gamecastlive com/presentation/toronto2_files/frame htm), download date: Nov. 24, 2002, 12pp.
"GameCast Live—Press Release", (http //www gamecastlive com/press_junc_6 html), download date: Nov. 24, 2002, 2pp.
"Welcome — i2corp.com", (http //www i2corp com/), download date: Nov. 24, 2002, 1pg.
"Games—i2corp.com", (http //www i2corp com/games/index cfm), download date: Nov. 24, 2002, 2pp.
"The Home Gambling Network—Welcome", (http //wwwhomegamblingnetwork com), download date: Nov. 24, 2002, 1pg.
"The Home Gambling Network—Players", (http //wwwhomegamblingnetwork com/player php3), download date: Nov. 24, 2002, 2pp.
"Multimedia Games, Inc.—Home", (http www betnet com/), download date: Nov. 24, 2002, 1pg.
Newsletter sent via email: "The CR Newsletter", do_not_email@crnewsletter.com, email sent Jan. 20, 1998, 1 pg.
Website: "Online blackjack, poker, slots, and more—Casino Vegas Royale", (http www casinovegasroyale com/insurance shtml), Copyright 2002, 1pg.
Website: "Who Says You Can't Win From Losing? 49er and Three Diamonds Casino Offer 'Free Insurance' for Online Play in July", (http //www smartplayers net/insurance htm), Jun. 14, 2003, 1pg.
Brochure: "Introducing iView", Bally Gaming Systems, Copyright 2004, 2pp.
Website: "Bettors Insurance", (http //www bettorsinsurance com/index asp?asp?id=881035&), Copyright 2004, 1pg.
Website: "Welcome—CasinoActive.Net Offers New Gambling Idea", (http //www bokmaker com/default asp?ACT=5&content=30&id=1), download date: Jul. 26, 2004, 1pg.
Website: "Gamblers Insurance", (http www u 1 casino com/rules_gamblers php), download date: Jul. 26, 2004, 1pg.
Website: "Online Sports Betting—Sportsbet Bookmaker", (http //www sportsbetbookmaker com/aboutus shtml), download date: Jul. 27, 2004, 1pg.
Website: "SDS Product Group Snapshot", Bally Gaming Systems, (http www ballygamingcom/sds/sds_products1 asp), download date: Aug. 9, 2004, 2pp.
Website: "Cash Back Bonus", (http //www optimalgambling com/casinos/cash-back-bonus-online-casinos htm), download date: Sep. 27, 2004, 1pg.
Beckett, Rick, "Gambling Insurance?", iWon—Casino, (http //iwon gamblingtimes com/writers/rbeckett/rbeckett_winter2001 html), download date: Sep. 27, 2004, 2pp.
"GameCast Live—About the Product", (http //www gamecastlive com/about_the product html), download date: Nov. 24, 2002, 1 pg.
Website: "Insuring Your Online Wagers", (http // www winneronline com/articles/November2001/gambling_insu...), Nov. 28, 2001, 1 pg.
U.S. Appl. No. 08/766,576, entitled "Secure Improved Remote Gaming System", filed Dec. 6, 1996.
U.S. Appl. No. 09/218,258, entitled "System and Method for Automatically Initiating Game Play on an Electronic Gaming Device", filed Dec. 6, 1996.
U.S. Examiner's Office Action dated Jun. 20, 2007, U.S. Appl. No. 11/423,037, Filing Date Jun. 8, 2006 15 pages.
U.S. Examiner's Office Action dated Oct. 9, 2007, U.S. Appl. No. 10/636,520, Filing Date Aug. 7, 2003 21 pages.
U.S. Examiner's Notice of Allowability dated Aug. 10, 2001, U.S. Appl. No. 09/518,760, Filing Date Mar. 3, 2001 2 pages.
U.S. Examiner's Office Action dated May 9, 2001, U.S. Appl. No. 09/518,760, Filing Date Mar. 3, 2001 10 pages.
U.S. Examiner's Notice of Allowability dated Dec. 6, 1999, U.S. Appl. No. 08//880,838, Filing Date Jun. 23, 1997 7 pages.
U.S. Examiner's Office Action dated Oct. 6, 1999, U.S. Appl. No. 08//880,838, Filing Date Jun. 23, 1997 6 pages.
U.S. Examiner's Office Action dated Apr. 6, 2004, U.S. Appl. No. 10/001,089, Filing Date Nov. 2, 2001 10 pages.
U.S. Examiner's Office Action dated Jul. 11, 2005, U.S. Appl. No. 10/001,089, Filing Date Nov. 2, 2001 24 pages.
U.S. Examiner's Notice of Allowability dated Sep. 28, 2006, U.S. Appl. No. 10/001,089, Filing Date Nov. 2, 2001 9 pages.
U.S. Examiner's Office Action dated Sep. 12, 2003, U.S. Appl. No. 10/001,089, Filing Date Nov. 2, 2001 8 pages.
U.S. Examiner's Notice of Allowability dated Nov. 3, 2005, U.S. Appl. No. 10/985,131, Filing Date Nov. 10, 2004 6 pages.
U.S. Examiner's Office Action dated Sep. 22, 2006, U.S. Appl. No. 10/420,066, Filing Date Apr. 21, 2003 10 pages.
U.S. Examiner's Office Action dated Jul. 13, 2007, U.S. Appl. No. 10/420,066, Filing Date Apr. 21, 2003 15 pages.
Davy, K., "Big Ichigeki! Pachi-Slot Taikouryku Universal Museum—Reader Review", Copyright 1995-2001, Game FAQs, 2 pp.
Website, "GameCast Live—PowerPoint Presentation", (http//www gamecastlive com/presentation/toronto2_files/frame htm), download dated: Jan. 20, 2003, 12 pgs.
"GameCast Live—Home", (http//www gamecastlive com), download date: Nov. 24, 2002, 12pp.
"Affidavit Under 37 CFR 1.131", for U.S. Appl. No. 10/134,007, entitled "Continuous Play Slot Machine and Retrofit Kit", filed Jan. 4, 2005 in the name of Charles Murphy, 14 pp.
Email: "We have added a new 'Auto-Spin' feature. . . ", slotmachine@searchout.com, sent: Sep. 17, 1999, (http //www searchout com), 1 pg.
Newsletter sent via email: "The CR Newsletter", do_not_email@crnewsletter.com, email sent Jan. 20, 1998, 2 pp.
Wittwer, J.W. Monte Carlo Simulation Basics, Vertex42.com. Jun. 1, 2004, 3 pp.
Super Double Jackpot PC Software from SafeGuard Information Services, Oct. 14, 2002, 5 pp.
Office Action for U.S. Appl. No. 11/270,016 mailed Jun. 4, 2010, 12 pp.
Office Action for U.S. Appl. No. 11/428,605 mailed Jun. 6, 2008, 9 pp.
Office Action for U.S. Appl. No. 11/428,606 mailed Jun. 10, 2008, 9 pp.
Notice of Allowability for U.S. Appl. No. 11/274,740 mailed Sep. 7, 2010, 7 pp.

Office Action for U.S. Appl. No. 11/268,315 mailed May 21, 2010, 11 pp.
Notice of Allowance for U.S. Appl. No. 11/273,534 mailed Jul. 22, 2010, 8 pp.
Office Action for U.S. Appl. No. 11/273,534 mailed Mar. 4, 2010, 7 pp.
Office Action for U.S. Appl. No. 11/273,534 mailed Jul. 8, 2009, 5 pp.
Office Action for U.S. Appl. No. 11/274,586 mailed Mar. 23, 2010, 13 pp.
Office Action for U.S. Appl. No. 11/273,799 mailed Jan. 5, 2009, 8 pp.
Office Action for U.S. Appl. No. 11/273,510 mailed Aug. 31, 2010, 12 pp.
Office Action for U.S. Appl. No. 11/273,510 mailed Aug. 31, 2010, 12 pp.
Office Action for U.S. Appl. No. 11/273,093 mailed Apr. 20, 2010, 13 pp.
Office Action for U.S. Appl. No. 11/273,093 mailed Aug. 12, 2009, 12 pp.
Office Action for U.S. Appl. No. 11/273,159 mailed Jun. 16, 2010, 14 pp.
Office Action for U.S. Appl. No. 11/273,159 mailed Aug. 13, 2009, 10 pp.
Office Action for U.S. Appl. No. 10/986,529 mailed Feb. 2, 2009, 12 pp.
Office Action for U.S. Appl. No. 10/986,529 mailed Jun. 9, 2009, 11 pp.
Office Action for U.S. Appl. No. 10/986,529 mailed Oct. 9, 2007, 9 pp.
Office Action for U.S. Appl. No. 11/425,037, mailed Sep. 9, 2010, 12 pp.
Office Action for U.S. Appl. No. 11/425,037 mailed Jun. 1, 2010, 10 pp.
Office Action for U.S. Appl. No. 11/425,037 mailed Apr. 29, 2008, 10 pp.
Office Action for U.S. Appl. No. 11/425,037 mailed Sep. 17, 2007, 5 pp.
Office Action for U.S. Appl. No. 11/425,041 mailed Sep. 17, 2007, 5 pp.
Notice of Allowance for U.S. Appl. No. 11/425,037 mailed Dec. 30, 2010, 5 pp.

* cited by examiner

444

| PLAYER ID 410 | SOCIAL SECURITY NUMBER 412 | NAME 414 | ADDRESS 416 | PHONE NUMBER 418 | CREDIT CARD NUMBER 420 | CREDIT BALANCE 422 | (ACCUMULATED) COMP. POINTS 424 | HOTEL GUEST 426 | PLAYER RATING 428 | VALUE OF INTERVAL REMAINING 430 |
|---|---|---|---|---|---|---|---|---|---|---|
| 123456 | 123-45-7890 | BILL GREEN | 111 NORTH AVE. | (212) 555-1234 | 1111-2222-3333-4444 | $25.00 | 130 PTS. | NO | 4 | $30.00 |
| 876543 | 876-54-3210 | ROB BLUE | 423 SOUTH ST. | (812) 555-4321 | 2222-4444-6666-8888 | $17.50 | 240 PTS. | YES | 2 | $3.00 |
| 158595 | 555-12-6338 | KAREN RED | 64 WEST RD. | (315) 555-5954 | 1111-3333-5555-7777 | $0.00 | 350 PTS. | YES | 2 | $0.75 |

FIG. 4

546

| PLAYER ID NUMBER 510 | PLAYER SELECTED PRICE PARAMETERS 512 | FLAT RATE PRICE 514 | INTERVAL REMAINING 516 | TIME AUDIT DATA 518 | MACHINE ID NUMBER 520 |
|---|---|---|---|---|---|
| 123456 | TOP 3 JACKPOTS 90 MINUTES | $50.00 | 72 MINUTES | 6/21/97 10:30 AM | A846 |
| 876543 | ALL JACKPOTS 90 MINUTES | $200.00 | 3 MINUTES | 6/21/97 11:00 AM | B623 |
| 158595 | TOP JACKPOT 30 MINUTES | $30.00 | 15 MINUTES | 6/21/97 11:30 AM<br>6/21/97 11:45 AM | C103 |

FIG. 5

628

| PAY COMBINATION 610 | 1 COIN 620 | 2 COINS 630 | 3 COINS 640 | PAY COMBINATION STATUS 650 |
|---|---|---|---|---|
| DOUBLE JACKPOT | 400 | 800 | 1200 | ACTIVE |
| 5BAR-5BAR-5BAR | 50 | 100 | 150 | ACTIVE |
| SEVEN-SEVEN -SEVEN | 25 | 50 | 75 | INACTIVE |
| BAR-BAR-BAR | 20 | 40 | 60 | INACTIVE |
| CHERRY-CHERRY-CHERRY | 10 | 20 | 30 | INACTIVE |
| ANY PAIR-CHERRY | 5 | 10 | 15 | INACTIVE |
| ANY-ANY-CHERRY | 2 | 4 | 6 | INACTIVE |
| NON WINNING OUTCOMES | 0 | 0 | 0 | N/A |

FIG. 6

727

| MACHINE TYPE 710 | AMOUNT WAGERED PER PLAY 712 | PLAYER RATING 714 | TIME OF DAY 716 | DAY OF THE WEEK 718 | MACHINE USAGE 719 | ACTIVE PAY COMBINATIONS 720 | DURATION OF FLAT RATE PLAY SESSION 722 | FLAT RATE PRICE 724 |
|---|---|---|---|---|---|---|---|---|
| QUARTER DEUCES WILD | $0.25 | 2 | 2:00 AM | MONDAY | LOW | ALL | 30 MIN. | $15.00 |
| DOLLAR DOUBLE DIAMOND | $3 | 5 | 9:00 PM | SATURDAY | HEAVY | TOP 2 | 2 HRS. | $100.00 |
| DOLLAR SUPER SEVENS | $3 | 3 | 4:00 PM | FRIDAY | MODERATE | TOP 1 | 1 HR. | $30.00 |

FIG. 7

1429

| PACKAGE ID 1410 | INTERVAL 1412 | DURATION OF FLAT RATE PLAY SESSION 1414 | AMOUNT WAGERED PER PLAY 1416 | PAY COMBINATION STATUS 1418 | FLAT RATE PLAY SESSION PRICE 1420 |
|---|---|---|---|---|---|
| 1 | HANDLE PULLS | 100 PULLS | 3 COINS | ALL ACTIVE | $30.00 |
| 2 | HANDLE PULLS | 100 PULLS | 3 COINS | TOP 3 ACTIVE | $20.00 |
| 3 | HANDLE PULLS | 250 PULLS | 3 COINS | ALL ACTIVE | $75.00 |
| 4 | HANDLE PULLS | 250 PULLS | 3 COINS | TOP 3 ACTIVE | $50.00 |
| 5 | TIME | 30 MINUTES | 3 COINS | ALL ACTIVE | $40.00 |
| 6 | TIME | 30 MINUTES | 3 COINS | DYNAMIC | $30.00 |
| 7 | TIME | 60 MINUTES | 3 COINS | ALL ACTIVE | $80.00 |
| 8 | TIME | 60 MINUTES | 3 COINS | DYNAMIC | $60.00 |
| 9 | TIME | 90 MINUTES | 3 COINS | ALL ACTIVE | $120.00 |

FIG. 14

1825

| PLAYER ID 2205 | NAME 2210 | ADDRESS 2215 | FINANCIAL ACCOUNT IDENTIFIER 2220 | DEMOGRAPHIC 2225 | CREDITS 2230 | LIFETIME COIN IN 2235 |
|---|---|---|---|---|---|---|
| P11123 | SAM BROWN | ANYPLACE, USA | 1111-1111-1111-1111 | MALE, AGE 23 | 68 CREDITS, $0.25 PER CREDIT | $600 |
| P222234 | LINDA JONES | MYPLACE, USA | 2222-2222-2222-2222 | FEMALE, AGE 47 | 0 | $14400 |

FIG. 22

1830

| GAMING DEVICE IDENTIFIER 2305 | NAME 2310 | MANUFACTURER 2315 |
|---|---|---|
| G333333 | DIAMOND MINE | ABC CORP |
| G444444 | CRAZY DEUCES | XYZ CORP |

FIG. 23

1835

| CONTRACT ID 2405 | PLAYER ID 2410 | INITIAL PLAYER BANK-ROLL 2415 | DESCRIPTION 2420 | COST 2425 | RESULT 2430 | AMOUNT OWED THE PLAYER 2435 | AMOUNT OWED THE INSURER 2440 |
|---|---|---|---|---|---|---|---|
| C111 | P222333 | N/A | 2000 PULLS, 25 CENTS / PULL, PLAYER KEEPS NET WINNINGS | $20 | CONTRACT ENDS WITH PLAYER AT MINUS $45 | 0 | $20 - $45= - $25 |
| C222 | P444555 | N/A | 1 HOUR OF PLAY, 1 DOLLAR / PULL, PLAYER KEEPS GROSS WINNINGS | $100 | CONTRACT ENDS WITH PLAYER AT $97 | $97 | $100 |
| C333 | P666777 | $2000 | 100 PULLS / WEEK, 2 DOLLARS / PULL, OCCURRING BETWEEN 8-9PM TUESDAYS FOR 12 WEEKS, OR UNTIL PLAYER LOSES BANKROLL | N/A | PLAYER LOST BANKROLL | 0 | N/A |
| C444 | P888999 | $100 | 90 MINUTES OF PLAY, 50 CENTS / PULL | N/A | PLAYER ENDS UP WITH $120 | $120 | N/A |
| C555 | P111000 | $200 | 63 CENTS / PULL, DOUBLE BETS FOR TWO PULLS AFTER ANY WIN, STOP AFTER JACKPOT, LOSS INSURED BEYOND $200 | $20 | 2 MINUTES LEFT AND PLAYER IS AT $213 | UNDETER-MINED | UNDETER-MINED |
| TOTAL OWED THE INSURER: $75 | | | | | | | |

FIG. 24

BUDGET-DEFINED FLAT RATE PLAY CONTRACT PARAMETERS

This application is a continuation of U.S. patent application Ser. No. 11/273,170, filed Nov. 14, 2005 now abandoned; which claims priority and benefit under 35 U.S.C. §119(e) to U.S. Provisional Patent Application Ser. No. 60/627,670, filed on Nov. 12, 2004 and entitled "GAMING DEVICE OFFERING A FLAT RATE PLAY SESSION AND METHODS THEREOF", the entirety of which is incorporated by reference herein.

This application claims priority and benefit under 35 U.S.C. §119(e) to U.S. Provisional Patent Application Ser. No. 60/627,670, filed on Nov. 12, 2004 and entitled "GAMING DEVICE OFFERING A FLAT RATE PLAY SESSION AND METHODS THEREOF", the entirety of which is incorporated by reference herein.

SUMMARY

In accordance with some embodiments, there is provided a method, apparatus, and/or article of manufacture for providing a gaming session using a gaming device. In one embodiment, a method comprises determining, based at least upon a duration of a flat rate play contract, a cost of the flat rate play contract. The duration may comprise, for example, a specified amount of time and/or a specified number of game plays (e.g., handle pulls of a slot machine and/or hands dealt via a video poker machine). The method may further comprise, according to some embodiments, determining a rule defining a desired profit rate for the flat rate play contract, calculating a desired profit margin for the flat rate play contract by multiplying the desired profit rate for the flat rate play contract by the duration of the flat rate play contract, and calculating a price for the flat rate play contract by adding the desired profit margin for the flat rate play contract to the cost of the flat rate play contract. In such a manner, for example, flat rate play contracts and/or sessions may be priced to substantially comply with and/or realize one or more desired profit rates. According to some embodiments, an apparatus comprises means for effectuating the method such as a memory, a processor, and/or an input device (e.g., to receive an indication of the desired profit rate rule from an operator).

According to some embodiments, a method, apparatus, and/or article of manufacture may provide for determining, based at least upon durations of a plurality of flat rate play contracts, a cost of each of the plurality of flat rate play contracts, determining a rule defining a desired profit rate for a gaming device offering the plurality of flat rate play contracts, calculating a desired profit margin for each of the plurality of flat rate play contracts by multiplying the desired profit rate for the gaming device by the durations of each of the plurality of flat rate play contracts, and calculating a price for each of the plurality of flat rate play contracts by adding the desired profit margin for each of the plurality of flat rate play contracts to the cost of each of the plurality of flat rate play contracts. In such a manner, for example, flat rate play contracts and/or sessions may be priced to substantially comply with and/or realize one or more desired profit rates associated with one or more gaming devices.

BRIEF DESCRIPTION OF THE DRAWINGS

An understanding of embodiments described herein and many of the attendant advantages thereof may be readily obtained by reference to the following detailed description when considered with the accompanying drawings, wherein:

FIG. 4 is a schematic view of a casino player database according to some embodiments;

FIG. 5 is a schematic view of a flat rate database according to some embodiments;

FIG. 6 is a schematic view of a payout table according to some embodiments;

FIG. 7 is a schematic view of a calculation table according to some embodiments;

FIG. 14 is a schematic view of a flat rate price package database according to some embodiments.

FIG. 22 is a table illustrating an embodiment of a player database according some embodiments;

FIG. 23 is a table illustrating an embodiment of a gaming device database according some embodiments;

FIG. 24 is a table illustrating an embodiment of a contract database according some embodiments.

DETAILED DESCRIPTION

I. Introduction

Figure 1:
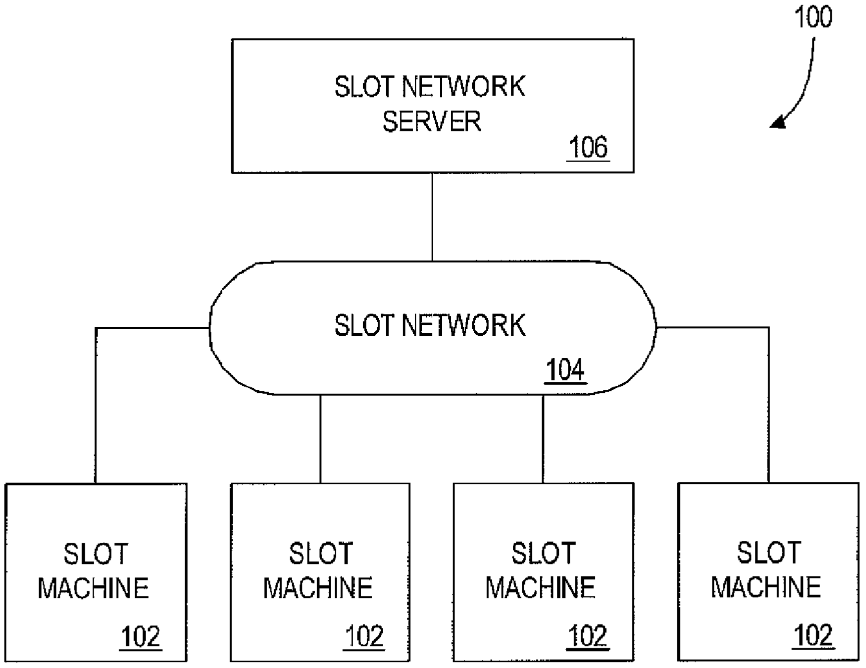
FIG. 1 is an overall schematic view of a system according to some embodiments.

Certain embodiments will now be described in detail with reference to the drawings. Although the embodiments discussed herein are primarily directed to reel slot machines, it should be understood that such embodiments are equally applicable to other gaming devices, such as video poker machines, video blackjack machines, video roulette, video keno and the like.

Some embodiments are directed generally to a method and apparatus for operating a gaming device having a flat rate play session. As used herein, flat rate play session is generally defined as a period of play wherein the player need not make funds available for any individual play during the play session. The flat rate play session may span multiple plays of the gaming device. These multiple plays are generally aggregated into intervals or segments of play. It is to be understood that the term interval (and/or duration) as used herein could be time, handle pulls, and any other segment in which gaming device play could be divided. For example, two hours, one hundred (100) spins, fifty (50) winning spins, etc. In some embodiments, a player may enter player-identifying information and/or player selected price parameters at a gaming device. The price parameters define the flat rate play session, describing the duration of play, machine denomination, jackpots active, etc. The gaming device stores the player selected price parameters and proceeds to retrieve and/or calculate the flat rate price of playing the gaming device for the flat rate play session. The player selected price parameters, in combination with operator price parameters, determine the flat rate price. Should the player decide to pay the flat rate price, the player simply deposits that amount into the gaming device and/or makes a credit account available for the gaming device to debit. For example, it might cost twenty-five dollars ($25) to play for half an hour.

Once the player initiates play, the gaming device tracks the flat rate play session and stops the play when the session is completed, usually when a time limit has expired. During the play session, the player is not required to deposit any coins. Payouts are made either directly to the player in the form of coins or indirectly in the form of credits to the credit balance stored in the machine. It should be understood that the player balance could be stored in a number of mediums, such as smart cards, credit card accounts, debit cards, and/or hotel credit accounts.

In some embodiments, the expected cost of a flat rate play session and/or a contract associated therewith may be determined by a gaming device, server, and/or other processing device. Various methods may be employed to determine flat rate play costs including, but not limited to, (i) simulation, (ii) mathematical simulation, (iii) mathematical modeling, and/or (iv) reactive pricing (e.g., based on historical costs). According to some embodiments, a profit margin may be added to the cost to determine a price (e.g., a retail price) for a flat rate play session and/or contract. Further, such prices may be set, updated, modified, and/or otherwise managed by an operator and/or by a gaming device or gaming server. In some embodiments, flat rate play prices may be modified and/or set based upon one or more pre-defined rules. A gaming device may, for example, utilize pre-defined rules to automatically and/or dynamically modify and/or set flat rate play prices.

II. System Architecture

Referring initially to FIG. 1, an overall schematic view of a system 100 according to some embodiments is shown. In general, the system 100 may comprise multiple slot machines 102 and/or a slot network server 106. In some embodiments, each slot machine 102, which may be uniquely identified by a machine identification (ID) number, communicates with the slot network server 106 via a slot network 104. The slot network 104 is preferably a conventional local area network controlled by the slot network server 106. It is to be understood, however, that other arrangements in which the slot machines 102 communicate with the server 106 are within the scope of some embodiments.

As will be described in greater detail elsewhere herein, in one embodiment, the slot machine 102 communicates player-identifying information to the slot network server 106. The slot network server 106, in turn, verifies the player-identifying information. The slot machine 102 also calculates a flat rate price based on both player selected and casino determined price parameters and displays the flat rate price to the player. The player may then accept the flat rate price and initiate play. In some embodiments, methods may be practiced without the slot network server 106, in an arrangement in which the slot machine 102 calculates the flat rate price.

III. Device Architectures

Figure 2A:
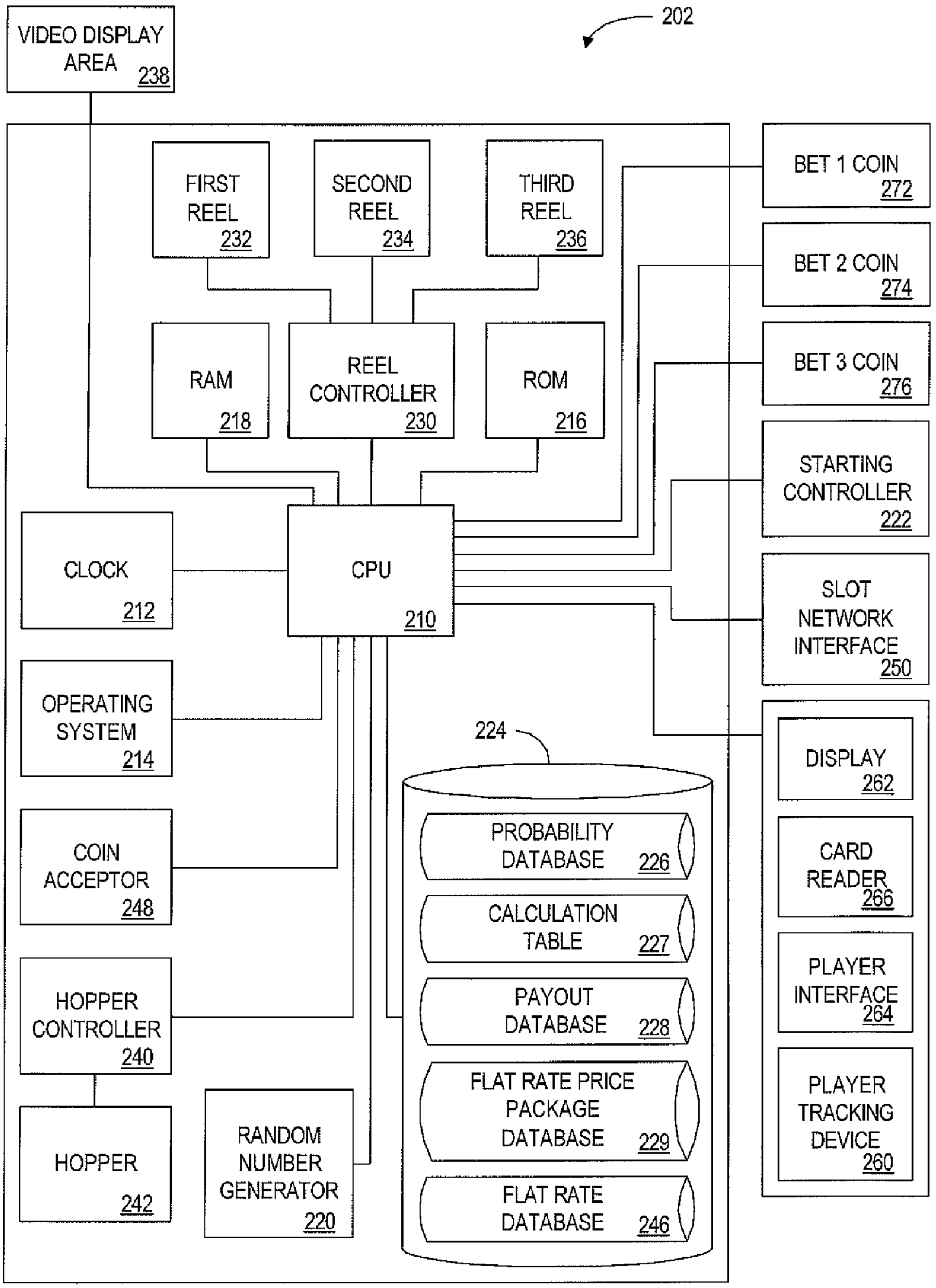
FIG. 2A is a schematic view of a gaming device according to some embodiments.

Turning to FIG. 2A, a schematic view of a gaming device 202 according to some embodiments is shown. In some embodiments, the gaming device 202 may be similar in configuration and/or functionality to one of the slot machines 102 of FIG. 1. While the gaming device 202 may comprise any type of gaming device (such as a video poker machine), for ease of explanation it will be assumed for exemplary purposes that the gaming device 202 comprises the slot machine 102 from FIG. 1. For example, a slot machine 202 may contain a Central Processing Unit (CPU) 210, a clock 212, and/or an operating system 214 (typically stored in memory as software). The CPU 210 executes instructions of a program stored in Read Only Memory (ROM) 216 for playing the slot machine 202. The Random Access Memory (RAM) 218 temporarily stores information passed to it by the CPU 210 during play. Also in communication with the CPU 210 is a Random Number Generator (RNG) 220.

With respect to gaming operations, the slot machine 202 operates in a conventional manner. The player starts the slot machine 202 by inserting a coin into a coin acceptor 248, or using electronic credit, and pressing and/or interfacing with a starting controller 222. Under control of a program—stored for example in a data storage device 224 and/or ROM 216—the CPU 210 initiates the RNG 220 and/or causes the RNG 220 to generate a random number. The CPU 210 looks up the generated random number in a stored probability table 226, which contains a list that matches random numbers to corresponding outcomes, and identifies the appropriate outcome. Based on the identified outcome, the CPU 210 locates the appropriate payout in a stored payout table 228. The CPU 210 also directs a reel controller 230 to spin reels 232, 234, 236 and to stop them at a point when they display a combination of symbols corresponding to the appropriate payout. When the player wins, the machine stores the credits in RAM 218 and displays the current balance in video display area 238. In an alternate embodiment, the slot machine 202 dispenses the coins to a payout tray (not shown), and in another embodiment, a server (also not shown) such as the slot network server 106 from FIG. 1 stores the player credits.

In some embodiments, a hopper controller 240 may be connected to a hopper 242 for dispensing coins. When the player requests to cash out by pushing a cash-out button (not shown) on the slot machine 202, the CPU 210 checks the RAM 218 to see if the player has any credit and, if so, signals the hopper controller 240 to release an appropriate number of coins into a payout tray (also not shown). A coin acceptor 248 may also be coupled to the CPU 210. Further, the CPU 210 may register any coin received by the coin acceptor 248.

In some embodiments, the slot machine 202 may not include the reel controller 230 and/or reels 232, 234, 236. Instead, a video display area 238 may graphically display representations of objects contained in the selected game, such as graphical reels or playing cards. These representations are preferably animated to display playing of the selected game.

Also in communication with the CPU 210 is a player tracking device 260. The tracking device 260 may comprise, for example, a card reader 266 for reading player-identifying information stored on a player tracking card (not shown). As used herein, the term player-identifying information denotes any information or compilation of information that identifies (e.g., uniquely) a player. In some embodiments, the identifying information is a player identification (PID) number. Although not so limited, the player tracking card generally stores the PID on a magnetic strip located thereon. Such a magnetic strip and device to read the information stored on the magnetic strip are well known.

The player tracking device 260 may also and/or alternatively include a display 262 and/or a player interface 264. The player interface 264 may include, for example, a keypad and/or a touch-screen display. In operation, as discussed elsewhere herein, the slot machine 202 may display a message prompting the player to enter player selected price parameters. In some embodiments, a player may enter the player selected price parameters via the player interface 264. Because the player interface 264 is generally part of the player tracking device 260, it is, therefore, generally in communication with the CPU 210. Alternatively, input of selected price parameters may be accomplished through video display area 238 if it is configured with touch-screen capabilities.

The slot machine 202 may also or alternatively include a series of bet buttons 272, 274, 276. The bet buttons 272, 274, 276 may generally include a "Bet 1 coin" button 272, a "Bet 2 coins" button 274, and/or a "Bet 3 coins" button 276. The bet buttons 272, 274, 276 may be coupled to the CPU 210. Therefore, pressing one of the bet buttons 272, 274, 276 may cause a signal to be transmitted to the CPU 210, the signal indicating how much a player desires to wager on a given play.

In some embodiments, the data storage device 224 may store one or more data structures 226-229, 246. The data structures 226-229, 246 stored in the data storage device 224 may generally include a probability table 226, a calculation table 227, a payout table 228, a flat rate price package database 229, and/or a flat rate database 246. As discussed in greater detail elsewhere herein, the flat rate database 246 and the calculation table 227 may store information related to the flat rate play session and calculation of the flat rate price, respectively. The flat rate price package database 229 may store information describing different pre-established flat rate packages as defined by the casino and/or an operator associated therewith.

In some embodiments, the CPU 210 may also be connected to a slot network interface 250. The slot network interface 250 provides a communication path from the slot machine 202 to a server (not shown), such as the slot network server 106 of FIG. 1, through a network (not explicitly shown), such as the slot network 104 of FIG. 1. Thus, as discussed in greater detail elsewhere herein, information is communicated among the player tracking card, player tracking device 260, slot machine 202, and slot network server 106.

Figure 2B:
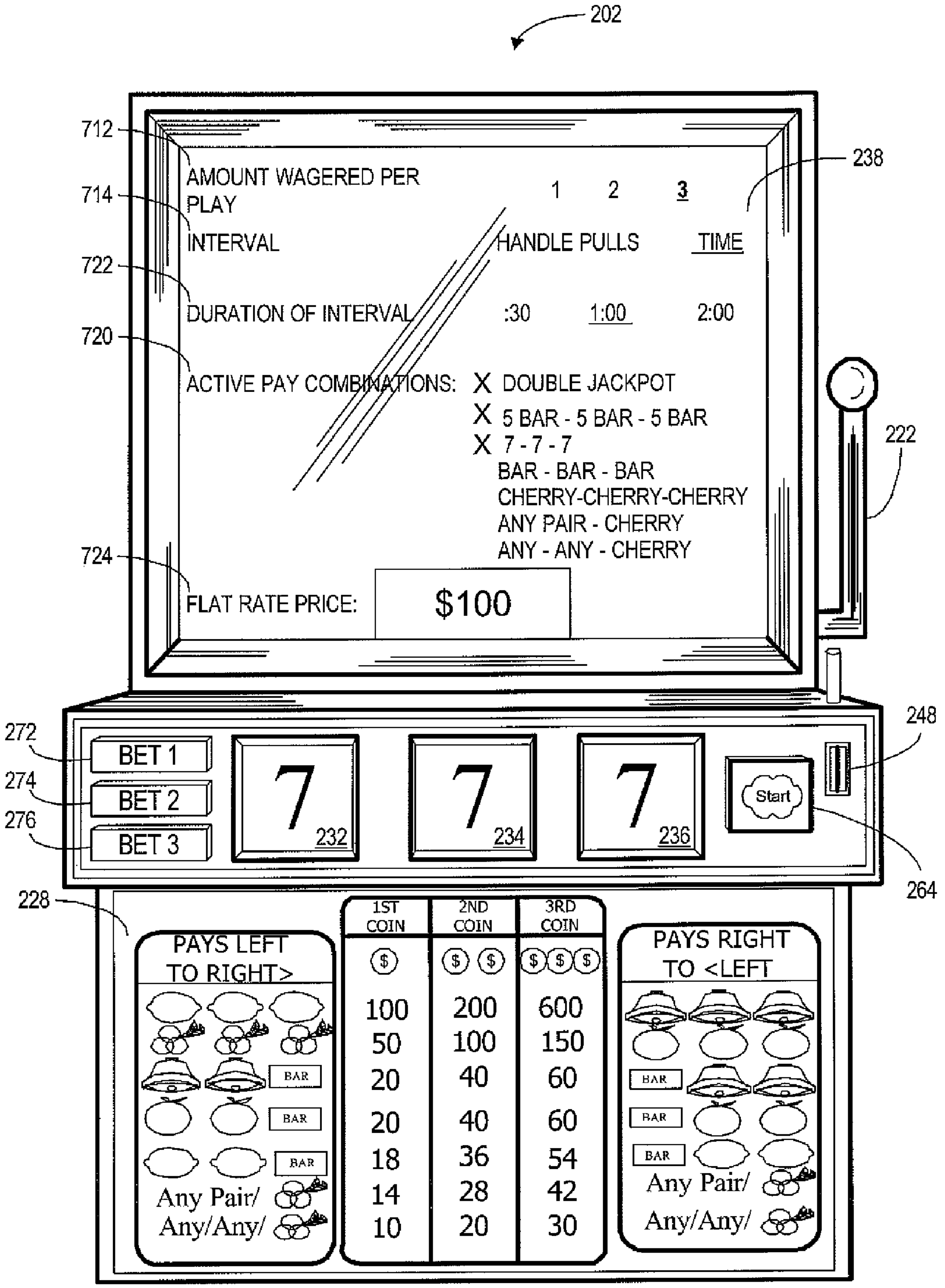
FIG. 2B is a plan view of a gaming device according to some embodiments.

Referring now to FIG. 2B, the plan view of a gaming device 202 according to some embodiments is shown. In some embodiments, the gaming device 202 may be the same gaming device illustrated in FIG. 2A. The gaming device 202 may, for example, comprise the slot machine 102. For example, FIG. 2B may generally depict a slot machine 202 comprising components 222, 228, 232, 234, 236, 238, 248, 264, 272, 274, 276 that may be similar in configuration and/or functionality to the similarly-named and/or numbered components described in conjunction with FIG. 2B. In some embodiments, the slot machine 202 may display (as shown in FIG. 2B) player-selected price parameter options on the video display area 238. Included in the displayed parameters is an amount wagered per play 712, an interval 714, an interval duration 722, and/or active pay combinations 720. As will be described further elsewhere herein, after the player has selected the desired price parameters, the slot machine 202 may generally display a flat rate price 724. Once the player has accepted the flat rate price 724 and made the appropriate funds available, flat rate play may commence.

Figure 3:
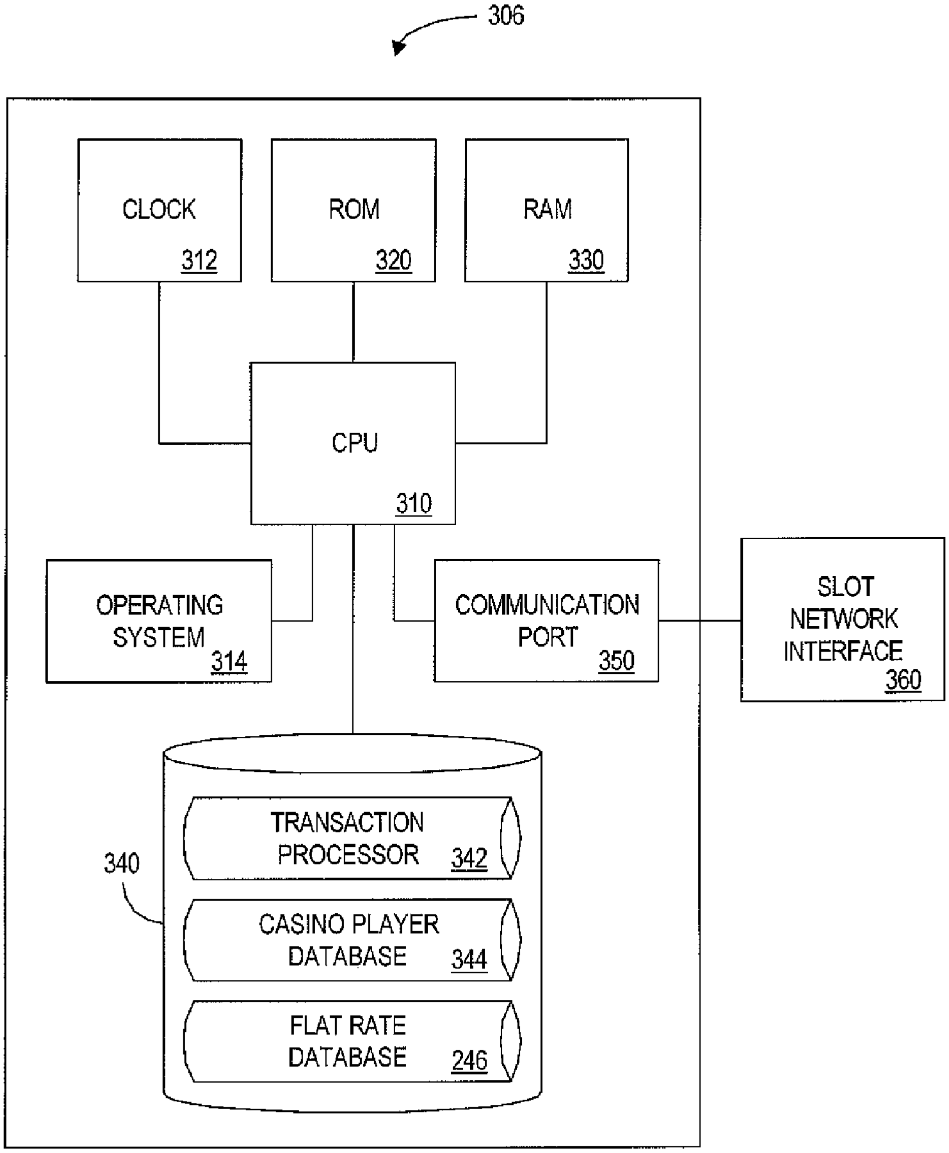
FIG. 3 is a schematic view of a network server according to some embodiments.

Turning to FIG. 3, a schematic view of a network server 306 according to some embodiments is shown. The slot network server 306 may, for example, be similar to the slot network server 106 described in conjunction with FIG. 1. According to some embodiments, the slot network server 306 may comprise a CPU 310. The CPU 310, may have a clock 312 associated therewith, and/or may execute instructions of a program stored in ROM 320. During execution of the program instructions, the CPU 310 may temporarily store information in the RAM 330. Additionally, the CPU 310 may be coupled to a data storage device 340, having a flat rate database 346, a transaction processor 342, and/or a casino player database 344. In general, the transaction processor 342 manages the contents of the data storage device 340. In some embodiments, the casino player database 344 stores information specific to each player, including player-identifying information. In some embodiments, the components 310, 312, 320, 330, 340, 342, 344, 346 of the slot network server 306 may be similar in configuration and/or functionality to the similarly named and/or numbered components described in conjunction with any of FIG. 1, FIG. 2A, and/or FIG. 2B.

In some embodiments, in order to communicate with one or more slot machines (not shown; such as the slot machines 102, 202 described herein), the slot network server 306 also includes a communication port 350. The communication port 350 is coupled to the CPU 310 and a slot machine interface 360. Thus, the CPU 310 can control the communication port 350 to receive information from the data storage device 340 and RAM 330 and transmit the information to the slot machines 102, and vice versa.

It is to be understood that because the slot machines are generally in communication with the slot network server 306, information stored in a slot machine may be stored in the server 306, and vice versa. Thus, for example, in some embodiments, the slot network server 306 rather than the slot machine may include various data structures (some of which are not shown in FIG. 3) such as the payout table 228 of FIG. 2A, the flat rate database 346 (that may be similar to the flat rate database 246 of FIG. 2A), and/or the calculation table 227 of FIG. 2A.

IV. Data Structures

A. Casino Player Data Structure

Referring now to FIG. 4, a schematic view of a casino player database 444 according to some embodiments is shown. In some embodiments, the casino player database 444 may be similar in configuration and/or functionality to the casino player database 344 of FIG. 3. The casino player database 444 may include, for example, multiple records having multiple fields of information. Specifically, the casino player database 444 generally comprises multiple records, each record being associated with a particular player, as identified by a player ID number. The fields within each record may include: a player ID field 410, a social security number field 412, a name field 414, an address field 416, a telephone number field 418, a credit card number field 420, a credit balance field 422, and/or complimentary information, such as a total accumulated complimentary points field 424, a hotel guest field 426 (e.g., indicating whether the player is a hotel guest), a player status rating field 428, and/or a value of interval remaining field 430. Having information related to one field, such as the player ID field 410, allows a server or other device (such as the slot network server 106, 306 of FIG. 1 and/or FIG. 3) to retrieve all information stored in corresponding fields 410, 412, 414, 416, 418, 420, 422, 424, 426, 428, 430 of that player record.

It is to be understood that not all of these fields 410, 412, 414, 416, 418, 420, 422, 424, 426, 428, 430 are necessary for operation of some embodiments. For example, the name field 414, the social security number field 412, the address field 416, the telephone number field 418, the credit card number field 420, and/or the hotel guest field 426 are merely representative of additional information that may be stored and used for other purposes. In one embodiment, the credit card number field 420 and the hotel guest field 426 are used for billing purposes and the social security number field 412 is used to generate tax forms when a player wins a jackpot over a given amount.

The total accumulated complimentary points field 424 is further illustrative of additional information a casino may store in a players record. In some embodiments, a player's complimentary points are displayed to the player when a player tracking card is inserted into a slot machine (such as the slot machine 102, 202 of FIG. 1, FIG. 2A, and/or FIG. 2B). In an alternate embodiment, such points may be used in addition, or as an alternative to the credit balance field 422, that may for example be stored in the RAM 218 of the slot machine 202 described in conjunction with any of FIG. 2A and/or FIG. 2B.

The player status rating field 428 generally contains information representative of the particular player's relative importance to the casino, as based upon the frequency and/or duration of the player's visits, the amount of money wagered, and/or the like.

The value of interval remaining field 430 stores the value of interval remaining in a flat rate play session and/or contract when a player terminates the play session prior to its expiration. This field will be described in greater detail elsewhere herein.

B. Flat Rate Data Structure

Reference is now made to FIG. 5, where a schematic view of a flat rate database 546 according to some embodiments is shown. In some embodiments, the flat rate database 546 may be similar in configuration and/or functionality to the flat rate database 246 of the slot machine 202 in FIG. 2A. The flat rate database 546 may comprise, for example, multiple records, each record pertaining to a flat rate play session of a particular player (e.g., as identified by that player's ID number). Consequently, one field in flat rate database 546 is the player ID number field 510. Other fields may include: a player selected price parameters field 512, a flat rate price field 514, an interval remaining field 516, a time audit data field 518, and/or a machine ID number field 520. The machine ID number field 520 contains the machine ID number that uniquely identifies a gaming device utilized by the player (such as the slot machine 102, 202 of FIG. 1, FIG. 2A, and/or FIG. 2B). It is to be understood that since both the casino player database 444 of FIG. 4 and the flat rate database 546 may generally include the respective player ID fields 410, 510, a system (such as the system 100 of FIG. 1) can correlate any player information stored in the casino player database 444, with any player information stored in the flat rate database 546 (e.g., the database tables and/or records thereof may be linked).

C. Payout Data Structure

Turning now to FIG. 6, a schematic view of a payout table 628 according to some embodiments is shown. In some embodiments, the payout table 628 may be similar in configuration and/or functionality to the payout database 228 described in conjunction with FIG. 2A. As shown in FIG. 6, the payout table 628 may comprise five fields of related information (although fewer or more fields may be includes, as is or becomes practicable). The first field, a pay combination field 610, identifies the set of possible pay combinations for a given gaming device (such as the slot machine 102, 202 of FIG. 1, FIG. 2A, and/or FIG. 2B). Such possible pay combinations include winning pay combinations, or those in which a payout results, and non-winning pay combinations, in which the player receives no payout and consequently loses the amount wagered. Winning pay combinations include, for example, "DOUBLE JACKPOT DOUBLE JACKPOT DOUBLE JACKPOT" and "BAR BAR BAR." The pay combinations field 610 may also include a "NON WINNING OUTCOMES" record, an entry representing the outcomes which result in no payout to the player, such as "PLUM BELL ORANGE."

The payout table 628 may also include three (3) payout fields 620, 630, 640. Such payout fields 620, 630, 640 contain the payout information for each of the possible pay combinations identified in the pay combinations field 610. Each of the payout fields 620, 630, 640 may be identified by the number of coins wagered on a particular play (e.g., as selected via the bet buttons 272, 274, 276 of FIG. 2A and/or FIG. 2B). In some embodiments, the payout table 628 contains a "1 coin" payout field 620, which is accessed when one (1) coin is wagered, a "2 coins" payout field 630, which is accessed when two (2) coins are wagered, and a "3 coins" payout field 640, which is accessed when three (3) coins are wagered. In other words, each payout field 620, 630, 640 may correspond to a respective bet button 272, 274, 276 of FIG. 2A and/or FIG. 2B. The payout information provides the number of coins won upon the occurrence of a particular pay combination. Thus, "CHERRY CHERRY CHERRY" pays out ten (10) coins when one (1) coin is wagered.

Finally, the payout table 628 may include a pay combination status field 650. The pay combination status field 650 generally includes an indication for each winning pay combination, identified in the pay combination field 610, of whether the player is eligible to win the payout for each outcome. As will be described elsewhere herein, the determination of whether a player is eligible to win a payout for a given outcome may be made by the player as part of the player-selected price parameters.

D. Calculation Data Structure

Referring now to FIG. 7, a schematic view of a calculation table 727 according to some embodiments is shown. In some embodiments, the calculation table 727 may be similar in configuration and/or functionality to the calculation table 227 described in conjunction with FIG. 2A. The calculation table 727 may be used, for example, by the system 100 of FIG. 1 in determining a flat rate price to be charged to the player, which may be stored in a flat rate price field 724 (and/or in the flat rate price field 514 of the flat rate database 546 of FIG. 5). Specifically, the calculation table 727 contains multiple price parameters that are correlated to the flat rate price field 724. More specifically, these price parameters may include player selected price parameters and/or operator selected price parameters. In general, player selected price parameters include any game related variable that defines the flat rate play session and/or contract. Furthermore, operator selected price parameters are parameters that the operator of a gaming device (such as the slot machines 102, 202 of FIG. 1, FIG. 2A, and/or FIG. 2B) selects as affecting the values stored in the flat rate price field 724. Thus, in some embodiments, the player selected price parameters in the calculation table 727 may be represented by a machine type field 710, an amount wagered per play field 712, an active pay combinations field 720, and/or a duration of the flat rate play session field 722.

The operator selected price parameters in the calculation table 727 include player a status rating field 714, a time of day field 716, a day of the week field 718, and/or a machine usage field 719. In some embodiments the values stored in the flat rate price field 724 are predetermined based upon the aforementioned price parameters and stored in the calculation table 727, as will be described in more detail with respect to FIG. 14 and FIG. 15 elsewhere herein. In an alternate embodiment the values of the flat rate price field 724 are calculated based upon these parameters as needed according to a price algorithm stored in memory. For example, the price algorithm may operate as follows.

1. Exemplary Pricing Algorithm

The are any number of algorithms that could be used to calculate a flat rate price, and they can be generally described as calculating an expected value to the customer and then adding in a margin (e.g., a profit margin) for the casino or adjusting the price to reflect the time of day, value of the customer, etc.

The first step may generally be to determine a "base" flat rate price. This may be calculated in accordance with "Formula (1)", as follows:

Base Price=[(amount wagered)×(interval)]×[(expected coins awarded for all active pay combinations over a cycle/expected coin-in over a cycle)]. (1)

For example, the following base price calculation represents a player selecting three dollar ($3) coins per handle pull, an interval of five hundred (500) handle pulls, and the top three (3) pay combinations active. For this example we will assume that a complete cycle of the slot machine is ten thousand, six hundred and forty-eight (10,648) unique outcomes and that the top three (3) pay combinations would be expected to pay two thousand, one hundred and sixty (2,160) coins over that cycle. Note also that the expected coins awarded for all active pay combinations over a cycle and the expected coin-in over the cycle should both reflect the same number of coins wagered. Essentially, this ratio reflects the expected monetary return to the payer on a per coin wagered basis. When multiplied by the amount wagered and the number of handle pulls, the number reflects the amount of money that the player would be expected to receive from the machine over the interval specified. It should be noted that this amount of money is not necessarily the number of coins entered by the player but rather is the theoretical number of coins of play allowed by the flat rate session. Continuing with the calculation (utilizing "Formula (1)") in accordance with the numbers provided in the example, we have:

$$\begin{aligned}\text{Base Price} &= [(\$3)\times(500)]\times[(2{,}160/10{,}648)]\\ &= \$1{,}500\times.202855\\ &= \$304.28\end{aligned}$$

Note that if the player were to pay this base price he would be essentially getting a fair bet for his money. He would pay three hundred and four dollars and twenty-eight cents ($304.28) for the session and expect (over the long run) to get three hundred and four dollars and twenty-eight cents ($304.28) back in prize money from the top three (3) active pay combinations. Of course in the short run his results could range from receiving no payouts over the interval to receiving thousands of dollars. Because this base price is a fair bet for the player the casino may want to add in a margin for the house, perhaps by multiplying the base price by a predetermined margin factor such as fifty percent (50%). In this example the profit-adjusted price would thus simply be:

$$\begin{aligned}\text{profit adjusted price} &= \$304.28\times150\%\\ &= \$456.42\end{aligned}$$

Of course the casino might want to offer flat rate sessions to players without a casino markup under some circumstances, such as part of a promotional package or to reward a particularly loyal customer. In fact the casino might even decrease the base price in some circumstances (e.g., subsidize flat rate play sessions and/or portions thereof).

In some embodiments, the base price (and/or profit adjusted price) could be further modified by various other operator price parameters such as the following:

a) Time of Day (TD)

Times of the day in which the casino traffic tends to be heavy should result in the player paying a premium for the flat rate play session, while quiet times in the casino should offer the player a discount over normal rates. For example, the profit margin factor utilized to adjust the base price may be determined based on the following time periods:

| | |
|---|---|
| Midnight to 4am | 70% |
| 4am to 8am | 80% |
| 8am to 12pm | 90% |
| 12pm to 4pm | 100% |
| 4pm to 8pm | 120% |
| 8pm to Midnight | 140% |

b) Day of Week (DW)

With the heaviest volume of visitors generally falling on Fridays and Saturdays, these days may necessitate higher flat rate session costs. For example, the profit margin factor utilized to adjust the base price may be determined based on the following periods:

| | |
|---|---|
| Monday to Thursday | 80% |
| Friday | 120% |
| Saturday | 140% |
| Sunday | 100% |

c) Player Status Rating (PSR)

For top customers such as high rollers, the cost of a flat rate session may be reduced as a customer retention tool. For example, the profit margin factor utilized to adjust the base price may be determined based on the following classifications:

| | | |
|---|---|---|
| 1 | (High Roller) | 80% |
| 2 | (Good customer) | 90% |
| 3 | (Average) | 100% |
| 4 | (Low) | 120% |

d) Slot Machine Usage (SMU)

When the majority of slot machines in the casino are being used, a premium may be applied to the cost of the flat rate play session in order to more evenly distribute play. For example, the profit margin factor utilized to adjust the base price may be determined based on the following usage classifications:

| | |
|---|---|
| Heavy | 120% |
| Moderate | 100% |
| Light | 80% |

In some embodiments, the flat rate price may accordingly be calculated to incorporate such parameters pursuant to "Formula (2)", as follows:

$$\text{Flat rate price} = \text{Base Price} \times TD \times DW \times PSR \times SMU \quad (2)$$

As an example: the player is in the casino at two in the morning (2 AM) on a Wednesday, there is low slot machine usage, and the player has an average rating. Thus, "Formula (2)" may be utilized to reflect these conditions, as follows:

(Base Price = $304.28; from above)

$$\begin{aligned}\text{Final flat rate price} &= (\text{Base Price}) \times TD \times DW \times PSR \times SMU \\ &= \$304.28 \times 70\% \times 80\% \times 100\% \times 80\% \\ &= \$304.28 \times 44.8\% \\ &= \$136.32\end{aligned}$$

The casino may round up this price to one hundred and thirty-seven dollars ($137) to avoid the need for small change. In the above calculations, the casino might also incorporate floors which prevent the base price from going below a level that would be profitable for the house, regardless of the number of positive criterion that were applied to the base price.

Those of ordinary skill in the art will appreciate that modifications could be made to the formulas (e.g., "Formula (1)" and/or "Formula (2)") to reflect different kinds of flat rate sessions and/or contracts. For a session with an interval of one (1) hour (instead of a fixed number of handle pulls) the formula might reflect an expected number of handle pulls per hour for that particular game, perhaps even adjusted to reflect the type of player purchasing the flat rate session. For example, an experienced video poker player might be expected to reach seven hundred (700) hands per hour while a beginner might only be expected to reach three hundred (300) hands per hour.

As will also be understood by those skilled in the art, the ultimate goal of many slot machine players is to hit a jackpot payout. The enjoyment of the play, as well as the ability to maximize the chance of hitting a large jackpot, is increased by more play. Play can be increased both by playing longer and by playing faster. As will be appreciated from a consideration of the processes described herein, some embodiments permit, facilitate, and/or encourage both increased duration, by providing for play at discounted prices, and speed of play, by providing for minimal time delays between plays.

E. Flat Rate Package Data Structure

Turning to FIG. 14, a schematic view of a flat rate price package database 1429 according to some embodiments is shown. In some embodiments, the flat rate price package database 1429 may be similar in configuration and/or functionality to the flat rate price package database 229 described in conjunction with FIG. 2A. The flat rate price package database 1429 may be used, for example, by the system 100 of FIG. 1 in providing a player with different price package options for flat rate play of the slot machine 102 of FIG. 1. Specifically, the flat rate price package database 1429 may contain multiple combinations, or packages (e.g., identified by package numbers stored in a package ID field 1410), of price parameters that correspond to pre-established flat rate prices. More specifically, these price parameters may be represented by an interval field 1412, a duration of flat rate play field 1414, an amount wagered per play field 1416, and/or a pay combination status field 1418. Each combination of price parameters may generally be represented by a corresponding flat rate play session price stored in a flat rate play session price field 1420. As is described with reference to FIG. 15 herein, the flat rate price package database 1429 may be accessed when the player wishes to initiate a flat rate play session. Rather than let the player choose the price parameters, according to some embodiments, the slot machine 102, 202 may list the different packages stored in the flat rate price package database 1429. The player may then choose a package and play may commence.

V. Processes

Having thus described the components of some embodiments, an exemplary operation of the system 100 of FIG. 1 will now be described in greater detail with reference to FIG. 8, FIG. 9, FIG. 10, and FIG. 11, with continued reference to FIG. 1, FIG. 2A, FIG. 2B, FIG. 3, FIG. 4, FIG. 5, FIG. 6, and FIG. 7. It is to be understood that the programs stored in ROM 320 of the slot network server 306 of FIG. 3 and ROM 216 of the slot machine 202 of FIG. 2A may provide any of the functionality described herein.

Figure 8A:
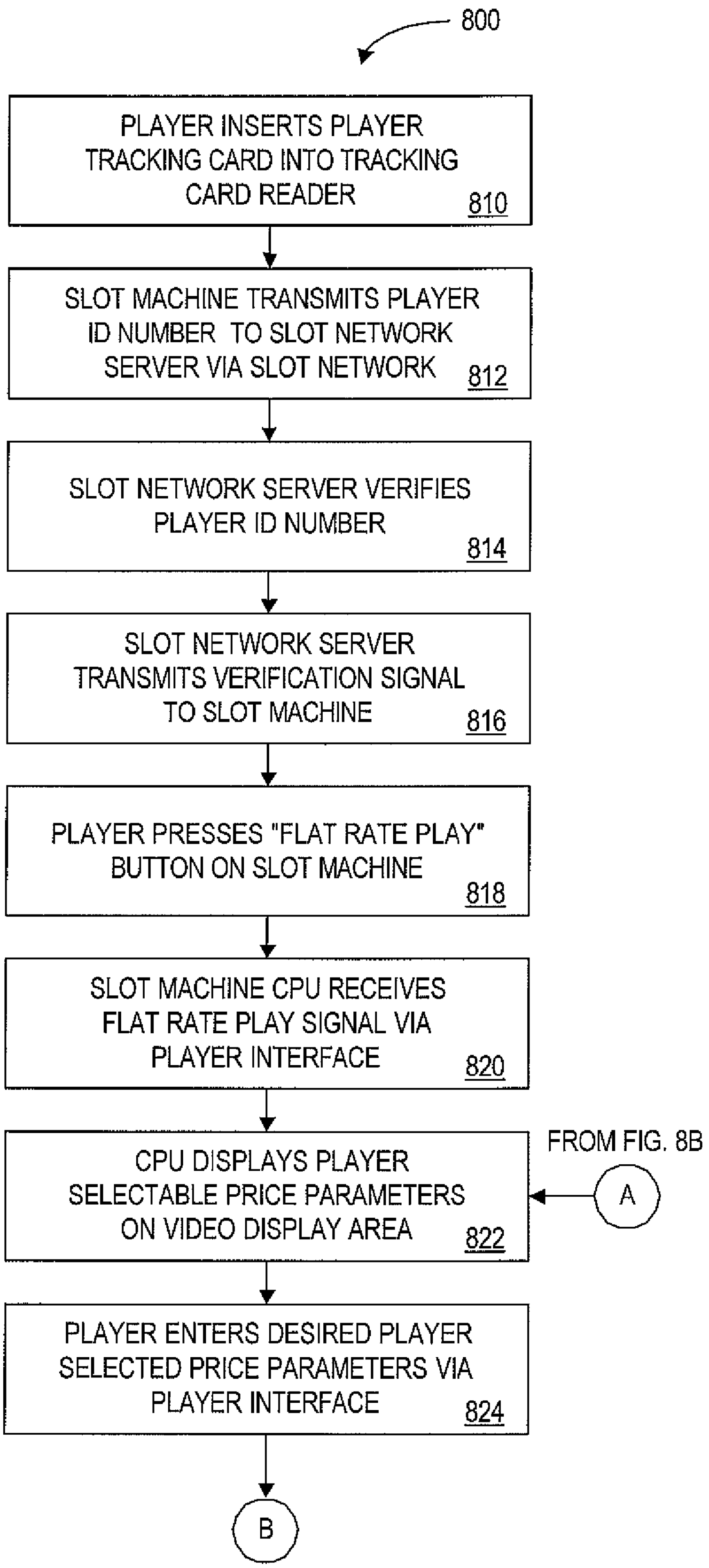
FIG. 8A and FIG. 8B are flow diagrams of a method according to some embodiments.
Figure 8B:
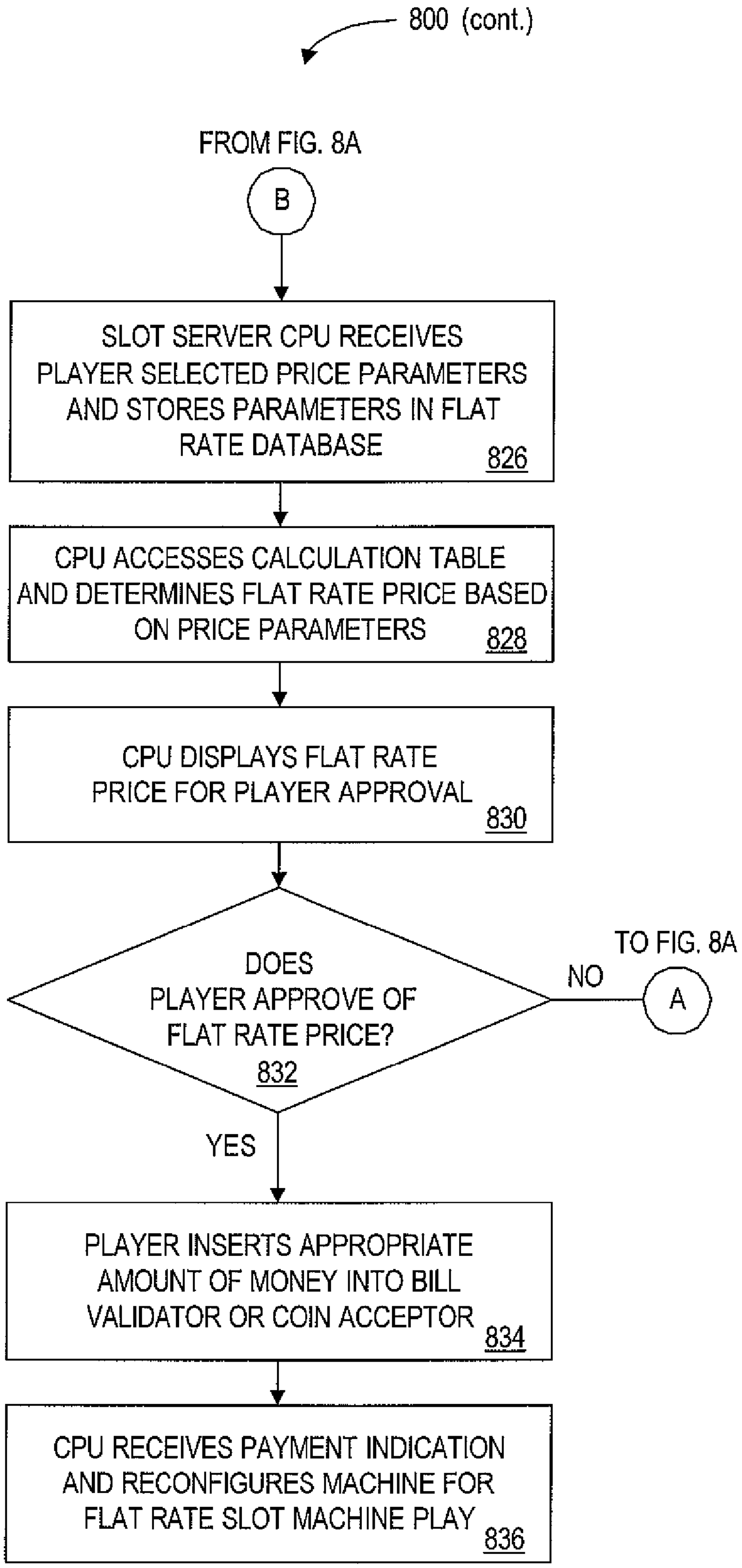

Turning to FIG. 8A and FIG. 8B, flow diagrams of a method 800 according to some embodiments are shown. The method 800 may, for example, illustrate the general operation of the system 100 of FIG. 1. As shown in step 810, the slot machine player first inserts the player tracking card into a card reader (e.g., such as the card reader 266 of FIG. 2A). The card reader then proceeds to read player-identifying information from the tracking card. The player identifying information, namely the player ID number, is communicated from a slot machine (such as the slot machine 102, 202 of FIG. 1, FIG. 2A, and/or FIG. 2B) to a slot network server (such as the slot network server 106, 306 of FIG. 1 and/or FIG. 3), in step 812.

Upon receiving the player identifying information, the slot network server verifies the information in step 814. Such verification includes the slot network server searching a casino player database (such as the casino player database 344, 444 of FIG. 3 and/or FIG. 4) for a record containing the received player ID number in the appropriate field (e.g., the player ID field 410 of FIG. 4). Once the slot network server verifies the player identifying information, the slot network server transmits a signal to the slot machine acknowledging such verification in step 816. In alternate embodiments, other information, such as the players name (e.g., stored in the name field 414 of FIG. 4), a complimentary point total (e.g., stored in the complimentary points field 424 of FIG. 4), and/or a player status rating (e.g., stored in the player rating field 428 of FIG. 4) are transmitted to the slot machine for display.

In step 818, the player selects flat rate play via a player interface (such as the player interface 264 of FIG. 2A and/or FIG. 2B). The CPU (e.g., CPU 210 of FIG. 2A) of the slot machine, in step 820, then receives a signal from the player interface, indicating that the player has selected flat rate play. For example, there could be a button specifically for triggering a flat rate play session. The CPU, in response, accesses memory to retrieve player selectable price parameters. Player selectable price parameters are the choices available to a player for entering the player selected price parameters. These player selectable price parameters are controlled by a program stored in memory (such as the ROM 216 of FIG. 2A). Such player selectable price parameters, in the present embodiment, include the amount wagered per play (e.g., one, two, or three coins), the length of the flat rate play session, and possible jackpot structures, such as having only the "DOUBLE JACKPOT" and "5 BAR" jackpots active (as illustrated in the payout table 628 of FIG. 6). In an alternate embodiment, the player selectable price parameters are stored as part of a calculation table (such as the calculation tables 227, 727 of FIG. 2A and/or FIG. 7).

Then, as shown in step 822, the slot machine displays the player selectable price parameters to the player. For example, the parameters could be listed on a video display area (e.g., the video display area 238 of FIG. 2A and/or FIG. 2B) for the player. Once the parameters appear, the player simply selects the desired settings. Alternatively, the player may accept one or more default settings. Once the player selectable price parameters are displayed on the display (and/or otherwise provided to the player), the player proceeds, in step 824, to enter player selected price parameters via the player interface. The player selected price parameters may also include data that, although not directly inputted by the player, is selected by the player and identified by the slot machine. In the present embodiment, such additional player selected price parameters include the type of gaming device or machine, the time of day, and/or the day of the week.

It is to be understood that the casino operator of the slot machines may define the scope of the player selectable price parameters, and therefore limit the player selected price parameters in any manner. For example, the length of flat rate play may be limited to periods above a minimum time or to periods that are multiples of thirty (30) minute intervals. The jackpot structure may require that some jackpots remain active.

Continuing to FIG. 8B, the method 800 may proceed to step 826, where the slot machine and/or CPU thereof receives the player selected price parameters. Having received the player selected parameters, the CPU then stores the player selected price parameters, the player identifying information, and the slot machine's machine ID number in a record in a flat rate database (such as the flat rate database 246, 546 of FIG. 2A and/or FIG. 5). Specifically, the player ID number may be stored in the player ID number field 510 of FIG. 5, the machine ID number may be stored in the machine ID number field 520 of FIG. 5, and/or the player selected price parameters may be stored in the player selected price parameters field 512 of FIG. 5. Although the player selected price parameters are illustrated as being stored in a single field (e.g., player selected price parameters field 512 of FIG. 5), it is to be understood that each player selected price parameter may be stored in a separate field. It is also to be understood that in alternate embodiments the player selected price parameters need not be stored in a database, but could be stored in other memory such as the RAM 218 of FIG. 2A.

In some embodiments, the slot machine and/or CPU thereof uses the player selected price parameters to determine the flat rate prices. Specifically, in step 828, the CPU accesses the calculation table and searches for the flat rate price (e.g., stored in the flat rate price field 724 of FIG. 7) corresponding to the received player selected price parameters, which, in the present embodiment, include a machine type, an amount wagered per play, a time of day, a day of the week, active jackpots, and/or the length of the flat rate play session (e.g., stored in the respective fields 710, 712, 716, 718, 720, 722 of FIG. 7). The CPU also may incorporate operator selected price parameters for the flat rate price, such as a player status rating and/or machine availability. As will be appreciated by one skilled in the art, the player status rating is received from the casino player database at any time prior to determination of the flat rate price. Thus, in some embodiments, the slot network server transmits the player status rating to the slot machine along with the verification signal in step 816.

By including the player status rating in the calculation table, a casino may reward frequent players who wager relatively large amounts of money with a lower flat rate price. Thus, the system 100 of FIG. 1 may reward and/or encourage frequent play. By including active jackpots in the calculation table, the system 100 of FIG. 1 allows a casino to discount the flat rate price for those players who choose to enable relatively few winning outcomes in the payout table. Furthermore, by including the price parameters relating to time of day and day of the week in the calculation table, a casino may charge a lower flat rate price for sessions during weekday afternoons or between two in the morning (2 AM) and eight in the morning (8 AM), thereby encouraging play of the slot machines when they are typically idle.

It is to be understood that the aforementioned price parameters in the calculation table are merely representative of the type of variables that may be considered in determining a flat rate price. Thus, it is within the scope of some embodiments to include only some of the price parameters, all of the parameters, or additional parameters in the calculation table.

As mentioned herein, the flat rate price may be based partly upon the availability of slot machines. In such an embodiment, the slot network server tracks whether each slot machine is being used by noting whether outcomes are currently being received from a given slot machine. In another embodiment, the slot network server tracks slot machine availability by tabulating the number of slot machines for which flat rate play is currently enabled. In yet another embodiment, the slot network server tracks slot machine availability by identifying how many slot machines have a player tracking card inserted therein.

Another price parameter that may be used is predicted or forecasted slot machine availability. Specifically, such a parameter accounts for anticipated availability of slot machines based upon events at the casino. For example, the calculation table correlates a lower flat rate price to a time of day corresponding to an event, such as a show that many casino players are likely to attend. On the other hand, the calculation table correlates a higher flat rate price to a time of day corresponding to the end of the event and/or to otherwise heavier casino traffic. This allows a casino to effectively revenue manage their slot machines without resorting to a change in hold percentage which requires regulatory approval.

It is to be understood that accounting for slot machine availability need not be accomplished in the calculation table. Rather, in an alternate embodiment, a schedule of events is stored in memory (such as the RAM 218 of FIG. 2A) that is accessed prior to transmitting the flat rate price to the player. If the event schedule indicates that an event is ending during the requested flat rate play session, then the flat rate price will be incremented accordingly.

In another embodiment, the flat rate price is based only on operator selected price parameters. A slot machine according to such an embodiment could, for example, provide discounted flat rate play sessions based on a player status rating, thereby offering one hundred (100) plays for the price of ninety (90) plays, and/or discounted timed sessions. To encourage repeat, high stakes play, higher player status ratings result in greater discounts.

Having determined the flat rate price, the slot machine, in step 830, displays the duration of the flat rate play session and the flat rate price and requests approval from the player. Once the player accepts the terms of the flat rate play session, flat rate play commences.

If the player does not approve the flat rate price, then the player indicates so via the player interface. As indicated by Path "A" in FIG. 8A and FIG. 8B, the slot machine may repeat its operation from step 822. On the other hand, if the player approves the flat rate price, the player indicates such approval via the player interface in step 832. Following such approval, the slot machine prompts the player to enter an appropriate amount of money in step 834. In the present embodiment, the player deposits coins into the slot machine (e.g., via the coin acceptor 248 of FIG. 2A and/or FIG. 2B). In one embodiment, the player deposits a casino token as payment for the flat rate play session. Such tokens may be denominated in dollars, or represent a number of handle pulls. A casino could thus sell a fifty (50) handle pull token, usable on a particular denomination and/or type of machine. Such a token may additionally serve to activate the flat rate play session, eliminating the need for the player to select flat rate play via the player interface. Alternatively, a player's credit balance may be debited to pay for the flat rate play session.

In some embodiments a casino token may be associated with a particular set of pay combinations that are to be active during a flat rate play session activated via the token. In yet other embodiments a casino token may be associated with (i) a specified duration of time, (ii) a specified number of handle pulls or outcomes, (iii) a specified number of winning handle pulls or outcomes, and/or (iv) a flat rate price package as, for example, described with reference to the flat rate price package database 1429 of FIG. 14. A gaming device may identify such a token and enter the appropriate flat rate play session by, for example, the size and/or weight of the token or by reading or receiving information from the token (e.g., via a computer chip embedded in the token or special markings on the token). Such a casino token may be, for example, purchased by a person and given to another person as a gift. The recipient may subsequently use the token by inserting it into an appropriate gaming device and essentially playing for "free" (since the person that gave the gift had prepaid for the token) for a specified duration.

Once the CPU registers the receipt of money, the CPU reconfigures the slot machine for the flat rate play session in step 836. Specifically, the CPU generates a signal, or a flag in memory, indicating that there is no need to accept the coins between plays (e.g., for the duration of the flat rate play session). CPU further sets an active flag (such as stored in the pay combination status field 650 of FIG. 6) in the payout table according to the jackpot structure entered by the player.

Figure 9:
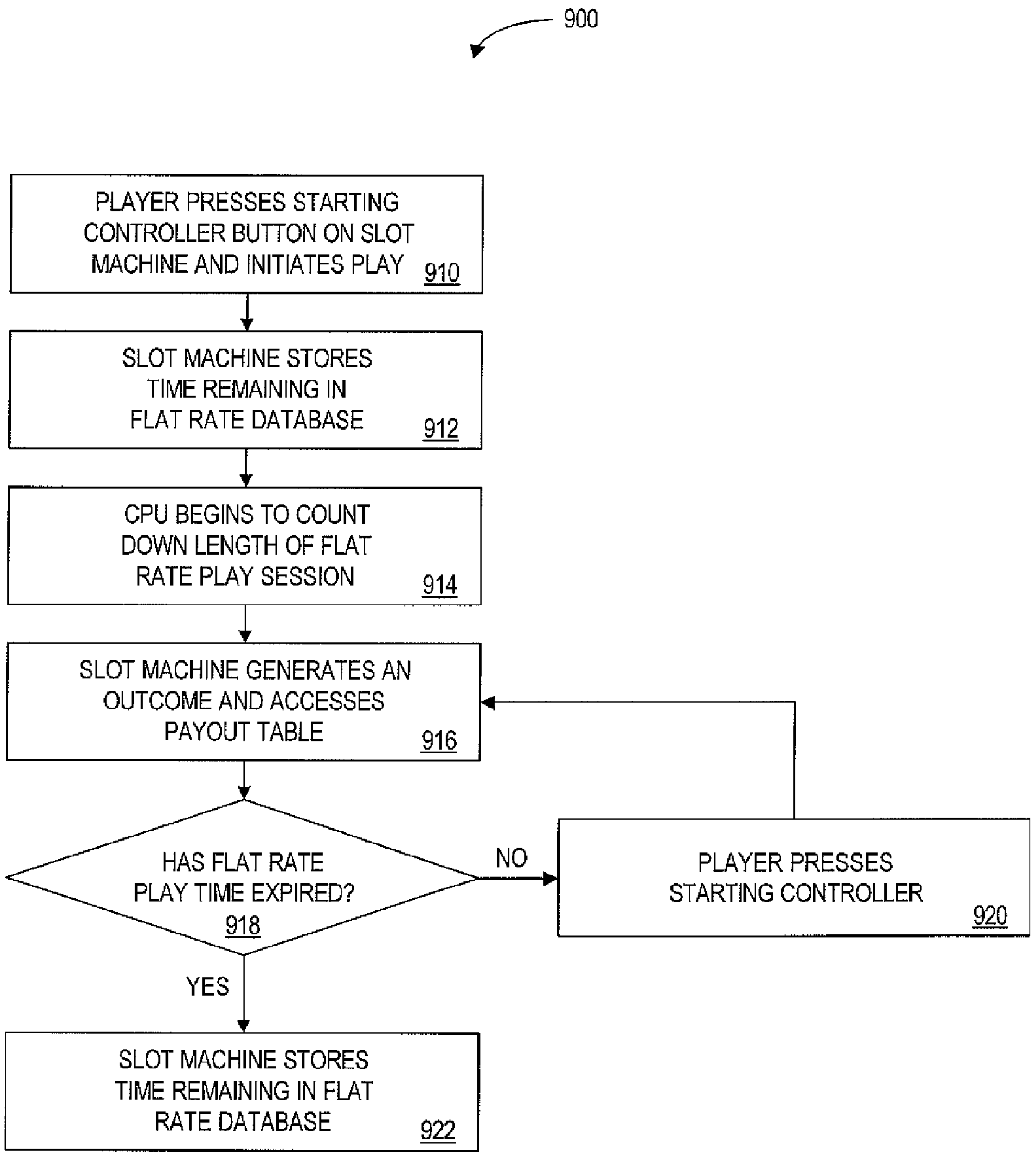
FIG. 9 is a flow diagram of a method according to some embodiments.

The operation of a slot machine (and/or other gaming device) during a flat rate play session will now be described with reference to FIG. 9 and with continuing reference to FIG. 1, FIG. 2A, FIG. 2B, FIG. 3, FIG. 4, FIG. 5, FIG. 6, and FIG. 7. In FIG. 9, a flow diagram of a method 900 according to some embodiments is shown. During a flat rate play session, for example, a slot machine operates generally as described above with reference to FIG. 2A and/or FIG. 2B. However, the slot machine may be reconfigured to operate according to the player selected price parameters, if such parameters affect play, and to operate continuously, without requiring payment between each play. Specifically the method 900 and/or the flat rate play session may begin when the player provides an indication (e.g., by presses the starting controller 222 of FIG. 2A and/or FIG. 2B), in step 910. The CPU also initiates a countdown of the length of the flat rate play session, such as may be stored in the player selected parameters field 512 of the flat rate database 546 of FIG. 5. With the start of the session, the CPU stores the start time of the flat rate play session in the flat rate database. Specifically, the start time may be stored in a time audit data field (such as the time audit data field 520 of FIG. 5), in step 912. In step 914, the CPU begins to count down the duration of the flat rate play session. Next, in step 916, the slot machine generates an outcome and accesses the payout table to determine the appropriate corresponding number of coins to be paid out.

Furthermore, in step 918, after each outcome is generated, the slot machine determines whether the countdown of the interval remaining has reached zero. It is to be understood that the countdown may be implemented in either software or hardware. Additionally, it is understood that the countdown process discussed herein may be replaced with any suitable means for tracking the duration of the flat rate play session. The interval remaining may also or alternatively represent the number of handle pulls remaining.

In the event that the countdown has not reached zero, the player presses the starting controller in step 920, thereby initiating another play of the slot machine. In the event that the countdown has reached zero, the CPU generates a signal indicating that the flat rate play session has concluded. The slot machine displays a message indicating this to the player and, in step 922, stores the end time of the session in the time audit data field of the flat rate database.

In an alternate embodiment, the player selected price parameters include the "time between plays." In this embodiment, the CPU of slot machine controls the time between generating outcomes of successive plays in the slot machine to equal the received "time between plays" player selected price parameter. In another alternate embodiment, the slot machine tracks the number of plays during the flat rate play session. If the number of plays exceeds a predetermined limit, the slot machine automatically terminates the flat rate play session, regardless of the duration of the flat rate play session.

Figure 10:
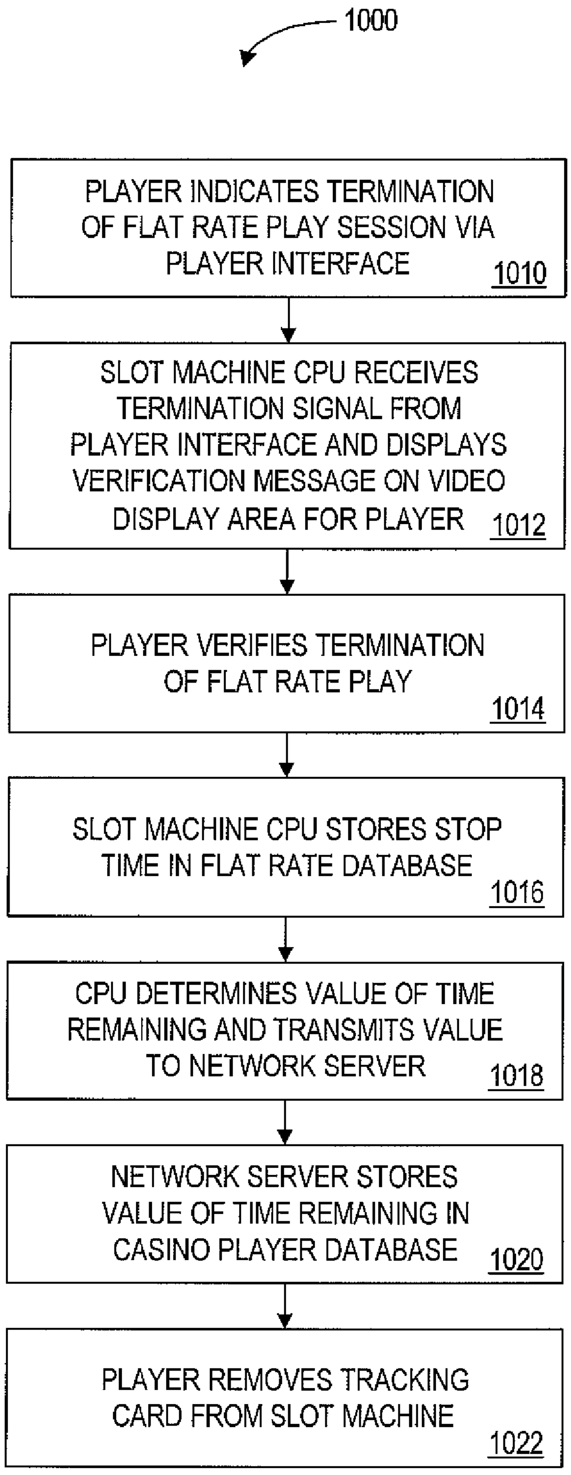
FIG. 10 is a flow diagram of a method for terminating play according to some embodiments.

Turning now to FIG. 10, a flow diagram of a method 1000 for terminating play according to some embodiments is shown. In some embodiments, the method 1000 may illustrate the operation of the system 100 of FIG. 1 when the player terminates the flat rate play session prior to the expiration of the session. In step 1010, for example, the player indicates a desire to terminate the flat rate play session via the player interface. Consequently, the slot machine CPU receives a termination signal and, in step 1012, displays a message to the player, asking the player to verify termination of the flat rate play session. If the player does not verify termination, then the session continues as described with reference to the method 900 of FIG. 9. On the other hand, if the player verifies termination, shown as step 1014, the CPU proceeds to store the stop time in the time audit data field of the flat rate database, in step 1016.

It is to be understood that having both the start time and the stop time of the flat rate play sessions stored in the flat rate database allows the casino to perform an audit of the session. Specifically, should a player allege that the flat rate play session was shorter than that which was paid for, the casino may access the flat rate database and retrieve the actual start and stop time from the time audit data field. In the present embodiment, this time includes an indication of the day, hour, and minute of the play session.

Next, in step 1018, the CPU determines the value of the interval remaining in the flat rate play session and transmits the value to the slot network server. In order to determine the value of the interval remaining, the CPU accesses the calculation table. The value of interval remaining may, for example, equal the flat rate price corresponding to the price parameters (e.g., the machine type, amount wagered per play, player status rating, time of day, etc.) used to determine the original flat rate price charged to the player. When determining the value of the interval remaining, however, the value in the duration of flat rate play session field 722 of FIG. 7 is not the original length of the session, but rather is equal to the actual interval remaining in the flat rate play session. Stated succinctly, the slot machine identifies the flat rate price corresponding to the actual interval remaining in the flat rate play session.

Once the value of interval remaining is determined, the slot machine transmits the value to the slot network server. Upon receiving the value of interval remaining, the slot network server may store the value in the value of interval remaining field 430 of the casino player database 444 of FIG. 4 of the player's record, as identified by the player's ID number. Storing the value is shown as step 1020. Finally, in step 1022, the player removes the player tracking card.

Figure 11A:
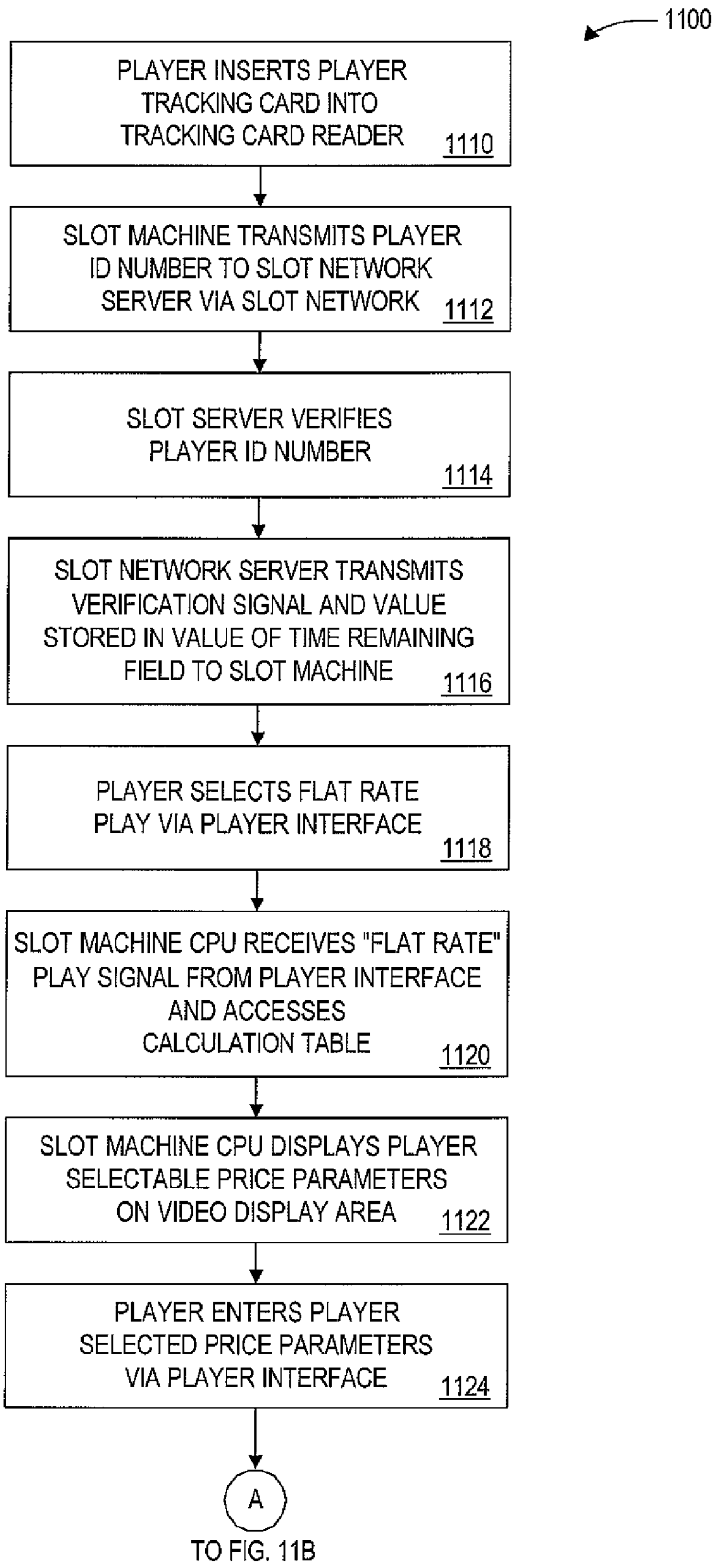
FIG. 11A and FIG. 11B are flow diagrams of a method for resuming play according to some embodiments.
Figure 11B:
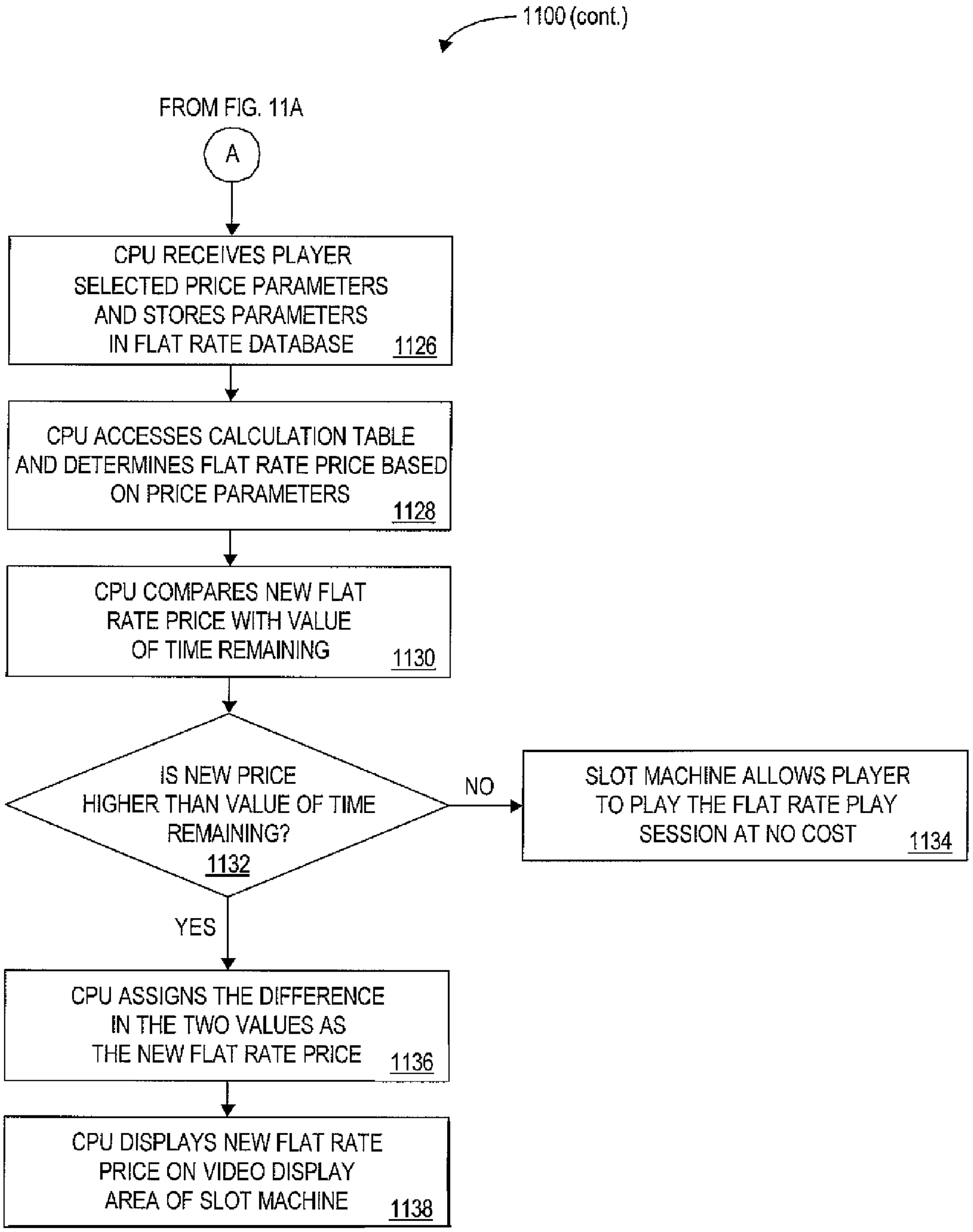

Referring now to FIG. 11A and FIG. 11B, flow diagrams of a method 1100 for resuming play according to some embodiments are shown. In some embodiments, the method 1100 may be similar to the method 800 described in conjunction with FIG. 8A and/or FIG. 8B. The initial operation of the system 100 of FIG. 1 may, for example, proceed normally as indicated by steps 1110-1128.

However, once the CPU of slot machine determines a new flat rate price based on the relevant price parameters, the CPU determines whether the player must deposit additional funds.

Specifically, in step 1130, the CPU compares the new flat rate price with the value of interval remaining. The slot network server transmits the value of interval remaining, as stored in the casino player database 444 of FIG. 4, to the slot machine in step 1116 so that the comparison may be performed. As indicated by step 1132, the comparison involves determining whether the new flat rate price is higher than the value of interval remaining.

If the new price is not higher than the value of interval remaining, then, in step 1134, the slot machine allows the player to play the flat rate session at no cost. However, if the new flat rate price is higher than the value of interval remaining, then, in step 1136, the CPU assigns the difference between the values as the new flat rate price. Thus, in step 1138, the CPU displays the new flat rate price on the video display area of the slot machine. Thereafter, operation of the system continues as described with reference to steps 832-836 of FIG. 8B.

In an alternate embodiment, when a player terminates the flat rate session early, the value of the interval remaining is added to the players credit balance, as stored in the credit balance field 422 of the casino player database 444 of FIG. 4.

It is to be understood that some embodiments need not include both a slot machine and slot network server. For example, an embodiment employing only a slot machine is within the scope of some embodiments. Such an embodiment will now be described with reference to FIG. 12A, FIG. 12B, and FIG. 13, and with continuing reference to FIG. 2, FIG. 5, and FIG. 7. Such an embodiment may generally utilize a gaming device such as the slot machine 102, 202 of FIG. 1, FIG. 2A, and/or FIG. 2B.

Figure 12A:
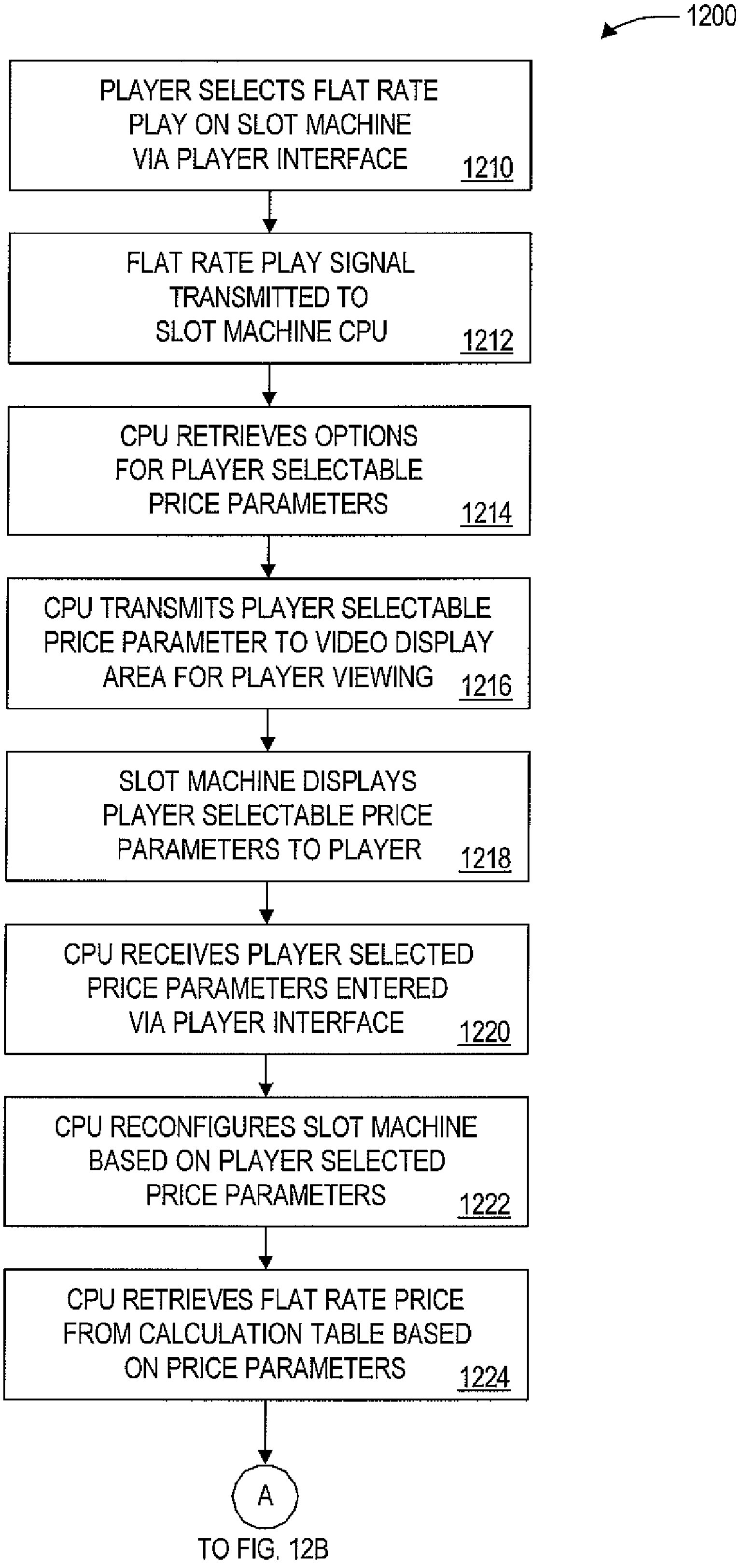
FIG. 12A and FIG. 12B are flow diagrams of a method according to some embodiments.
Figure 12B:
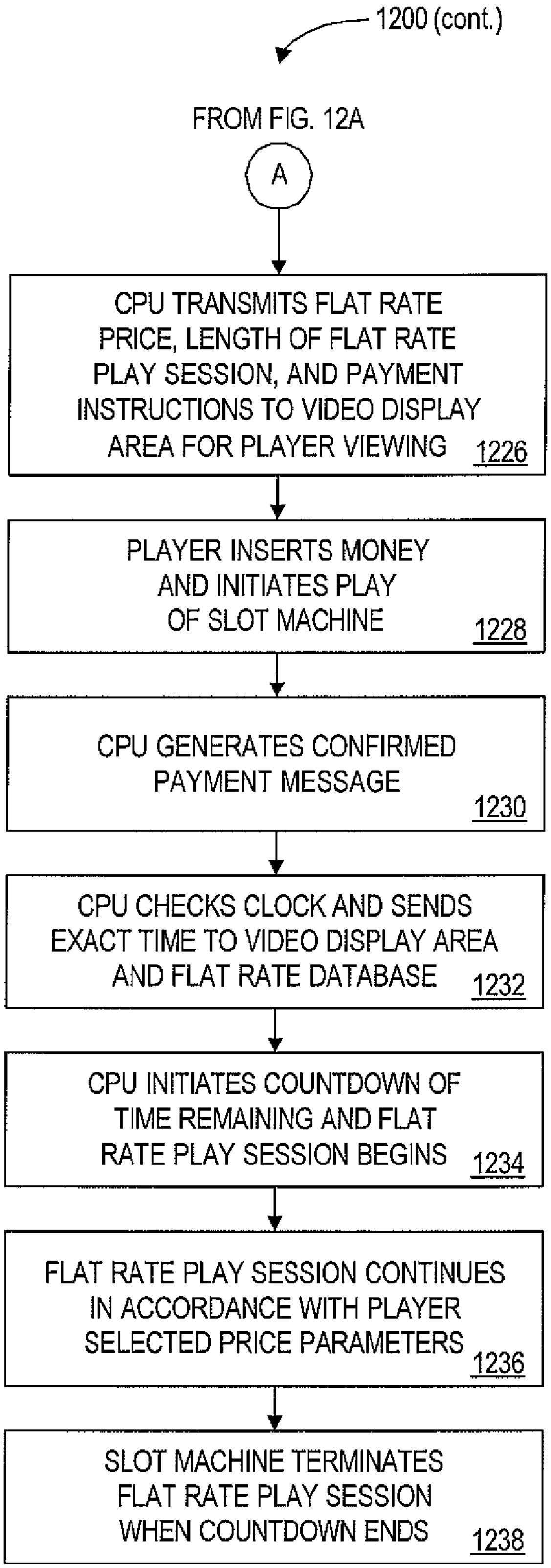

Referring to FIG. 12A and FIG. 12B, for example, flow diagrams of a method 1200 according to some embodiments are shown. In some embodiments, the method 1200 may begin when a player selects flat rate play on the slot machine, in step 1210. Once the player selects flat rate play, the flat rate play signal is transmitted from the player interface to the CPU, in step 1212. The CPU then proceeds, in step 1214, to retrieve the player options for selectable price parameters. Then, in step 1216, the CPU transmits the player selectable price parameter options to the video display area for viewing.

Once the player selectable price parameter options have been displayed to the player, the player inputs the player selected price parameters through the player interface. Then, in step 1220, the CPU receives the player selected price parameters from the player interface.

Once the CPU receives the player selected price parameters, the CPU reconfigures the slot machine. Specifically, the CPU generates a signal, or a flag in memory, indicating that there is no need to accept the coins between plays. The CPU further sets the pay combination status field in the payout table according to the jackpot structure entered by the player. In an alternate embodiment in which the player selectable price parameters include the time between the handle pulls, the CPU sets an internal timer.

Furthermore, once the slot machine CPU receives the player selected price parameters, it proceeds to access the calculation table. By accessing the calculation table, the CPU retrieves the flat rate price for the flat rate play session. Retrieving the flat rate price is shown as step 1224. Once the CPU retrieves the flat rate price, it proceeds to transmit the price, the length of the flat rate play session, and payment instructions to the video display area for player viewing, in step 1226.

In step 1228, the player reads the data and instructions on the video display area and inserts money into the coin acceptor or a bill acceptor in order to initiate play of the slot machine. In an alternate embodiment, the player enters a stored value card such as a "smart card" into the card reader. Such a smart card has the players credit balance stored thereon. Payment using a smart card further entails the CPU debiting the player's balance on the smart card by the amount of the flat rate price. Further, the player may enter a credit card into the card reader.

In step 1230, the CPU generates a confirmed payment message indicating that the player has deposited sufficient funds to cover the flat rate price. Consequently, the CPU, in step 1232, sends the current time to both the video display area and the time audit field of flat rate database. Next, in step 1234, the CPU initiates the countdown of the interval remaining in the flat rate play session. The length of the flat rate play session received from the player may be initially stored in the interval remaining field 516 of FIG. 5. The slot machine decrements, or counts down, this value as the flat rate play session begins.

As shown in step 1236, the flat rate play session continues in accordance with the player selected price parameters, if such parameters affect play, in step 1236. During such play, the CPU stores and updates the player's accumulated credits in memory (such as the RAM 218 of FIG. 2A). In an alternate embodiment, the slot machine pays out jackpots as they occur. Finally, in step 1238, the CPU terminates the flat rate play session when the countdown ends.

In an alternate embodiment, the interval of the flat rate play session is not a time period, but rather is a maximum number of plays. In such an embodiment, the slot machine stores the number of plays in the flat rate database, as described with respect to FIG. 9, and, in step 916, increments a counter for each outcome generated. The counter may be implemented in either software or hardware. Furthermore, in step 918, the slot machine compares the number of plays stored in the flat rate database to the value of the counter. If the value of the counter equals the stored number of plays, then the flat rate play session is terminated.

Figure 13:
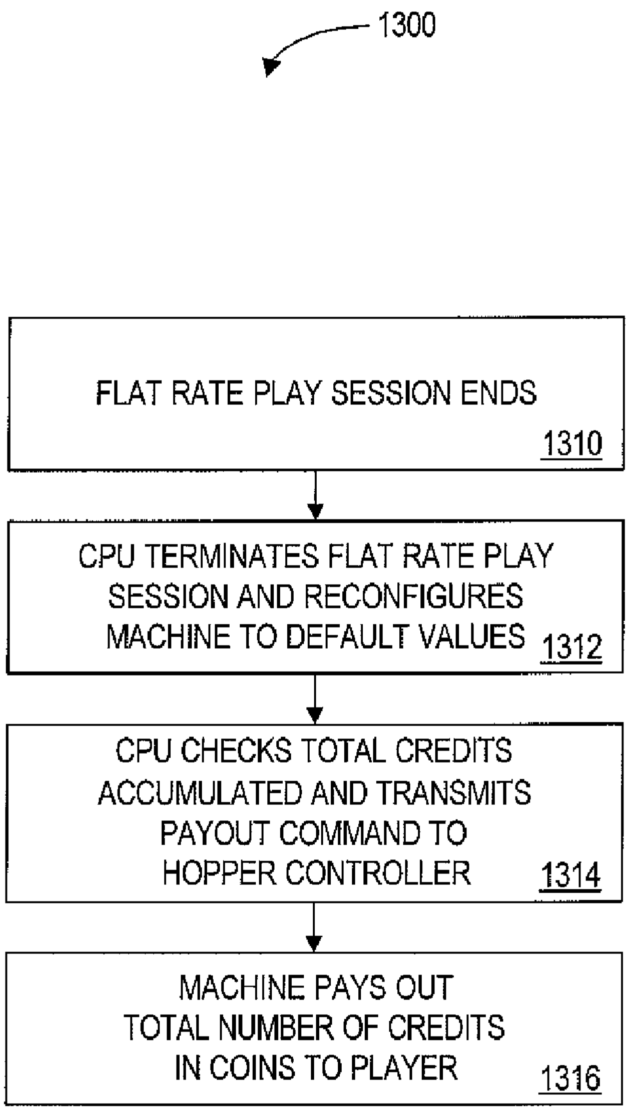
FIG. 13 is a flow diagram of a method for receiving a payout according to some embodiments.

Turning now to FIG. 13, a flow diagram of a method 1300 for receiving a payout according to some embodiments is shown. As shown as step 1310, the flat rate play session generally ends upon the termination of the countdown. Specifically, as shown in step 1312, the slot machine CPU terminates the flat rate play session by reconfiguring the slot machine to its default values. For example, the CPU resets the pay combination status field in the payout table to reflect the original jackpot structure. The CPU also generates a signal indicating that coins must be received for each play. In short, the player selected price parameters are no longer in effect.

In step 1314, the CPU checks the total credits accumulated, as stored in the RAM, and transmits a payout command to a hopper controller (such as the hopper controller 240 of FIG. 2A). Consequently, in step 1316, the slot machine pays out the total number of credits to the player.

Figure 15:
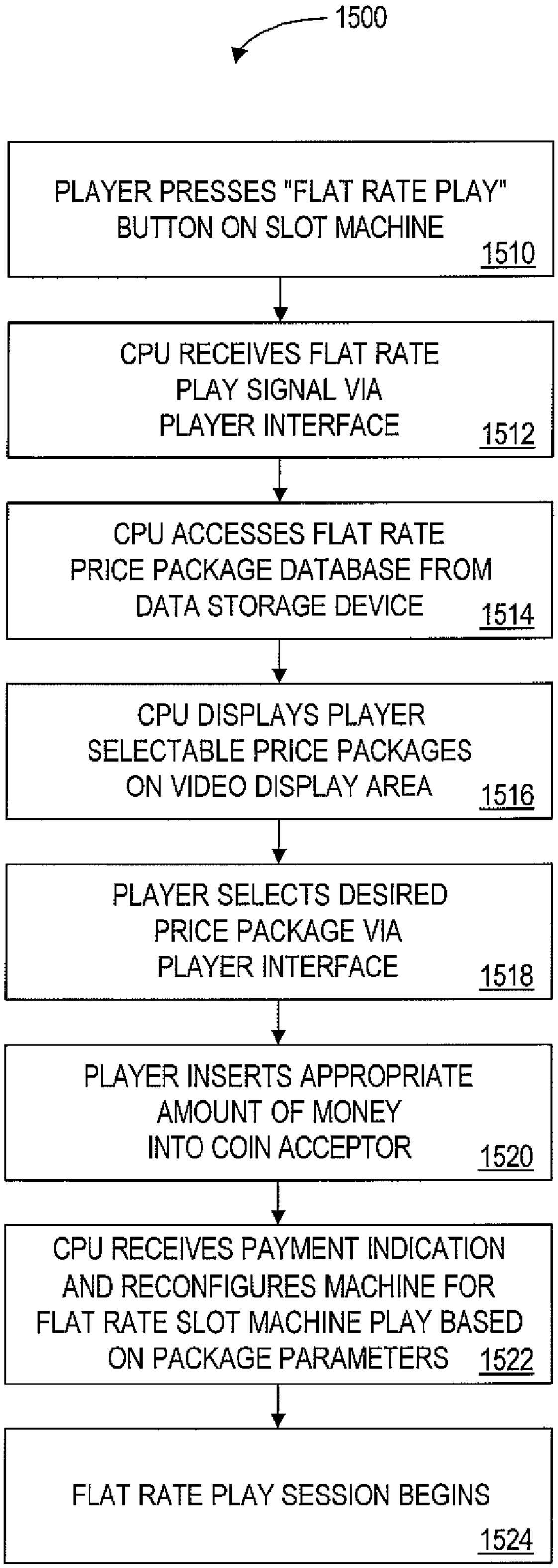
FIG. 15 is a flow diagram of a method according to some embodiments.

An alternate embodiment of the present invention will now be described with reference to FIG. 15. In FIG. 15, for example, a flow diagram of a method 1500 according to some embodiments is shown. The operation of the slot machine 102, 202 of FIG. 1, FIG. 2A, and/or FIG. 2B, may be indicated by the steps 1510-1524 of the method 1500, and proceeds generally as described with reference to FIG. 14. In this embodiment, the player selects from a list of casino determined price packages, rather than choosing individual price parameters. Each price package, as may be stored in the flat rate price package database 229, 1429 of FIG. 2A and/or FIG. 14, is a combination of different price parameters that correspond to a flat rate play session price.

In step 1510, the player presses a “flat rate play” button on the slot machine. The slot machine CPU receives a flat rate play signal from the player interface in step 1512. In this case, the player interface is an actual “flat rate play” button located on the outside of the slot machine. Next, in step 1514, the CPU accesses the flat rate price package database from data storage device 224 of FIG. 2A. The CPU then displays the player selectable price packages on video display area in step 1516. It is to be understood that the CPU need not display the packages on the video display area, as those package options could be displayed elsewhere on the body of the slot machine. Alternatively, the player interface could incorporate several “flat rate play” buttons, each representing a different flat rate price package.

Next, in step 1518, the player selects the desired price package via the player interface. Having already seen what the price of the selected package is, the player then deposits the appropriate amount of money into the coin acceptor in step 1520. For example, the player may have chosen a price package identified by the number four (4) in the package ID field 1410 of FIG. 14, the package costing fifty dollars ($50). In return for fifty dollars ($50) deposited into the slot machine, the player receives two hundred and fifty (250) handle pulls, with three (3) coins wagered per pull, and with the top three (3) jackpots active in his flat rate play session. These parameters are specified in the flat rate price package database 1429 of FIG. 14.

In step 1522, the CPU receives an indication of payment from the coin acceptor and reconfigures the parameters of slot machine to meet the specifications of the flat rate price package selected by the player. Finally, in step 1524, flat rate play begins.

It is noted that the flat rate price package database could be located at the slot network server and not at each individual slot machine. When it is located at the server, certain casino or operator selected parameters could be used to determine the price. For example, there could be different flat rate price packages for different times during the day that are based on projected or actual casino traffic and/or slot machine usage.

As will be appreciated by one of ordinary skill in the art, the key step in getting players to wager money on gaming devices, such as slot machines, is to bring the players to the casino floor. One way in which casinos can bring additional players to the casino floor, and thereby increase total revenues, is by giving away free samples or rewards with a minimum displacement of traditional pay per play players. Some present embodiments may be employed for such a purpose.

In one embodiment, for example, the casino could declare a free play period. During the free play period, likely chosen by the casino to correspond to down time, when most gaming devices are idle, players insert their player tracking cards into the gaming devices and initiate play without being charged. Specifically, the casino programs the calculation table so that the flat rate price is zero for a given time of day and day of the week. It is anticipated that during such a free play period, the casino will alter the jackpot structure, causing only a selected jackpot to be active. Thus, the lure of free jackpots will bring additional players to the casino floor that will likely continue playing after the free play period ends. A further benefit of this embodiment is that it would encourage players to become slot club members. This would result in an increase of players who return to the casino and the customer base that the casino markets to through mailings.

It is also to be understood that play of the slot machines during the free play period need not occur as described above. Thus, in an alternate embodiment, the reels 232, 234, 236 of the slot machines 102, 202 of FIG. 1, FIG. 2A, and/or FIG. 2B continuously spin, regardless of whether a player has inserted a tracking card, with the slot network server periodically signaling a jackpot on a random machine. Only when a player has inserted a player tracking card is the jackpot awarded. The slot network server randomly selects a machine ID number and, if the machine is not being played by a pay-per-play player, the slot network server transmits a signal to that slot machine directing it to produce a winning outcome.

In an alternate embodiment that achieves substantially the same result of attracting additional players to the floor during down times, the casino issues guests a player tracking card or a smart card having a predetermined free credit balance associated therewith. The casino could then restrict the day and time in which the players could use the free card in a flat rate play session. In another embodiment, the cards provided to guests contain an indication of time, rather than money, for use during a flat rate play session.

Although the foregoing embodiments employ static jackpot structure, which stay the same throughout the flat rate play session, it is within the scope of some embodiments to employ dynamic jackpot structures, which change during the flat rate play session. In one such embodiment, the dynamic jackpot structure starts with a given number of active jackpots, as indicated in the pay combination status field 650 of the payout table 628 of FIG. 6. As the flat rate play session progresses, the number of active jackpots changes. Specifically, as the interval remaining in the flat rate play session decreases, fewer pay combinations are made active. In other words, the slot machine CPU monitors the time and, every fifteen (15) minutes, for example, causes the value of the pay combination status field 650 to change from “active” to “inactive” for a given pay combination. Alternatively, the CPU changes the value of the pay combination status field 650 after a predetermined number of plays. In a further variation of this embodiment, individual jackpots may be decreased instead of or in addition to being eliminated (e.g., the jackpot for a particular outcome may decrease from ten (10) coins to eight (8) coins as the play session progresses).

As will be appreciated by those skilled in the art, a dynamic jackpot structure based on the time progression of the flat rate play session can increase the revenue generated by the slot machines. Specifically, such a dynamic jackpot structure could be used with a flat rate play session whose duration is not a fixed time, but rather a given number of plays. Because fewer jackpots will be active as time progresses, players have an incentive to use their fixed number of plays within a short time period. Stated succinctly, some embodiments increases speed of play.

In another embodiment, the jackpot structure is dynamic based not on the progression of the flat rate play session, but rather on the outcomes generated by the slot machine. One such embodiment involves changing a particular jackpot from "active" to "inactive" upon a player hitting the outcome corresponding to that pay combination. For example, a player may begin the flat rate play session with all jackpots active. On one play, the slot machine generates a "CHERRY CHERRY CHERRY" outcome. Upon accessing the payout table, the CPU determines that ten (10) coins are to be paid out, credits the player's accumulated credits accordingly, and causes the value of the pay combination status field 650 of FIG. 6 corresponding to the "CHERRY CHERRY CHERRY" outcome to change from "active" to "inactive". Thus, a player can only hit a given jackpot once. As will be appreciated by those skilled in the art, such a dynamic jackpot structure will allow slot machine operators to further discount the flat rate price to attract additional players. Furthermore, it is anticipated that players will be willing to forego hitting the same jackpot multiple times because their focus is typically on hitting the highest jackpot once.

These and other dynamic jackpot structures may be implemented as either a player selected price parameter or an operator selected price parameter. When implemented as a player selected price parameter, the dynamic jackpot structure is displayed to the player as a player selectable price parameter option. The player, in turn, selects it via the player interface. When implemented as an operator selected price parameter, the dynamic jackpot structure is displayed for player viewing prior to player approval of the flat rate price. Whether the price parameters are selected by the player or the casino operator, the dynamic jackpot structure affects the flat rate price generally as described above, namely, as a field in the calculation table or as a variable in the price algorithm.

In some embodiments, an individual may purchase a flat rate play session as a gift for another person. For example, an individual may purchase one of the available flat rate price packages of FIG. 14. In such an embodiment the individual purchasing a flat rate play session may be provided with a flat rate play session identifier, which the purchase in turn provides to the gift recipient. The flat rate play session identifier may be stored by the casino in association with the price parameters defining the flat rate play session. Thus, when the gift recipient inserts the flat rate play session identifier into a gaming device, the gaming device may communicate with the casino server to determine the parameters of the flat rate play session and set itself in accordance with such parameters. A flat rate play session identifier may be provided on, for example, a gift card that is magnetically or optically encoded with the flat rate play session identifier such that it may be read by a gaming device.

VI. Contract Embodiments

A. Introduction

In accordance with some embodiments, a flat rate play session may be purchased by means of a contract. According to such embodiments a player at a casino may purchase a contract (e.g., from an insurer, such as the casino or another entity) or similar agreement to use a gaming device, such as a slot machine (e.g., the slot machines 102, 202 described herein). Costing a fixed amount, the contract insures the player against the possibility of potentially large losses at the slot machine. In accordance with one such embodiment, upon purchasing the contract, a player credit account is set up at the slot machine. The account may begin with zero credits but may begin with another balance in other embodiments. The player is then allowed a fixed number of handle pulls (and/or a fixed amount of playing time) at the slot machine without requiring the player to insert any money. Each handle pull decreases the player account, typically by decreasing the player account by a predetermined amount (e.g., one credit) for each handle pull. This may cause the number of credits to be negative, but play may still continue. If the player achieves a winning outcome, credits can be added to the player account in accordance with the payout for the winning outcome. If, after the fixed number of handle pulls (and/or the pre-determined amount of playing time), there are a positive number of credits in the player account, then these may be paid out to the player in the form of cash. If, however, there are less than a predetermined amount of credits (e.g., zero credits) in the player account, then the player receives nothing. The insurer, however, could compensate the casino for, e.g., an amount in the player's account that is less than a predetermined number.

In such an embodiment, the player enjoys the fixed number of pulls (and/or a fixed amount of playing time) without the risk of any loss. The only loss for the player comes from the cost of the contract.

One aspect of such embodiments is a way to price a contract for a block of pulls to be sold to a player. Pricing a contract may involve calculating the expected amount that would have to be paid a player upon the completion of the pulls. The price of the contract would then typically be greater than this expected amount (e.g., in the amount of a profit margin) so as to result in an expected profit possibly to be divided amongst the casino and, if it is a separate entity, an insurer. For example, if a player could be expected to receive thirty dollars ($30) upon the completion of one thousand (1000) pulls, then the contract for the block of one thousand (1000) pulls could by sold for thirty-five dollars ($35).

The following definitions generally define the terms used to describe the contract embodiments presented herein:

Contract indicator—an object or information by which a gaming device may recognize a contract in order to execute the contract. For example, a player purchases a contract at casino desk and receives a token that serves as a contract indicator. When the player deposits the token in a gaming device, the gaming device recognizes the contract the player has signed up for and executes the contract accordingly.

Execute a contract—to carry out the terms of a contract. A gaming device executes a contract for two hundred (200) pulls by generating the hundred (200) outcomes, incrementing and decrementing player credits in accordance with the outcomes, and paying the player, if necessary, at the end of the contract.

Gambling contract—An agreement between a player, an insurer, and sometimes a casino (e.g., if different than the insurer) with the following exemplary provisions:

- The player pays the insurer a fixed amount up front.
- The player must make a predetermined number of handle pulls, no more and no less.
- The player need not pay any additional money after purchasing the contract.
- The player keeps any net winnings after all handle pulls have been completed.
- If the player has a net loss after the handle pulls have been completed, then the loss is paid to the casino by the insurer.

There are many variants of these provisions, and fewer or additional provisions are possible. As can be seen, the contract insures a player against excessive losses, and may give the player more handle pulls and/or playing time than would otherwise be possible for the price of the contract. Also, since there may be no additional player decisions required after the player has purchased the contract, the player need not be present for the execution of the contract and may therefore experience the feeling of remote gambling.

Gaming Device—Any electrical, mechanical, or electro-mechanical device that accepts wagers, steps through a process to determine an outcome, and pays winnings based on the outcome. The outcome may be randomly generated, as with a slot machine; may be generated through a combination of randomness and player skill, as with video poker; or may be generated entirely through player skill. Gaming devices may include, for example, slot machines, video poker machines, video blackjack machines, video roulette machines, video keno machines, video bingo machines, and the like.

Gross winnings—the total of a player's winnings during the execution of a contract without regard to wagers made by the player. For example, if, after five (5) pulls of a contract, a player has attained one (1) winning outcome with a payout of four (4) coins, and one (1) winning outcome with a payout of twenty (20) coins, then the player's gross winnings thus far are twenty-four (24) coins. Since gross winnings does not account for wagers a player makes, gross winnings will always be larger than or equal to net winnings.

Handle pull—a single play at a gaming device, including video poker, video blackjack, video roulette, video keno, video bingo, and other devices. The definition is intended to be flexible in that a single play might constitute a single complete game, or a single wager. For example, in video blackjack, a player might play a single game in which he splits a pair of sevens, requiring an additional wager. This single game might thereby constitute either one (1) or two (2) handle pulls.

Net winnings—the total of a player's winnings during the execution of a contract minus the amount spent by the player on wagers. In the example cited under the definition of "gross winnings," the net winnings are nineteen (19) coins since the player has won twenty-four (24) coins but used one (1) coin as a wager on each of the five (5) pulls.

B. Description of the Contract

A typical contract is an agreement between the insurer and a player. The player agrees to pay a fixed amount of money up front. In return, the player may (or must) gamble and/or play at a gaming device for a designated amount of time or for a designated number of outcomes. After the player has gambled the requisite amount, the player has the right to keep any winnings that exceed a certain threshold. The player does not, however, pay any losses. Thus, one function of the contract is to insure the player against losses at a gaming device. There are many variations of the contract and a portion of these is described below.

Another function of the contract is to allow a player to play a large number of handle pulls without the need of a large bankroll. For example, a player wishing to make six hundred (600) pulls at a quarter ($0.25) slot machine would ordinarily require one hundred and fifty dollars ($150; $0.25×600 pulls) in order to assure himself the ability of completing the six hundred (600) pulls. However, a contract might allow a player to make six hundred (600) pulls by paying, for example, only twenty dollars ($20).

In some embodiments, the contract does not involve an insurer. The function of the contract may be to allow outcomes to be generated for the player while the player is not physically present at the gaming device. In these embodiments, the contract may consist mainly of instructions from the player as to how the slot machine should gamble on the player's behalf. For example, the instructions will tell the machine how fast to gamble, when to quit, and then where to send winnings.

1. Amount of Play

A contract may place one or more of the following exemplary restrictions on play covered by the contract:

- The player must make a minimum number of handle pulls.
- The player may not make more than a maximum number of handle pulls.
- The player must play for a certain minimum time period.
- The player must play for less than a certain maximum time period.
- The player must maintain a minimum rate of play.
- The player may not exceed a maximum rate of play.
- The total coin in over the course of the contract must exceed a certain minimum amount.
- The total coin in over the course of the contract must not exceed a certain amount.
- The player must play until obtaining a specified outcome.

2. Coin Denomination

A contract may also or alternatively specify the size of the wager for each pull. The wager size may be the same as that typically used by the gaming device. For example, if a player signs up for a contract at a quarter ($0.25) slot machine, the wager for each pull of the contract might be a quarter ($0.25). If the slot machine offers multiple coin bets, the wager for each pull might be a quarter ($0.25), fifty cents ($0.50), seventy-five cents ($0.75), etc. The contract may allow or may force the player to vary the wager from pull to pull.

One aspect of a contract may allow all play to occur in "credit mode." That is, the player need not physically insert money into the gaming device prior to each pull, and money needn't come out of the gaming device after a player win. Rather, a player's credit balance may be stored in a player database either in the gaming device or at the casino server. Every time the player then makes a handle pull, credits are deducted from the player's balance. Every time the player wins, credits are added to the player's balance. The player's credit balance can be displayed on the device so that the player may track his progress.

Since play may occur in credit mode, each wager might consist of coin denominations that are not standard for the gaming device. For example, a device that typically handles quarters may accept wagers of a nickel ($0.05), of forty cents ($0.40), or even of twelve and one half cents ($0.125).

3. Winnings Threshold

A contract may also or alternatively describe some threshold of gross winnings, net winnings, and/or accumulated player credits above which the player keeps any excess. Gross winnings describe the accumulated player wins from each pull of the contract. Thus, a player who makes six hundred (600) pulls on a one dollar ($1) slot machine as part of a contract and wins three dollars ($3) on each of one hundred (100) pulls has gross winnings of three hundred dollars ($300; $3/pull×100 pulls). Net winnings are the gross winnings less the accumulated costs of wagering. In the above example, the accumulated costs of wagering are six hundred dollars ($600; $1/pull×600 pulls). Thus, in the above example, the player's net winnings would be negative three hundred dollars (−$300; $300−$600). Accumulated player credits may mirror a running tally of a player's net winnings. For example, a player may begin with zero (0) credits, with credits deducted in the amount of any wager, and added in the amount of any winnings. Accumulated player credits may also mirror a running tally of gross winnings, or any other statistic about a player's performance.

At the end of a contract, a player's accumulated credits may be compared to a threshold. The player may then receive a payout of any excess accumulated credits above the threshold. For example, if the threshold is zero (0), and the player has forty-four (44) credits, each credit representing twenty-five cents ($0.25), then the player receives a payout of eleven dollars ($11; 44 credits×25 cents/credit). If the player had negative twelve (−12) credits, indicating a net loss of twelve (12) credits, then the player receives nothing. The player does not owe three dollars ($3) because the contract does not make the player responsible for any losses.

The threshold might be at ten (10) credits, in which case a player with accumulated credits of thirty (30) would receive a payout equivalent to twenty (20) credits at the end of a contract, and a player with six (6) credits would receive nothing. A threshold might be at negative ten (−10) credits, in which case a player with accumulated credits of negative six (−6) would receive the equivalent of four (4) credits, while a player with negative one hundred (−100) credits would receive nothing.

Rather than insuring against all of a player's losses, a contract might insure all losses up to a point and not beyond. Therefore, a contract may have multiple thresholds, each with different functions. A player may, for example, be responsible for any losses beyond a threshold loss of one hundred (100) credits. The same player might receive any winnings beyond a threshold of ten (10) accumulated credits. Thus, if, at the end of the contract, the player has accumulated negative one hundred and twenty-five (−125) credits, then the player must pay twenty-five (25) credits. If the player has accumulated thirty-three (33) credits, then the player receives a twenty-three (23) credit payout. If the player has accumulated negative forty-nine (−49) credits, then the player neither owes nor receives anything.

In some embodiments, a threshold delineates a change in the percentage of a player's winnings or losses between credit tallies above and below the threshold. For example, a player might keep any credits won beyond a threshold of fifty (50) Below fifty (50) credits, the player only keeps eighty percent (80%) of his winnings. Therefore, if a player has seventy (70) credits remaining at the end of a contract, he keeps all twenty (20) credits above fifty (50), and he keeps an additional forty (40) credits, representing eighty percent (80%) of the first fifty (50) credits. Therefore, the player keeps sixty (60) credits in total.

A player may also be responsible for a percentage of losses above or below a certain threshold. For example, a player may be responsible for fifty percent (50%) of losses over ten (10) credits. Thus, a player who finishes a contract with negative twenty (−20) credits owes nothing for the first ten (10) credits of loss, but owes five (5) credits for the next ten (10) credits of loss. The player therefore owes five (5) credits.

In the most general sense, a contract specifies a functional relationship between what a player's accumulated credits are at the end of the contracted number of pulls, and what the player either owes or is due. The function may be piece-wise linear, or may be rather non-linear and convoluted.

Where there is potential for a player to owe money at the end of a contract, the player may be required to deposit money into the gaming device in advance so as to prevent the player from walking away when he owes money. The advance payment may later be returned if the player turns out to owe nothing at the end of the contract.

In many embodiments, a contract is transparent to the casino. In other words, if the player makes a certain number of pulls, the casino makes the same amount of money whether or not the player happened to be involved in a contract. In these embodiments, however, a casino may collect money that it makes (and the player has lost) from the insurer, rather than from the player. The casino may also act as an intermediary in transactions between the player and the insurer. For example, the casino may collect from the player money that is meant to pay for a contract. The casino may then transfer an equivalent amount of money to the insurer.

In other embodiments, a contract is not completely transparent to the casino. That is, the amount of money a casino receives after a certain number of the player's handle pulls may depend on whether or not the player was in a contract. In one example, a casino agrees that if a player's accumulated credits at the end of a contract are less than negative two hundred (−200), then the casino will only collect two hundred (200) credits for the contract's handle pulls. This example may benefit the insurer, since the insurer doesn't have to worry about covering player losses in excess of two hundred (200) credits. In another example, the casino configures a gaming device to give different odds to a player in contract play versus a player not in contract play.

4. Player Decisions

As mentioned previously, players may have some restrictions on the play covered by the contract. For example, a contract may cover an hour's play at a gaming device, but require the player to make between six hundred (600) and eight hundred (800) pulls in that hour. In some embodiments, however, contracts may allow players to quit early or to play more than is otherwise covered by the contract. For example, a contract might cover an hour's worth of play. After the first half-hour, the player may be ahead by one hundred dollars ($100) and wish to quit without risking the loss of the one hundred dollars ($100) in the subsequent half-hour. The player may therefore opt to pay twenty dollars ($20), and/or some other determined amount, in order to be released from the obligation of continuing the contract. The player may then collect the one hundred dollars ($100) in winnings.

A player at a gaming device may reach the end of a contract with accumulated credits just short of an amount necessary to collect winnings. However, the last seventeen (17) out of twenty (20) pulls may have been wins for the player. The player may feel as if there is some momentum going and therefore may not wish that the contract be finished. In some embodiments, the player may extend the contract. For example, the gaming device might prompt the player, saying, "For only $5 more, we'll give you another 200 spins added to your contract." If the player accepts, then the casino or insurer has made a new sale with potential profitability. In some embodiments, the player may be allowed to extend a contract for free, or may even be paid to extend the contract. For example, the player may have winnings of one hundred dollars ($100) at the end of a contract. The casino, or insurer, may determined and/or estimate that if the player were to keep pulling, some of the one hundred dollars ($100) would likely be lost by the player. So the casino may pay the player five dollars ($5), and/or some other determined amount, to take another two hundred (200) pulls.

In a related embodiment, a player may carry over the accumulated credits from a first contract to a second contract. Thus, a player with forty (40) accumulated credits at the end of a first contract may begin a second contract with forty (40) accumulated credits. The player may pay or be paid for carrying over credits.

5. Price

In many embodiments, the player pays a fixed sum to buy the contract. In exchange for that fixed sum, the player can then gamble a significant amount with little or no risk of losses. In many embodiments, the insurer takes the risk of the player's loss. The insurer must therefore price the contract so as to be compensated for the risk it takes. In other embodiments, the casino and the insurer share the profits and losses associated with a contract. To ensure a profit to be divided amongst the two, a contract may be priced in excess of a player's average win. Note that a player's loss would generally count as zero (0) in figuring out the player's average win, since the player does not have to pay for losses.

One method of pricing the contract involves first figuring out what the insurer might expect to pay, on average, to cover a player's losses. Another method of pricing a contract involves first figuring out what the casino/insurer combination might expect to pay, on average, to compensate a player for his winnings. Both methods may involve similar computations. Therefore, exemplary computations will be described below, at any given time, with respect to only one of many available methods of pricing a contract.

Once the insurer and/or casino determine an expected cost, on average, to cover a player's losses pursuant to a flat rate play contract, the insurer and/or casino may price the contract so as to provide a desired profit margin. For example, if the insurer and/or casino can expect to pay, on average, fifteen dollars ($15) to cover a player's losses, then the insurer and/or casino might price the contract at twenty dollars ($20) to insure a five-dollar ($5) average profit.

a) Exemplary Pricing Methods (1) Reactive Pricing

In some embodiments, a casino and/or insurer may start with a first price for a contract, and then evolve the price as more and more of the contracts are purchased and executed. For example, if an insurer loses money on the first few contracts it sells, then it may increase the price of the contract for future sales. If the insurer makes large profits on its first few contracts, then it may reduce the price. In such a manner, for example, flat rate play contracts may be priced reactively based on actual contract costs historically experienced by the casino and/or insurer. According to some embodiments, a device such as a gaming device and/or server may be utilized to automatically analyze actually realized contract costs to determine expected future costs associated with contracts.

(2) Simulation

In some embodiments, flat rate session play pursuant to a contract (e.g., as defined by one or more parameters described herein) may be simulated to determine an expected cost of the contract. Such simulation may take many forms including, but not limited to manual and/or automatic gamin device testing and/or software-based gaming device testing (e.g., virtual testing).

According to some embodiments for example, the insurer and/or casino may obtain a gaming device and/or a component of a gaming device containing significant information about the operation of the gaming device (e.g., the CPU and/or memory). The insurer and/or casino then operate the gaming device as a player would when playing under a contract. For example, if the insurer is to sell contracts for six hundred (600) pulls, the insurer would make six hundred (600) handle pulls at the gaming device and record the number of accumulated credits at the end of the six hundred (600) pulls. The insurer may repeat this process of testing contracts at the device for a large number of trials. The insurer may then average the simulated payments over all the trials. Note that while it might take a player days or years to complete, say, one hundred thousand (100,000) contracts at a gaming device, the process may be sped up for the insurer by giving the gaming device special instructions to generate outcomes more rapidly. The performance of such large numbers of trials in the manner described above is often called a Monte-Carlo simulation.

The following is an example of pricing a contract via simulation. Using a simulation process, an insurer simulates the execution of a six hundred (600) pull contract. The insurer repeats the simulation four (4) more times. After the first simulation, the player has won ten dollars ($10). After the second, the player has lost five dollars ($5). After the third, the player has lost seventeen dollars ($17). After the fourth, the player has lost eight ($8). After the fifth, the player has won three ($3). To figure out what the insurer must pay, on average, the insurer adds the three (3) losses to get: five dollars ($5)+seventeen dollars ($17)+eight dollars ($8)=thirty dollars ($30). The insurer then divides by five (5), the number of simulations, to get: thirty dollars ($30)/five (5)=six dollars ($6). It is not generally important, for the purposes of this calculation, how much the player won when wins were made, since the casino is the one paying the player the winnings. Now, in order to obtain an average four ($4) profit, for example, the insurer might charge ten dollars ($10) for each contract.

In some embodiments, the insurer obtains or creates software that mirrors or models the operation of the gaming device. For example, the software is configured to generate the same outcomes, as does the gaming device with the same frequency as the gaming device. For each outcome generated, the software tracks what a player's accumulated credits would be. As before, the insurer (and/or casino) may simulate many contracts and average the simulated payments over all the trials to determine an expected average cost of the flat rate play contract.

(3) Mathematical Modeling

According to some embodiments, the insurer may mathematically model potential outcomes of one (1) handle pull of a gaming device using a random variable with a Probability Mass Function (PMF) and/or a Probability Density Function (PDF). With these functions, the x-axis of a graph may represent potential winnings, such as negative one dollar (−$1) or three dollars ($3), which can occur from a single handle pull. The example of negative one dollar (−$1) indicates the player has paid one dollar ($1) for the pull but has won nothing. The example of three dollars ($3) indicates that the player has paid one dollar ($1) for the pull and won four dollars ($4). The y-axis of the graph of these functions represents the probability and/or probability density of each outcome occurring. The probability of the player getting negative one dollar (−$1) on a pull might be eight tenths (0.8), for example, while the probability of the player getting three dollars ($3) might be two tenths (0.2). A PMF for the number of accumulated credits at the end of a contract can then be created by summing the random variables representing individual handle pulls. If each pull is independent with an identical PMF, as is common with gaming devices, then the PMF for the results of the entire contract can be created using repeated convolutions of the PMF's for individual handle pulls. If, for example, six hundred (600) pulls are involved, then the PMF for single a handle pull may be convolved with itself five hundred and ninety-nine (599) times to generate a PMF for the entire contract. Using this resultant PMF, the insurer can easily calculate how much it would expect to pay to cover a player's losses on each contract. If the resultant random variable is denoted by "w", and the insurer would by required to pay for any player losses, then the insurer's expected payment or cost is given by "Formula (3)", as:

$$cost=\sum_{-\infty}^{0} w*probability(w). \quad (3)$$

In the mathematical simulation method described above, Fourier Transforms, Z transforms, Laplace Transforms, and/or other transforms can be used to aid in the calculation of the repeated convolutions. Such a use of transforms is well known in the art.

Also as is well known in the art, with many classes of random variables, repeated summation results in a Gaussian probability distribution. This distribution has the shape of the familiar bell curve. The Gaussian distribution has the advantage of being fully described by only two parameters, a mean and a standard deviation. If a Gaussian probability distribution is used to approximate the sum of a large number of independent, identically distributed random variables, such as those that often describe handle pulls, then the mean and standard deviation of the Gaussian distribution is very easily calculated based on the mean and standard deviation of a random variable describing an individual pull. Such calculations are well known in the art. Thus, a Gaussian distribution can easily be generated to approximate the PMF of a player's accumulated credits at the end of a contract. Using this distribution, the insurer can calculate the amount it would be required to pay, on average, to cover a player's losses. The method of calculation is similar to that already described. If a Gaussian PDF is used as an approximation, then an integral sign replaces the summation sign, and "probability" is replaced by "probability density."

The following is an example of using a Gaussian probability density function to approximate the amount a casino would be required to pay, on average to, to compensate a player for his winnings at the end of a contract. The contract may then be priced in excess of this amount to ensure an average profit for the casino/insurer combination. A Gaussian function is given by "Formula (4)", as:

$$f(x)=1/\sqrt{(2\pi\sigma)}\exp(-(x-\mu)^2/(2\sigma^2)) \tag{4}$$

In "Formula (4)", "σ" is the standard deviation, and "μ" is the mean. Now, let us suppose that a single handle pull of a slot machine results in a required payout to the player described by a probability mass function with mean "$\mu_0$" and standard deviation "$\sigma_0$". Then, assuming each handle pull is independent, "n" handle pulls of the slot machine may be described by a function with mean "$\mu=\mu_0 n$" and standard deviation "$\sigma=\sigma_0\sqrt{n}$". Furthermore, if "n" is large, then the function describing a casino's aggregate payout after "n" handle pulls may be approximated by the Gaussian function "f(x)", defined by "Formula (4)".

To calculate what a casino would have to pay to compensate a player for his winnings, on average, we note that the casino pays when the player wins, but receives nothing when a player loses. Therefore, the expected payment of the casino is given by "Formula (5)", as:

$$\int_{-\infty}^{0} 0 f(x)dx+\int_{0}^{\infty} x*f(x)dx=\int_{0}^{\infty} x*f(x)dx. \tag{5}$$

We proceed to solve the integral:

$$\begin{aligned}
\int_{0\infty} x*f(x)\,dx &= \int_{0\infty} x*1/\sqrt{(2\pi\sigma)}\exp(-(x-\mu)^2/(2\sigma^2))\,dx \\
&= 1/\sqrt{(2\pi\sigma)}\int_{0\infty} x*\exp(-(x-\mu)^2/(2\sigma^2))\,dx \\
&= 1/\sqrt{(2\pi\sigma)}\int_{0\infty} [(x-\mu)*\exp(-(x-\mu)^2/(2\sigma^2)) + \\
&\quad \mu*\exp(-(x-\mu)^2/(2\sigma^2))]dx \\
&= 2\sigma^2/\sqrt{(2\pi\sigma)}*(-1/2)*[\exp(-(x-\mu)^2/(2\sigma^2))]_{0\infty} + \\
&\quad \mu\int_{0\infty} 1/\sqrt{(2\pi\sigma)}\exp(-(x-\mu)^2/(2\sigma^2))\,dx
\end{aligned}$$

We deal with the two terms separately:

$$\begin{aligned}
2\sigma^2/\sqrt{(2\pi\sigma)}*(-1/2)*[\exp(-(x-\mu)^2/(2\sigma^2))]_{0\infty} &= -\sigma^2/\sqrt{(2\pi\sigma)}*[0-(-\mu^2/(2\sigma^2))] \\
&= \sigma^2\exp(-\mu^2/(2\sigma^2))/\sqrt{(2\pi\sigma)} \\
&= n\sigma_0^2\exp(-n^2\mu_0^2/(2n\sigma_0^2))\big/\sqrt{\left(2\pi\sqrt{n}\sigma_0\right)} \\
&= n^{3/4}\sigma_0^{3/2}\exp(-n\mu_0^2/(2\sigma_0^2))/\sqrt{(2\pi)}
\end{aligned}$$

and $$\mu\int_{0\infty} 1/\sqrt{(2\pi\sigma)}\exp(-(x-\mu)^2/(2\sigma^2))\,dx = \mu\int_{-\mu/\sigma\infty} 1/\sqrt{(2\pi\sigma)}\exp(-y^2/2)\sigma\,dy$$

(where $y=(x-\mu)/\sigma$)

$$= \mu\sqrt{\sigma}\int_{-\mu/\sigma\infty} 1/\sqrt{(2\pi)}\exp(-y^2/2)\,dy$$

$$= \mu\sqrt{\sigma}\left[1-\int_{-\infty-\mu/\sigma} 1/\sqrt{(2\pi)}\exp(-y^2/2)\,dy\right]$$

The integral is the cumulative distribution function for a zero mean, unit standard deviation Gaussian, for which tables exist. We denote it by "N(−μ/σ)". Continuing:

$$\begin{aligned}
\mu\int_{0\infty} 1/\sqrt{(2\pi\sigma)}\exp(-(x-\mu)^2/(2\sigma^2))\,dx &= \mu\sqrt{\sigma}[1-N(-\mu/\sigma)] \\
&= n\mu_0 n^{1/4}\sqrt{\sigma_0}\left[1-N\left(-n\mu_0/\left(\sqrt{n}\sigma_0\right)\right)\right] \\
&= n^{5/4}\mu_0\sqrt{\sigma_0}\left[1-N\left(-\sqrt{n}\mu_0/\sigma_0\right)\right]
\end{aligned}$$

Recombining the two terms we get "Formula (6)", as:

$$\int_{0\infty} x*f(x)dx=n^{3/4}\sigma_0^{3/2}\exp(-n\mu_0^2/(2\sigma_0^2))/\sqrt{(2\pi)}+n^{5/4}\mu_0\sqrt{\sigma_0}[1-N(-\sqrt{n}\mu_0/\sigma_0)] \tag{5}$$

If we were to graph the above as a function of "n", the number of pulls, we would see that initially, as the number of pulls in a contract gets larger, a casino could expect to pay more money to compensate a player for his winnings. However, there would reach a point, beyond which more pulls in a contract would actually decrease the amount a casino could expect to pay to compensate a player for his winnings. This illustrates an important feature of contracts. Having more pulls in a contract is not necessarily an advantage for a player.

(4) Reverse or "Budget" Pricing

Figure 16:
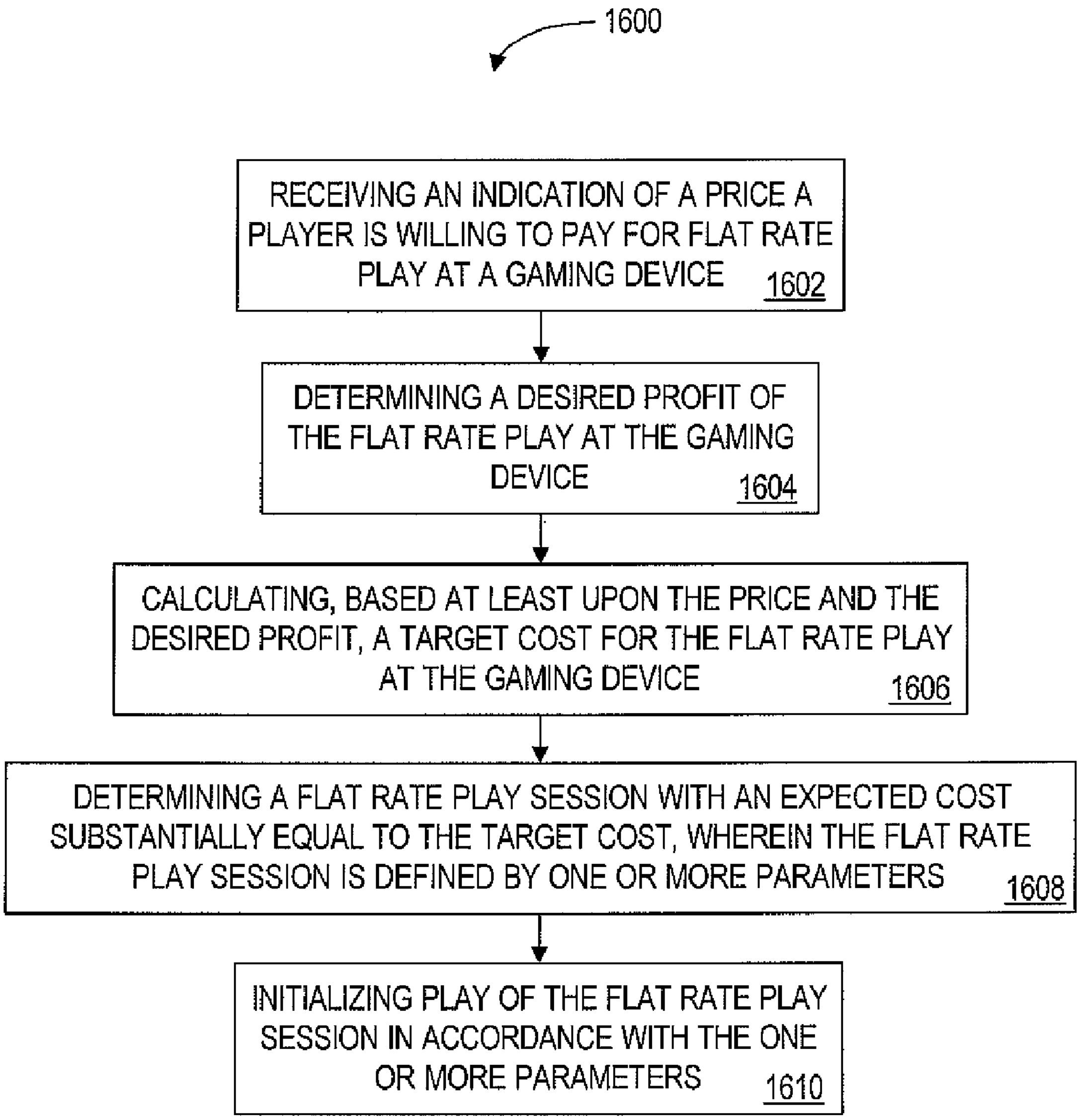
FIG. 16 is a flow diagram of a method according to some embodiments.

In some embodiments, a gaming device and/or server may alternately or additionally be configured to determine parameters of a contract or session based on a player-requested price (and/or other player-defined parameter). Referring to FIG. 16, for example, a flow diagram of a method 1600 according to some embodiments is shown. In some embodiments, the method 1600 may begin at 1602 by receiving an indication of a price a player is willing to pay for flat rate play at a gaming device. For example, a player may choose a price from a menu and/or enter or define a price that the player would like to pay for flat rate play at a gaming device. According to some embodiments, this "budget" may simply be defined as a number of credits that the player has accrued and/or entered into a gaming device. In some embodiments, the "price" may in fact comprise a definition of one or more parameters (and/or values thereof), which may or may not include a price parameter. A player may specify and/or indicate, for example, that the player wishes to play for a flat rate for a specific amount of time (e.g., the player wishes to play for ten minutes (10-min), such as the amount of time until a show starts).

The method 1600 may then continue, at 1604 for example, by determining a desired profit of the flat rate play at the gaming device. The gaming device and/or server may lookup a stored indication of a desired profit margin and/or profit rate to be associated with the gaming device, flat rate play contracts or sessions, particular games, etc. In some embodiments, such a desired profit may be set, defined, and/or established or managed by an operator. According to some embodiments, the desired profit may be determined (e.g., looked-up and/or calculated or algorithmically-defined) dynamically and/or in real time (e.g., based on stored rules, current machine usage, time of day, and/or other factors).

According to some embodiments, the method 1600 may continue by calculating, based at least upon the price and the desired profit, a target cost for the flat rate play at the gaming device, at 1606. The target cost for the flat rate play may, for example, simply be the price (e.g., retail price) of the session or contract less a profit margin. In the case that the desired profit is expressed in terms of a desired profit rate, the desired profit margin may be derived by multiplying the rate by a duration of the flat rate play (e.g., time and/or number of plays). In some embodiments, multiple durations may be tested and/or analyzed to determine the target cost to be associated with a desired profit rate. Pre-determined durations in intervals of half an hour may be multiplied by the desired profit rate, for example, to derive various desired profit margins for the different durations. Target costs may then be determined for each of the flat rate play durations. According to some embodiments, the target cost and/or other metrics may simply be retrieved from memory and/or looked up via a table.

In some embodiments, the method 1600 may continue at 1608 by determining a flat rate play session with an expected cost substantially equal to the target cost, wherein the flat rate play session is defined by one or more parameters. The gaming device or server may utilize the target cost to query a database of available flat rate play sessions or contracts, for example. According to some embodiments, the expected cost of flat rate play sessions or contracts may be determined, such as via any of the methods described herein. In some embodiments, the one or more parameters may be determined. Instead of retrieving flat rate play sessions with expected costs substantially matching the target cost (and/or costs), for example, different values for one or more session parameters may be tested to determine which combinations of values for the parameters may result in expected session costs substantially equal to the target cost. In some embodiments, such an analysis (and/or retrieval from memory) may result in a plurality of available flat rate play sessions and/or contracts that have expected costs that substantially match the target cost. Rules and/or algorithms may then be used, for example, to determine which of the flat rate play session s or contracts to offer to the player. In such a manner, for example, the player may simply define a "budget" that the player wishes to utilize for flat rate play at a gaming device, and the parameters of the particular flat rate play session or contract may then be determined and offered to the player. In some embodiments, the player may be allowed to choose between a plurality of available sessions or contracts having different parameters (and/or values thereof) but generally having similar prices (e.g., substantially equivalent to the player's "budget", or at least less than the player's budget). It should be understood that different games and/or game types may yield quite different parameters for the same or similar retail price. One game may be available for a "budget" price and comprise one hundred (100) plays, spins, or hands, for example, while another game may be available for the same price yet may comprise four hundred (400) plays, spins, or hands. In some embodiments, such as in the case that the player's budget is too low, the closest session with a price higher than the budget may be offered to the player provided the player provides the difference between the budget and the session price (e.g., by depositing more coins or credits).

The method 1600 may continue, according to some embodiments, by initializing play of the flat rate play session in accordance with the one or more parameters, at 1610. In the case that the player accepts the offer for the automatically defined session, for example, the gaming device and/or server may automatically initiate the accepted flat rate play session or contract. In some embodiments, the session may only be initiated or deemed accepted once the player provides the "budget" price. In the case that the price is based on credits already available to the player via the gaming device, the credits may automatically be made available to purchase the accepted flat rate play session or contract. In some embodiments, the player may automatically accept the device-determined session before determination of the parameters (or some parameters). After winning, providing, and/or accruing a certain amount of credits at a gaming device, for example, the player may indicate (e.g., via a menu) that the player wishes to purchase a flat rate play session of a certain duration (or minimum duration) for the amount of available credits. The player may commit to the purchase provided that the automatically determined session or contract meets one or more criteria specified by the player (such as the minimum duration, a certain wager amount per play, etc.).

As an example of such reverse or "budget" pricing and/or parameter determination, a player may simply approach a gaming device, enter (e.g., using a keypad) or select (e.g., by pressing an icon of a touch-sensitive display screen) a particular price, and a gaming device may then output a menu of available contracts or sessions based on the price. For example, for a retail price of twenty dollars ($20), a casino may be willing to offer any contract with a contract cost of fifteen dollars ($15) or less. Further, in one example, based on the price requested by a player and an hourly profit rate specified by an operator, a gaming device and/or server may be configured to determine appropriate parameters of a "custom" contract. For example, if a player enters a price of seventeen dollars ($17), and an operator has entered a desired hourly profit rate of nine dollars ($9), the player may be offered a variety of thirty-minute (30-min) contracts or sessions with associated expected costs of four dollars ($4), one-hour (1-hr) contracts or sessions with associated expected costs of eight dollars ($8), and/or forty-five-minute (45-min) contracts with associated expected costs of six dollars ($6). In this manner, the retail price of a gaming contract or flat rate play session may be determined. A player may then purchase the gaming contract or flat rate play session as described herein, and play within the contract or session may commence.

b) Pricing Examples

Flat-rate game play gives a player a fixed amount of time and/or number of plays, of a particular game. Conversion between fixed time and fixed plays involves simply specifying a rate of play. For example, given an expected rate of play of five hundred (500) hands of video poker per hour, selling two hundred and fifty (250) hands or thirty (30) minutes amounts to the same thing. The methodology described here provides for a determination of the contract cost for a fixed number of hands. Given an expected rate of play, it is straightforward to convert the number of hands into a fixed period of time.

Flat-rate play, as opposed to conventional (or "transactional") play, guarantees the player that they will not pay any more than the retail price of the session. In other words, the players' net losses are absorbed by the casino and/or insurer. Any net win for the session, however, is still paid out. The contract cost of a session is, generally, the expected amount of money, on average, that the casino will have to pay each player. The price of the flat rate play session and/or contract may then simply comprise the expected cost plus a profit margin, as described herein.

(1) Parameter-Based Pricing Example

In many embodiments, prices of various flat rate sessions or contracts may be determined based on a variety of associated parameters, such as the duration of the contract, the wager amount per game play, the starting balance of the contract, active payouts associated with the contract, and so on. Any of various available pricing methods (such as those described herein) may, for example, be utilized to price contracts defined by one or more contract parameters.

For example, in one or more embodiments, an operator (e.g., a casino and/or an insurer) may calculate (e.g., by way of repeated mathematical simulation) the average amount expected to be paid out to a player of a gaming contract when the contract comprises various parameters. For example, it may be determined that the average "contract cost" (e.g., the average amount paid out to players upon resolution of a gaming contract) is ten dollars and three cents ($10.03) for a draw video poker contract characterized by the following parameters:

- Contract duration/interval: thirty (30) minutes or two hundred and fifty (250) hands of draw poker
- Wager amount per hand: twenty-five cents ($0.25)
- Starting balance: zero (0) credits (each wager deducts one (1) credit, such that the player's balance can be negative)
- Active pay combinations: Royal Flush pays four thousand (4,000) credits, Straight Flush pays fifty (50) credits, Four of a Kind pays twenty-five (25) credits, Full House pays nine (9) credits, Flush pays six (6) credits, Straight pays four (4) credits, Three of a Kind pays five (5) credits, Two Pair pays two (2) credits, Jacks or Better pays one (1) credit
- Threshold above which player may collect winnings: zero (0) credits Thus, after simulating play of a gaming contract with the above parameters, it may be determined that the following expression is true:

$$\frac{\left(\begin{array}{l}\text{Total number of players finishing with a positive balance}\cdot\\ \text{Average amount won by players with a positive balance}\end{array}\right)}{\text{Total numbers of players}}=\$10.03$$

Accordingly, as described, this contract cost (or base price) may be used to calculate a retail price (e.g., a flat rate price to be paid by players when purchasing a gaming session). For example, an operator may multiply the contract cost by a desired margin to arrive at a retail price (e.g., $10.03·1.5=$15.05, establishing a fifty percent (50%) profit margin). In other embodiments, an operator may calculate a retail price by adding a fixed amount to a contract cost (e.g., each contract should be priced ten dollars ($10) above the contract cost).

Thus, in some embodiments, an operator or other party may set retail prices in association with a number of gaming contracts before such contracts are made available to players, such that the prices may remain fixed so long as the contracts are offered (e.g., before a video poker machine offering a "Play by the Hour" feature is released to the public, it is determined that thirty (30) minutes of video poker play, wherein players wager twenty-five cents ($0.25) per hand, may cost the player twenty dollars ($20), yielding an expected ten dollars ($10) in profit per contract).

(2) Simulating 'Perfect-Play' Example

In some embodiments, a probabilistic approach may be utilized to determining the contract cost. In this example, the expected contract cost of a two hundred and fifty (250) hand session of "9/6 Jacks or Better" video poker, played at max coin (five (5) coins) on a quarter-denomination ($0.25) machine is simulated. With perfect-play, a player can expect a return of ninety-nine and fifty-four one hundredths percent (99.54%) at "9/6 Jacks or Better" playing max coin. This has been extensively analyzed, and the probability of achieving each type of hand is summarized in Table A as follows:

TABLE A

"9/6 Jacks or Better" 'Perfect-Play' Paytable

| | Cycle 5-coin Payout | 100,000,000 Per-Coin Payout | Frequency | Probability | Expected Value | Odds |
|---|---|---|---|---|---|---|
| Royal Flush | 4000 | 800 | 2476 | 0.002476% | 0.019808 | 1 in 40,388 |
| Straight Flush | 250 | 50 | 10930 | 0.010930% | 0.005465 | 1 in 9,149 |
| Four of a Kind | 125 | 25 | 236256 | 0.236256% | 0.059064 | 1 in 423 |
| Full House | 45 | 9 | 1151222 | 1.151222% | 0.10360998 | 1 in 87 |
| Flush | 30 | 6 | 1101450 | 1.101450% | 0.066087 | 1 in 91 |
| Straight | 20 | 4 | 1122925 | 1.122925% | 0.044917 | 1 in 89 |
| Three of a Kind | 15 | 3 | 7444867 | 7.444867% | 0.22334601 | 1 in 13 |
| Two Pair | 10 | 2 | 12927900 | 12.927900% | 0.258558 | 1 in 8 |
| Jacks or Better | 5 | 1 | 21458500 | 21.458500% | 0.214585 | 1 in 5 |
| Nothing | 0 | 0 | 54543474 | 54.543474% | 0 | 1 in 2 |
| | | | | Payback | 99.54% | |
| | | | | Std. Dev. | 4.42 | |

These probabilities can be used to simulate how a player's balance could change while playing perfect "9/6 Jacks or Better". For example, Table A shows that on any given hand, there is a fifty-four and fifty-four one hundredths percent (54.54%) probability of a player losing an entire bet, a twenty-one and forty-six one hundredths percent (21.46%) probability of breaking even, a twelve and ninety-three one hundredths percent (12.93%) probability of the player doubling the bet, etc. With this information, perfect-play "9/6 Jacks or Better" may be modeled as if it were a simple slot machine, where the per-pull probability of each payout is known. The benefit of simulating video poker in this way is that it can be played very quickly—the outcome of each hand is determined by generating a random number and mapping it onto a table of probabilities; this requires significantly less computer instructions than direct modeling of decks, cards, strategy logic, etc., and yet produces precisely the same results in terms of probabilities of per-hand outcomes To determine the contract cost of a two hundred and fifty (250) hand session of "9/6 Jacks or Better" (max coin) played perfectly, it is first decided how many sessions (e.g., players) to simulate. It has been found that simulations produce very consistent results if it is ensured that each simulation consists of at least fifty (50) million plays (where, in the case of video poker, one play is one hand). If you consider that the least frequent event in video poker is generally the royal flush, which pays out four thousand (4,000) credits at a frequency of once every forty thousand, three hundred and ninety (40,390) hands, it will be seen that fifty (50) million hands is a large enough simulation to generate over twelve hundred (1,200) royal flushes, which is generally enough to produce good probabilistic predictions. We calculate the number of sessions (players) required for each simulation by dividing fifty (50) million by the number of plays per session. Thus, for example, to determine the contract cost for a two hundred and fifty (250) hand session, we would simulate two hundred thousand (200,000) player sessions of two hundred and fifty (250) hands each.

To determine the final player balance for each session, we generate two hundred and fifty (250) random numbers, where each number is uniformly distributed between zero (0.0) and one (1.0), map that range into the probabilities of Table A, and thereby convert each random number to a payout. The sum of these payouts, minus the total amount wagered, is the final player balance for the session. (We subtract the wagers from the total payout because the game is played as if the wager were being made, even though all the wagers are, in effect, pre-paid.) If the balance is negative, we essentially ignore it. It is irrelevant for the purposes of calculating contract cost, but we may still use it to determine other aspects of the session (such as the players' subjective experience). If the balance is positive, we add it to a running total of all positive balances.

After running two hundred thousand (200,000) of these sessions, we know the total amount of money required to pay off all players in the simulation with positive balances. If we divide this total by the number of players (two hundred thousand (200,000) in this case), we arrive at the expected contract cost. In other words, the expected contract cost is the dollar amount required to pay off the players with positive balances, averaged over all players (assuming each player started the session with a balance of zero (0) credits).

Once the expected contract cost is known, it can be used to drive pricing decisions. For instance, a contract cost of seventeen dollars and fifty cents ($17.50) might suggest a retail price of thirty dollars ($30). In this case, we would expect an average profit of twelve dollars and fifty cents ($12.50) per session (e.g., the profit margin).

Contract costs for less-than-perfect play, or floor play, may also or alternatively be simulated. To do this, we reduce the payback of the game by two percent (2%) by increasing the probability of the most frequent payout (0) at the expense of the next most frequent payout (1). If necessary, we move to successively less frequent payouts until we reach the desired payback. This procedure minimizes any change to the standard deviation of the payouts, which, has been found, has a strong influence on contract cost.

(3) Early Cashout Example

According to some embodiments, some of the profitability of a flat rate play contract and/or session comes from the fact that, probabilistically speaking, in a negative expectation game, the longer the player stays on the device, the lower their final balance will be. We generally refer to this principle as gravity; in a negative expectation game, gravity will eventually bring the player down. But what would happen if players employed a "quit-while-you're-ahead" strategy such that they cashed out as soon as they reached a target balance above their buy-in amount (for example, twice or three times the buy-in amount- or even exactly the buy-in amount)? Would players employing such a strategy be able to "beat" the expected profitability of a flat rate play contract, defeating gravity by cashing out before it can overtake them again?

To examine the effect of such a strategy, several simulations may be run, having the player cash out when their balance reaches a configurable multiple of their buy-in amount. Simulations may also be run to see what would happen if the player cashed out as soon as they hit the jackpot (in the case of "Jacks or Better", a royal flush, or in the case of "Double Double Bonus", a royal flush or any of the bonus quad payouts). Such simulations may show, for example, that early cash-out has some effect on contract cost, but that such effect varies depending on the game, and also depending on whether perfect-play strategy is employed. In general, however, the maximum effect of early cash-out on contract cost may be found to be only a little more than one dollar ($1) per half-hour of play (e.g., two hundred and fifty (250) hands at five hundred (500) hands per hour).

For example, consider two hundred and fifty (250; e.g., half an hour) of "Double Double Bonus", played optimally, with a retail flat rate play price of forty-five dollars ($45). Without cashing out early, the contract cost may be determined to be thirty-six dollars and ninety-four cents ($36.94). If players cash out as soon as they cross their buy-in amount of forty-five dollars ($45), then they actually do slightly worse, bringing the contract cost down to thirty-six dollars and sixty-one cents ($36.61). But if they cash out at ninety dollars ($90; e.g., twice their buy-in), they do a little better, for a contract cost of thirty-seven dollars and sixty-one cents ($37.61). For "Double Double Bonus", played optimally, all other cash-out triggers (one and a half (1.5) times the buy-in, i.e., "1.5×"; "2×", "2.5×", "3×", "3.5×", "4×", "4.5×", "5×", and jackpot) may generally yield values between thirty-six dollars and thirty-four cents ($36.34) and thirty-seven dollars and sixty-one cents ($37.61). For this game then, at optimal play, the player does best by cashing out at twice ("2×") their buy-in, but the impact on the profitability of the game may be extremely minimal. In the present example, for instance, the profit made by the flat rate play contract (e.g., for a casino and/or insurer) may only vary between a low of seven dollars and thirty-nine cents ($7.39) and eight dollars and sixty-six cents ($8.66), a range of merely one dollar and twenty-seven cents ($0.1.27). Such an example of simulated early cashout effects on profitability are shown in Table B, below (with the highest and lowest expected contract costs shown in bold).

TABLE B

"9/6 Double Double Bonus" (Optimal Play) Early Cashout

| Number of Hands | Retail Price | Cashout Trigger | Contract Cost | Profit Per Contract |
|---|---|---|---|---|
| 250 | $45.00 | | $36.94 | $8.06 |
| 250 | $45.00 | 1.0× | $36.61 | $8.39 |
| 250 | $45.00 | 1.5× | $37.57 | $7.43 |

TABLE B-continued

"9/6 Double Double Bonus" (Optimal Play) Early Cashout

| Number of Hands | Retail Price | Cashout Trigger | Contract Cost | Profit Per Contract |
|---|---|---|---|---|
| 250 | $45.00 | 2.0× | **$37.61** | $7.39 |
| 250 | $45.00 | 2.5× | $37.40 | $7.60 |
| 250 | $45.00 | 3.0× | $37.39 | $7.61 |
| 250 | $45.00 | 3.5× | $37.31 | $7.69 |
| 250 | $45.00 | 4.0× | $37.05 | $7.95 |
| 250 | $45.00 | 4.5× | **$36.34** | $8.66 |
| 250 | $45.00 | 5.0× | $36.89 | $8.11 |
| 250 | $45.00 | jackpot | $37.08 | $7.92 |

As a second example, consider "Jacks or Better". In "Jacks or Better", the best strategy the player can employ is to play through their session using standard optimal strategy, with a contract cost of eighteen dollars and nineteen cents ($18.19). If the player cashes out at three times ("3×") their buy-in, they may achieve similar results with a contract cost of eighteen dollars and sixteen cents ($18.16). This difference of three cents ($0.03) is arguably within the margin of error of the probabilistic simulation, which can produce results that vary up to about seventy-five cents ($0.75) from run to run. This also serves to illustrate the point that players who cash out early may have an effect on the contract cost, but simulations indicate this effect to be relatively insignificant.

Further, these examples so far have been presented as using optimal play. Many (even a majority) of players, however, do not have strategy cards memorized, and typically play at about two percent (2%) below optimal. While effects on profitability may vary slightly in such cases, the effects will generally still remain relatively insignificant in terms of overall profitability of flat rate play contacts.

6. Offering the Contract

A contract may be offered to a player in any number of ways. A gaming device may use text and/or synthesized voice to ask a person whether or not he would like to sign up for a contract. A casino attendant may offer a contract to a player, or signs at a casino may point a player towards a casino desk where he may then purchase a contract.

A number of circumstances may trigger the casino or an insurer to offer a contract to the player. For example, the player may have lost most of an initial stake deposited into a gaming device. A player may be slowing his play, or may no longer be inserting coins into the machine. The time of day may be a player's typical lunch time or departure time. A player may have the opportunity to enter into a contract only if he also agrees to do business with a particular merchant or group of merchants. The player may have the opportunity to enter into a contract if the casino or insurer deems him a good, valuable, or loyal customer.

7. Agreeing to the Contract

A player may specify a desired contract in a number of ways. At a gaming device, a player may use a touch screen to indicate his desire to enter into a specific contract. Using the touch screen, the player may select from a menu of possible contracts. For example, the menu might list several contracts with different time durations or different prices. The player could then select a contract by touching an area of the screen next to his desired contract.

The player might use menus to customize a contract for himself. The player might use a first menu to select a duration of the contract (e.g., six hundred (600) pulls, or half an hour). A second menu might be used to select a rate of play. A third menu might be used for coin denomination. Many other menus are possible for other contract features. Once the player has selected several contract features, the gaming device may select the remaining feature so as to make the contract profitable for the insurer. For example, once the player has chosen a number of pulls and a coin denomination, the gaming device might choose the price of the contract.

Rather than a touch screen, a player may use special buttons, keys, or voice input to specify a desired contract or contract terms.

In some embodiments, a player chooses a contract prior to approaching the gaming device or even the casino. A player might select a contract on the Internet. On the Internet, the player might specify terms of the contract, such as the number of pulls, the rate of play, the cost, the payout tables, the winning symbol combinations, etc. The player may then print out a code or a document describing the terms of the contract. The player then brings the code or document to a gaming device that then recognizes what contract the player has chosen. When the player signs up for a contract, a description of the contract might be sent electronically directly to the gaming device. The player might then only identify himself at the gaming device in order to initiate contract play.

Other terms of a contract a player may agree to or specify include: the font size of the machine, the noise level of the machine's sound effects, the particular game (e.g., number of reels, number of pay lines), the brightness of the display, etc.

8. Signature

To confirm entry into a contract, a player might sign a document that may contain the terms of the contract. The document may be printed from a gaming device or from the Internet, or may be obtained from a counter at a casino. The signed document may then be deposited into an opening in the gaming device, may be returned to a casino counter, or may be kept by the player. The player might also sign an area on a touch screen or other sensing device.

A player might also confirm entry into a contract simply by paying for it. The player might pay be depositing tokens, coins or other currency into the gaming device. The player might pay using a credit or debit card. The player might also pay from a player credit account established with the casino. The player might pay at a counter of the casino and might receive a contract or a contract indicator to bring to a gaming device. The gaming device might then recognize the contract indicator by, for example, a bar code, and then execute the contract.

9. Instruction Sets

A typical contract may cover and/or require a large number of handle pulls by the player. Now ordinarily, when a player is gambling at a gaming device for a long period of time, the player makes a number of decisions related to his gambling. Should the player play more quickly or more slowly? Should the player double his bet after a loss? Should the player quit after a sizable win? Should the player take a short break to use the restroom?

Since the contract covers a large number of pulls, it is possible for the some player decisions to be made beforehand and included in the contract. A gaming device may then act on the decisions specified in the contract without further input from the player. For example, while negotiating a contract for an hour of play at ten (10) pulls per minute, a player might decide he'd like a fifteen-minute (15-min) break between the first half hour and the second half hour of pulls. The gaming device might then execute the contract for the first half hour by automatically spinning and generating outcomes for the first half hour. The gaming device might then freeze for fifteen minutes (15-min), preventing other players from stepping in and allowing the contract holding player to take his fifteen-minute (15-min) break. The device can then unlock after fifteen minutes (15-min), perhaps with the entry of a password, and resume the generation of outcomes.

One important aspect of having a player's decisions spelled out before hand in the contract is that the player need not even be present at the gaming device. A player can sign up for a contract at a casino in Las Vegas, Nev., for example, and then have the contract executed automatically by a gaming device. The player can then view a running tally of his accumulated credits over the Internet while in Virginia, for example.

In general, player instructions built into a contract will include some action to be performed as well as some triggering condition for the action. As an example, a player instruction may be to increase the rate of handle pulls provided accumulated player credits exceed one hundred (100). In this example, the action is to increase the rate of handle pulls, and the triggering condition is whether accumulated player credits exceed one hundred (100). The following player actions may be part of a player's instructions:

Increase or decrease a wager amount on one or more handle pulls.

Increase or decrease a rate of wagering.

Cease gambling.

Change the way outcomes are displayed.

The following conditions may trigger the above actions

The player has just won or lost on one or more handle pulls.

The player has just won a certain amount on one or more handle pulls.

Any player defined sequence of wins and losses has occurred on prior handle pulls.

The player has approached or left the vicinity of the gaming device.

The current time has reached a particular time of day.

One advantage of contracts executed by the gaming device is that a gaming device can gamble at speeds a human is incapable of achieving. For example a player is on a winning streak, but must soon join his family for lunch. Rather than cash out and leave, he decides to accelerate his play to two pulls per second (2 pulls/sec). He therefore enters a into a contract which is to be executed by the machine at two pulls per second (2 pulls/sec) for the next eight (8) minutes. In this contract, an insurer is not involved. The contract simply serves as a means of increasing the rate of play. As it happens, the player may lose all his money in six (6) minutes, and so the contract ends.

Player instructions may tell the slot machine to play faster when the player is present or is observing in some way, and to play more slowly while the player is asleep. For example, the rate of pulls may be twice as fast during the day as at night. The rate of play may likewise be faster when an infrared detector in the slot machine senses the heat of the player's presence.

Player instructions may also tell a gaming device how to play certain games involving player decisions. For example, a player may leave instructions to use basic strategy in a game of video blackjack, or to play according to published theory in a game of video poker. The player may add instructions to always draw to a four card open-ended straight flush.

10. Times of Execution

A contract may be executed over a range of different time periods. The outcomes, the accumulated player credits, and the player winnings may or may not be displayed to the player at the same time at which the outcomes are being generated.

In one embodiment, all the outcomes needed for a contract are generated very rapidly by a gaming device, perhaps all in less than a second. The outcomes may then be displayed to the player over a much longer time frame so as to give the player a more exciting gaming experience.

In another embodiment, outcomes may be continuously generated at a rate comparable to that with which a player might make handle pulls on his own. This embodiment might be entertaining for a player if the player is sitting at the gaming device or watching the outcomes being generated from a home computer.

In another embodiment, outcomes are generated on a periodic basis at fixed times every day, week, hour, etc. For example, outcomes for a six hundred-pull (600-pull) contract may be generated one hundred (100) outcomes at a time, each block being generated from eight in the evening to nine at night (8 PM-9 PM) on Sunday. Thus, it would take just under six (6) weeks for the entire contract to be executed. This method of execution may be ideal if a player has a schedule as to when he enjoys watching outcomes being generated. For example, the player might enjoy seeing outcomes generated while he watches his favorite show on Sundays from eight in the evening to nine at night (8 PM-9 PM). This method of execution might also be ideal for the casino if slow business periods occur on a periodic basis where the entire contract cannot be executed in a single period.

In still another embodiment, outcomes are generated on a flexible basis, either when it is convenient for the casino or for the player. In this embodiment, the casino may wait for a gaming device to be free of use before using it to generate the next couple of outcomes of a contract. Alternatively, the player may signal the gaming device any time he is ready to have the next few outcomes generated 11. Viewing the Contract's Execution As discussed, a player may enjoy watching from a remote location as the outcomes of his contracts are generated. Since the player is not physically at the slot machine, the outcomes must be presented to the player via some graphical representation. In one embodiment, a camera simply films the gaming device generating the player's outcomes. The image from the camera is transmitted to the player device via the Internet, the cable system, satellite, etc. The player device might be, for example, a TV or a personal computer. In another embodiment, the generated outcomes are recorded either by the gaming device, by a camera watching the device, or by a casino employee. The generation of the outcomes is then graphically recreated for the player in a manner not necessarily consistent with the physical appearance of the gaming device that generated the outcomes. For example, a gaming device generates the outcome: cherry-orange-lemon. The gaming device then transmits, via the casino server and the Internet, a bit sequence indicating the outcomes cherry-orange-lemon. Perhaps the bits "0000" represent cherry, "0011" represent orange, and "1111" represent lemon. The bit sequence is transmitted to a player's home computer, where a software program displays a cartoon representation of a slot machine. The cartoon shows the reels spinning and stopping with the outcome: cherry-orange-lemon. The cartoon representation of the slot machine may not look anything like the slot machine that originally generated the outcomes. In some embodiments, a player views a combination of the actual image of his gaming device, and a computer-rendered version of a gaming device. For example, a cartoon of the reels spinning might be displayed within the frame of an actual image of the slot machine, without the reels.

In some embodiments, the player does not view a graphical representation of the outcomes, but sees the outcomes as text, such as "seven-bar-bar," "s-b-b," "7-b-b," etc. The player may not even see the outcomes, just how much he has won or lost on every pull. Thus, the player may view a periodically updated tally of his accumulated credits. He may only view his total accumulated credits, or his take home winnings, after all outcomes have been generated.

Any graphical or textual representation of the player's outcomes, accumulated credits, or other contract information may be displayed either on an entire portion of a computer or TV screen, or on a smaller portion of the screen. For example, a small cartoon slot machine may reside in a box in the upper right hand corner of a TV screen that simultaneously displays a regular TV show. A player watching television need then only glance up at the corner of his screen to follow the progress of his contract. Representation of outcomes may also be place in an email message to the player.

Of course, the various representations of outcomes may be used just as well with a player physically present at the gaming device or at the casino.

In some embodiments, the player calls up a number to monitor the progress of his contract. He may enter a code or password when prompted by a Voice Response Unit (VRU) and thereby access the outcomes from his particular contract. A player may also receive a DVD from the gaming establishment containing a representation of the game outcomes received by the player.

A player may be sent updates on his contract only when certain triggering conditions are met. For example, a player may only wish for updates when he wins more than one hundred (100) credits on a spin, or when the contract terminates.

12. Revenue Management

As discussed herein, the pricing of a contract will often take into account the expected amount an insurer must pay to a casino to cover a player's losses, or the expected amount that a casino and insurer in combination can expect to pay to compensate the player for his winnings. Pricing of contracts may account for additional factors such as, for example:

Times or dates on which the contract is to be executed.

The gaming device on which the contract is to be executed

Flexibility in the contract's execution.

A player's playing history.

The importance of the player as a customer of the casino.

For example, a contract that is to be executed during a period of low customer activity at a casino may be priced at a discount. This is because a casino would like to encourage the use of gaming devices that are otherwise empty. Alternatively, a casino may want to discourage the purchase of contracts during times of high customer traffic, and so contracts may be higher priced at such times.

If a contract has flexibility as to when it may be executed, then this allows the casino to execute contracts only during times when gaming devices would not otherwise be in use. Therefore, such a contract might be priced more favorably.

A contract that is executed at an unpopular gaming device, for example, might be priced more favorably for the player so as to encourage the use of that device.

If a player shows signs of nearing the end of his gambling session, a contract might be priced at a discount for that player. For example, a player might be slowing his rate of play, indicating boredom. A player might be lowering his wager size, indicating a decreasing bankroll. A player might simply have been at a gaming device for such a long time that he would almost necessarily be hungry enough to leave at any moment. Providing a discount on a contract to such players would encourage them to remain gambling for at least the time it takes to execute the contract.

13. Settlement

In some embodiments, the casino acts as the intermediary in transactions between a player and the insurer. The casino is an intermediary, for example, when its gaming devices collect a player's payment for a contract, even though that payment is meant to go to the insurer. The casino is also an intermediary when it does not collect losses from a player, but from an insurer.

Since the casino may engage in many transactions with the insurer, it would potentially be inefficient for the casino to transfer money to the insurer, or vice versa, after every transaction. Therefore, the casino or the insurer may maintain records of how much one owes the other. The casino and the insurer may then settle their accounts periodically. If the casino owes the insurer money, then the casino may wire money to the insurer. If the insurer owes the casino, then the insurer may wire money. Of course, many other methods of settlement are possible.

In cases where a contract has resulted in a net win for the player, the player must be paid. If the player is at the casino, he may enter into a gaming device a password or other identifier of himself or of his contract. The gaming device may then access a database in the casino server containing the details of the contract, including the amount owed to the player. The gaming device may then payout the amount owed in the form of cash, tokens, paper receipts or vouchers, digital cash, digital receipts, etc. The player may also collect his winnings at a casino desk, perhaps after presenting identification.

If a player is remote from a casino when his contract has finished executing, then the player may be sent his winnings either by the insurer or the casino. If the insurer provides the winnings, then the casino may later reimburse the insurer in the amount of the winnings. The winnings may be sent in the form of cash, check, money order, etc. The winnings may be sent by postal mail, by wire transfer, by direct deposit, by email as digital cash, etc.

In some embodiments, the casino may simply keep the player's winnings in a player account at a casino, to be accessed by the player next time he visits the casino. The winnings may, in the mean time, accumulate interest. The casino (or insurer) may also alert the player that his contract has finished executing and that he has winnings. The player may be instructed to come to the casino and pick them up.

In some embodiments, the player may have left instructions to take any winnings from a first contract and purchase a second contract. This allows for the notion of a meta-contract. Just as a contract may specify how to allocate money for pulls, a meta-contract would describe how to allocate money for contracts. There could then be meta-meta-contracts, and so on.

Numerous variations on the above-described contract embodiments of the present invention may be practiced without departing from the spirit and scope of the present invention. For example, a player may be halfway through a contract and have negative two hundred (−200) accumulated credits. The player might therefore lose all hope of winning enough to overcome the two hundred-credit (200-credit) deficit, and thus lose interest in the contract. Therefore, in one embodiment, a player who is well below a threshold number of accumulated credits for winning may play for an altered pay table. Low paying outcomes may be eliminated, while the likelihood of achieving high paying outcomes may increase. This is because a player with a two hundred-credit (200-credit) deficit probably doesn't care about a win of ten (10) credits, but does care about a win of five hundred (500) credits. The overall hold percentage of the machine may remain constant. In some embodiments, the alteration of the pay tables is an automatic function of the number of pulls remaining and the credit deficit of the player. In other embodiments, the player must request an alteration of the pay tables. As an example, a player may select an option that says, "Let me play just for the jackpot. Eliminate everything else and make the jackpot more likely." The player may or may not have to pay for an alteration of the pay tables. In a more general sense, the pay tables may change such that the standard deviation of the payout for a particular handle pull changes even as hold percentage may remain constant.

In another embodiment, a player might purchase a contract at a casino desk and receive a token that indicates the type of contract. The player might then deposit the token into a gaming device. The gaming device would then recognize the token and be able to execute the contract.

A player may have the privilege of entering into favorable contracts after a fixed amount of initial betting. For example, if the player wagers for an hour, he may be able to enter into a contract where each pull is at true odds. That is each pull pays back, on average, the same amount that was put in. Typically the pull pays back less. In yet another embodiment, a player may receive better odds on contract play when he is recommended to the casino by a friend.

In some embodiments, certain results of a pull may terminate a contract early. For example, if a player hits the jackpot, the contract may terminate. In other embodiments a player's accumulated credits can be displayed to a player as a function of time in the form of a graph. The graph may look much like graphs used to plot the price of a stock market index as a function of time. In some embodiments, a player wins money or some other prize if the graph takes on a certain shape. For example, if the line of the graph is such that it slips between several sets of markers (much like a skier on a slalom course), then the player may win a large prize.

In some embodiments, a player's winnings on each pull of the contract are reinvested into the contract, whereas in other embodiments they are not. In one example, a player purchases a contract for one hundred dollars ($100). The player instructs the gaming device to gamble the one hundred dollars ($100) until it is all gone. However, any winnings are not to be used to gamble, they are to be sent directly to the player. In a second example, the player purchases a contract for one hundred dollars ($100) and instructs the gaming device to gamble the one hundred dollars ($100) until it is gone or until it has become two hundred dollars ($200). Here, the player elects to reinvest winnings, using the winnings to pay for new handle pulls even after one hundred dollars ($100) worth of handle pulls has been made already.

A contract may reward a player based on any second order data, or meta-data about one or more outcomes. Examples include rewarding the player if three like outcomes occur in a row, if twenty (20) cherries come up in ten (10) sequential spins, if the players accumulated credits ever reach one hundred (100), etc. An example previously mentioned is rewarding a player based on the pattern of a graph of accumulated winnings as a function of time. A player might choose the "meta-outcomes" on which he desires to be rewarded, and the gaming device may figure the corresponding odds and the size of the reward should the meta-outcome occur.

A player may be rewarded with the downside of a sequence of outcomes much as buying insurance gives him the upside. For example, a player pays a fixed sum of money, and collects winnings for every dollar in the negative the contract finishes at. Thus, if a contract ends with the player having negative twenty (−20) accumulated credits, then the player collects twenty (20) credits.

A contract may apply to a "best 100" sequence of a larger sequence of pulls. For example, the player pays one hundred dollars ($100) for a contract of one thousand (1000) pulls. From those one thousand (1000) pulls, the player gets to choose any one hundred (100) consecutive outcomes to determine his winnings, and can disregard the rest of the outcomes. Thus the player can say he wants to use outcomes number five hundred and six (506) through six hundred and five (605). Perhaps, for example, there was a "hot streak" during that sequence. The player's winnings are then determined solely based on what happened between pulls five hundred and six (506) through six hundred and five (605). This might result in winnings of two hundred dollars ($200), whereas having counted all one thousand (1000) pulls would have resulted in a net loss for the player. Of course, the gaming device may automatically choose the most favorable sequence for the player.

A player may choose his favorite outcome and receive higher payouts for that outcome, special privileges for receiving that outcome (e.g., the ability to terminate a contract), etc.

C. Contract System Architecture

Figure 17:
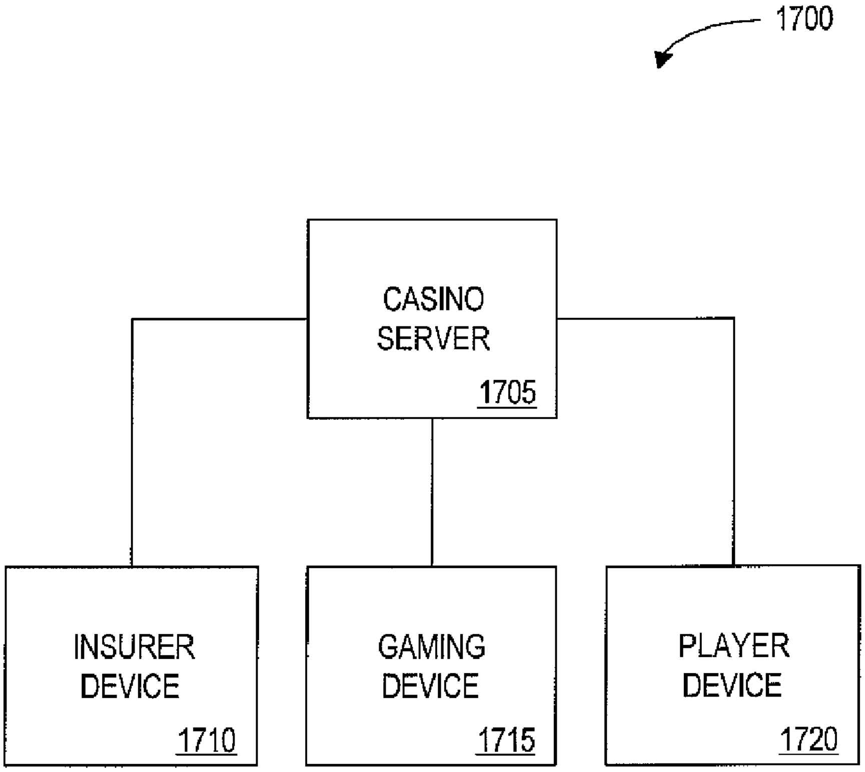
FIG. 17 is a schematic view of a system according some embodiments.

Returning now to the figures, in FIG. 17, a schematic view of a system 1700 according to some embodiments is shown. The system 1700 may, for example, comprise a representation of an embodiment of a flat rate play contract system configured to carry out the contract embodiments described herein. The system 1700 generally comprises a casino server 1705 in communication with insurer device 1710, a gaming device 1715, and/or a player device 1720. As used herein, a device (including the casino server 1705, the insurer device 1710, the gaming device 1715, and/or the player device 1720) may communicate, for example, through a communication network such as a Local Area Network (LAN), a Wide Area Network (WAN), a Metropolitan Area Network (MAN), a Public Switched Telephone Network (PSTN), a proprietary network, a Wireless Access Protocol (WAP) network, or an Internet Protocol (IP) network such as the Internet, an intranet or an extranet. Moreover, as used herein, a communication network includes those enabled by wired or wireless technology.

It should be understood that any number of gaming devices and any number of player devices may be used in system 1700. Although the system 1700 includes both a casino server 1705 and an insurer device 1710 as illustrated, one or the other of these elements may be omitted (for example, the insurer device 1710 may be omitted in embodiments that do not include an insurer and/or where the casino acts as the insurer). Similarly, although the system 1700 includes both a gaming device 1715 and a player device 1720 as illustrated, one or more of these embodiments may be omitted (for example, the player device 1720 may be omitted if the casino has not implemented remote gaming). Further, some or all of the functionality of a casino server 1705 may be carried out by insurer device 1710 and vice versa. Similarly, some or all of the functionality of casino server 1705 and/or insurer device 1710 may be carried out by gaming device 1715 and vice versa. In one embodiment, the casino server 1705 comprises one or more computers that are connected to a remote database server.

D. Contract Embodiment Device Architectures

Figure 18:
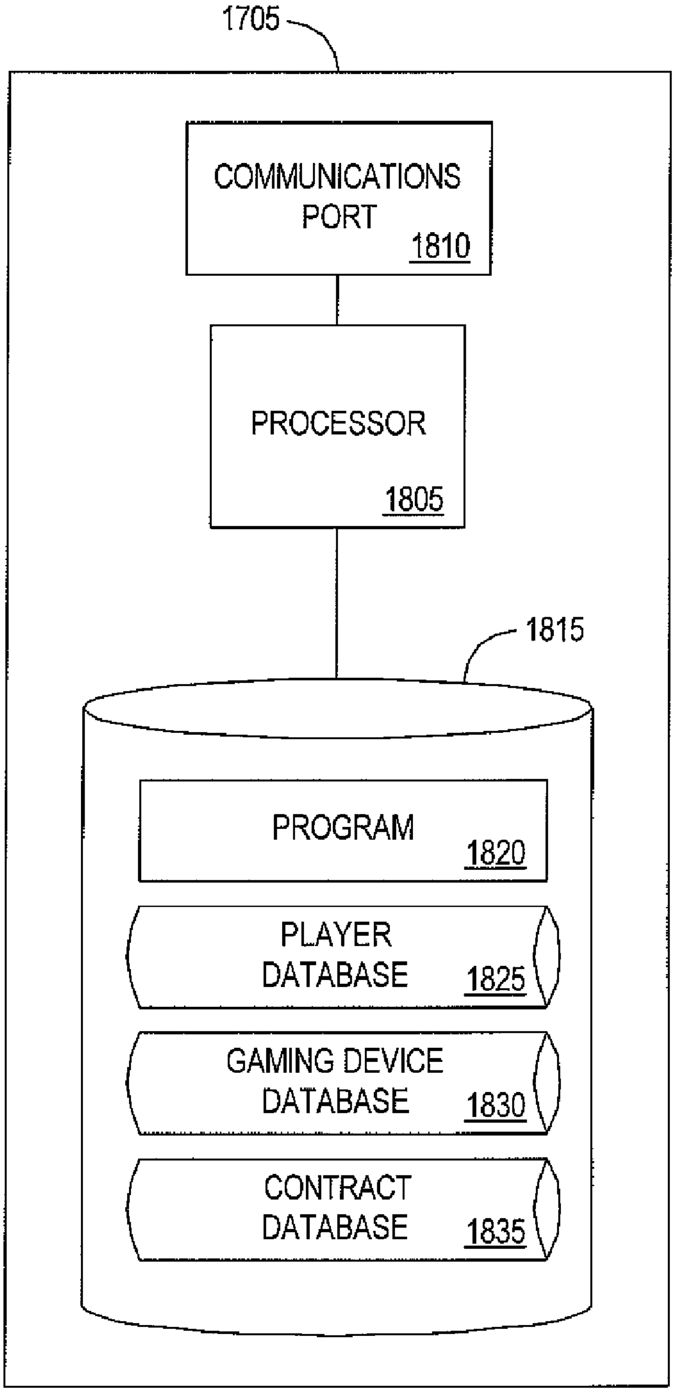
FIG. 18 is a schematic view of a casino server according some embodiments.

Turning now to FIG. 18, a schematic view of a casino server 1705 according to some embodiments is shown. The casino server 1705 may be, for example, an illustration of an embodiment of the casino server 1705 from FIG. 17. The casino server 1705 generally comprises a processor 1805 in communication with a communications port 1810 and storage device 1815. Contained in the storage device 1815 is a program 1820, a player database 1825, a gaming device database 1830, and/or a contracts database 1835. The processor 1805 performs instructions of the program 1820, and thereby operates in accordance with the embodiments described herein. The program 1820 may be stored in a compressed, un-compiled, and/or encrypted format. The program 1820 furthermore may include program elements that may be necessary, such as an operating system, a database management system, and "device drivers" used by the processor 1805 to interface with peripheral devices (not shown). Appropriate program elements are known to those skilled in the art.

Note that the processor 1805 and the storage device 1815 may be, for example, located entirely within a single computer or other computing device or located in separate devices coupled through a communication channel.

Figure 19:
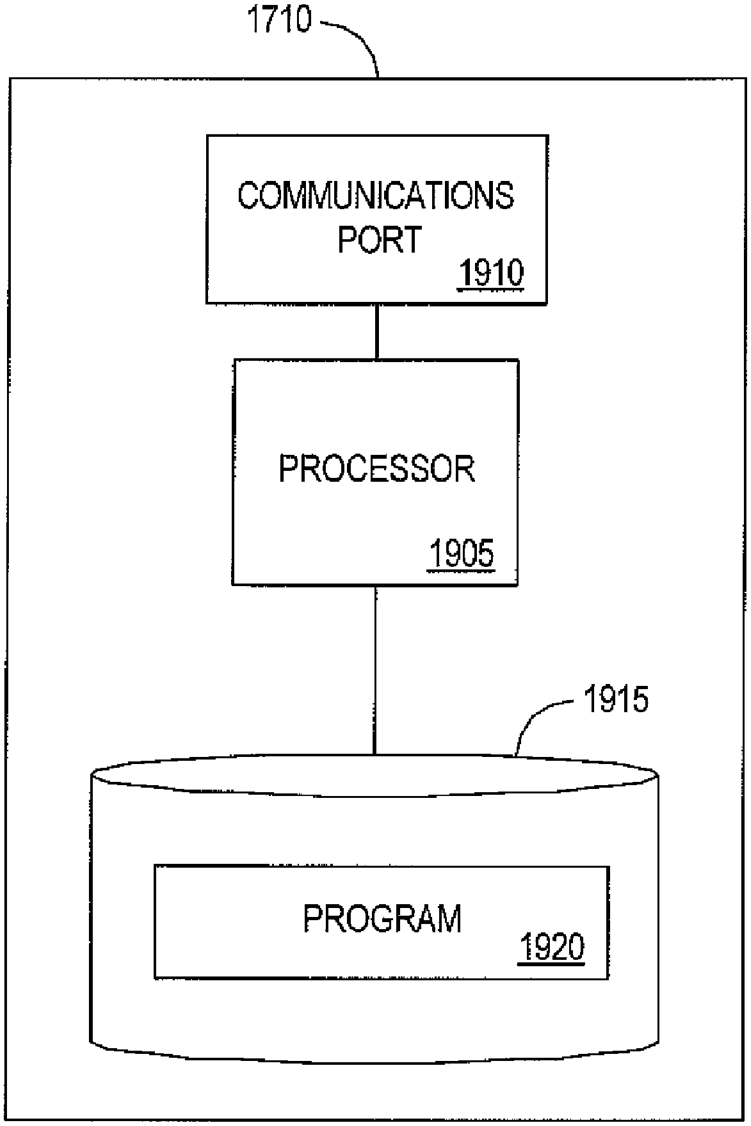
FIG. 19 is a schematic view of an insurer device according some embodiments.

Turning now to FIG. 19, a schematic view of an insurer device 1710 according to some embodiments is shown. The insurer device 1710 may be, for example, an illustration of an embodiment of the insurer device 1710 from FIG. 17. The insurer device 1710 may generally comprise a processor 1905 in communication with a communications port 1910 and a storage device 1915. The storage device 1915 stores a program 1920. The processor 1905 performs instructions of the program 1920, and thereby operates in accordance with embodiments describe herein. The program 1920 may be stored in a compressed, un-compiled, and/or encrypted format. The program 1920 furthermore may include program elements that may be necessary, such as an operating system, a database management system, and "device drivers" used by the processor 1905 to interface with peripheral devices (not shown). Appropriate program elements are known to those skilled in the art. Note that the processor 1905 and the storage device 1915 may be, for example, located entirely within a single computer or other computing device or located in separate devices coupled through a communication channel.

Figure 20:
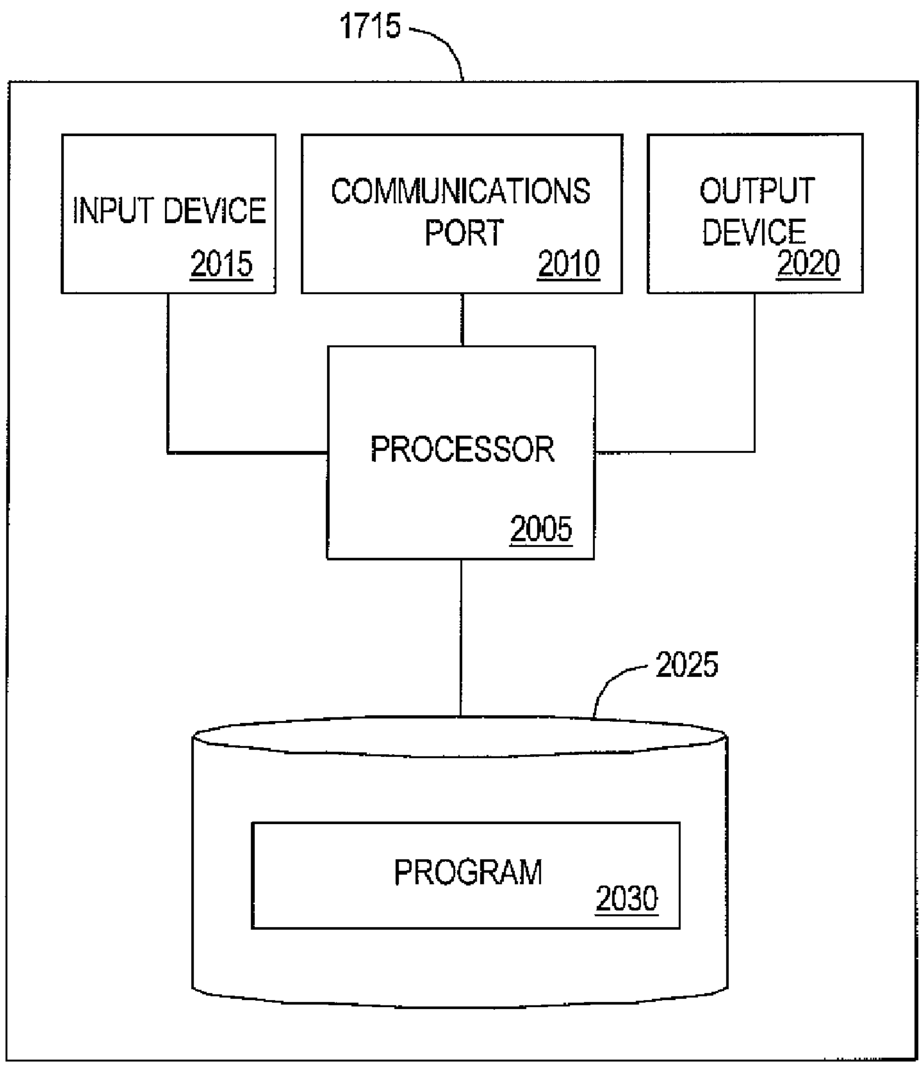
FIG. 20 is schematic view of a gaming device according some embodiments.

Turning now to FIG. 20, a schematic view of a gaming device 1715 according to some embodiments is shown. The gaming device 1715 may, for example, be an illustration of an embodiment of the gaming device 1715 from FIG. 17. The gaming device 1715 may generally comprise a processor 2005 in communication with a communications port 2010, an input device 2015, an output device 2020, and a storage device 2025. The storage device 2025 stores a program 2030. The processor 2005 performs instructions of the program 2030, and thereby operates in accordance with embodiments described herein. The program 2030 may be stored in a compressed, un-compiled, and/or encrypted format. The program 2030 furthermore includes program elements that may be necessary, such as an operating system, a database management system, and "device drivers" used by the processor 2005 to interface with peripheral devices. Appropriate program elements are known to those skilled in the art.

Note that the processor 2005 and the storage device 2025 may be, for example, located entirely within a single computer or other computing device or located in separate devices coupled through a communication channel.

The input device 2015 may comprise, for example, a player slot card interface, a keypad, a touch-screen, a microphone, and/or any other device which allows a player to input information into gaming device 1715. The output device 2020 may comprise, for example, a display area, a microphone, and/or any other device that allows the gaming device 1715 to output information to a player. The gaming device 1715 may comprise, for example, a slot machine (such as the slot machines 102, 202 described herein), video poker machine, video keno machine, and/or a video blackjack machine. A combination of these types of machines may be used in embodiments where the casino server 1705 of FIG. 17 and/or FIG. 18 is in communication with more than one gaming device 1715.

Figure 21:
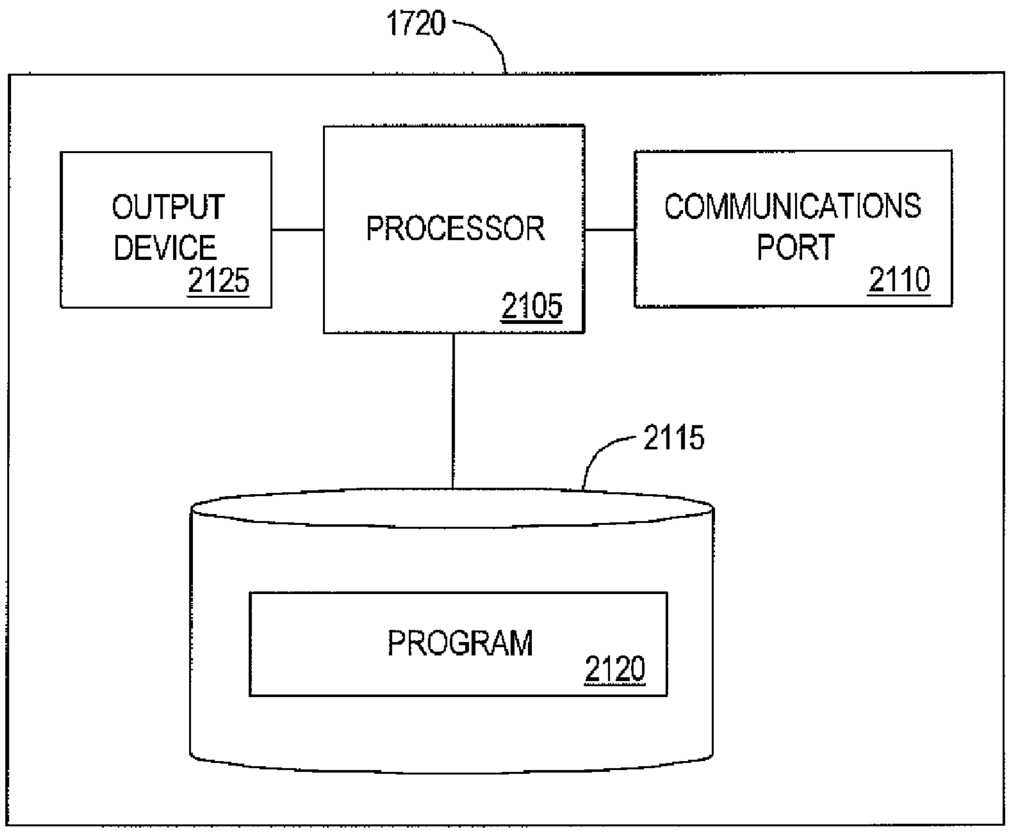
FIG. 21 is a schematic view of a player device according some embodiments.

Turning now to FIG. 21, a schematic view of a player device 1720 according to some embodiments is shown. The player device 1720 may be, for example, an illustration of an embodiment of the player device 1720 from FIG. 17. The player device 1720 may be, for example, a Personal Computer (PC), laptop, Personal Digital Assistant (PDA), a cellular telephone, a pager, and/or any other device that allows a player to remotely monitor and participate in play of a gaming device in accordance with some embodiments. The player device 1720 may generally comprise a processor 2105 in communication with a communications port 2110 and a storage device 2115. The storage device 2115 stores a program 2120. The processor 2105 performs instructions of the program 2120, and thereby operates in accordance with embodiments described herein. The program 2120 may be stored in a compressed, un-compiled, and/or encrypted format. The program 2120 furthermore may include program elements that may be necessary, such as an operating system, a database management system, and "device drivers" used by the processor 2105 to interface with peripheral devices. Appropriate program elements are known to those skilled in the art. Note that the processor 2105 and the storage device 2115 may be, for example, located entirely within a single computer or other computing device or located in separate devices coupled through a communication channel.

It should be noted that any and any or all of the processors 1805, 1905, 2005, 2105 described in conjunction with any of FIG. 18, FIG. 19, FIG. 20, and/or FIG. 21 may comprise one or more microprocessors such as one or more INTEL® Pentium® processors. Further, any and all of the storage devices 1815, 1915, 2025, 2115 described in conjunction with any of FIG. 18, FIG. 19, FIG. 20, and/or FIG. 21 may comprise any appropriate storage device, including combinations of magnetic storage devices (e.g., magnetic tape and hard disk drives), optical storage devices and semiconductor memory devices, such as RAM devices and/or ROM devices.

E. Contract Embodiment Data Structures

Examples of databases that may be used in connection with the system 1700 of FIG. 17 will now be described in detail with respect to FIG. 22, FIG. 23, and FIG. 24. Each figure depicts a database in which the data is organized according to a data structure in accordance with some embodiments. The data may be stored, for example, on a computer readable medium and be accessible by a program executed on a data processing system. The schematic illustrations and accompanying descriptions of the databases presented herein are exemplary, and any number of other database arrangements could be employed besides those suggested by the figures.

1. Player Database

Referring to FIG. 22, a table illustrating an embodiment of a player database 1825 according to some embodiments is shown. In some embodiments, the player database 1825 may be stored at the casino server 1705 shown in FIG. 17 and/or may be an illustration of one embodiment of the player database 1825 of FIG. 18. The player database 1825 may generally include entries identifying players that may be participating in contracts for flat rate play sessions (e.g., associated with the system 1700 of FIG. 17). The player database 1825 may also define fields 2205, 2210, 2215, 2220, 2225, 2230, 2235 for each of the entries. The fields may comprise, for example, (i) a player identifier field 2205 (e.g., that uniquely identifies a player, (ii) a name field 2210 associated with the player, (iii) an address field 2215 that facilitates communications with the player, (iv) a financial account identifier field 2220, that may store information such as a credit and/or debit card account number, associated with the player through which payment may be obtained and to which player winnings may be credited, (v) a demographic information filed 2225 that may be utilized to determine a price or other terms for a contract, (vi) a credits field 2230 that may represent the amount of casino credits associated with the player, and/or (vii) a lifetime coin in field 2235 that represents the amount of coin in wagered by the player over the course of their relationship with the casino and/or insurer.

2. Gaming Device Database

Referring to FIG. 23, a table illustrating an embodiment of a gaming device database 1830 according to some embodiments is shown. The gaming device database 1830 may be stored, for example, at the casino server 1705 shown in FIG. 17 and/or may be an illustration of one embodiment of the gaming device database 1830 of FIG. 18. The gaming device database 1830 may generally include entries identifying gaming devices operated by the casino. The gaming device database 1830 may also define fields 2305, 2310, 2315 for each of the entries. The fields may comprise, for example (i) a gaming device identifier field 2305 that includes information that identifies a gaming device, (ii) a name field 2310 storing information associated with the gaming devices, such as, for example, "Diamond Mine®", and/or (iii) a manufacturer field 2315 storing the name of the manufacturer of the gaming device.

3. Contract Database

Referring to FIG. 24, a table illustrating an embodiment of a contract database 1835 that may be stored at the casino server 1705 shown in FIG. 17 and/or may illustrate an embodiment of the contract database 1835 of FIG. 18. The contract database 1835 may generally include entries identifying contracts that may or have been purchased via the system 1700 of FIG. 17. The contract database 1835 may also define fields 2405, 2410, 2415, 2420, 2425, 2430, 2435, 2440 for each of the entries. The fields may comprise, for example (i) a contract identifier field 2405 that identifies a contract that has been purchased or is available for purchase by a player, (ii) a player identifier field 2410 that identifies a player, if any, that may be associated with the contract, (iii) an initial bankroll field 2415, (iv) a description field 2420 that describes the terms of the contract, (v) a cost field 2425 of the contract, (vi) a result field 2430 that indicates the current status of the contract, (vii) an amount owed the player field 2435, and/or (viii) an amount owed the insurer field 2440.

Figure 25:
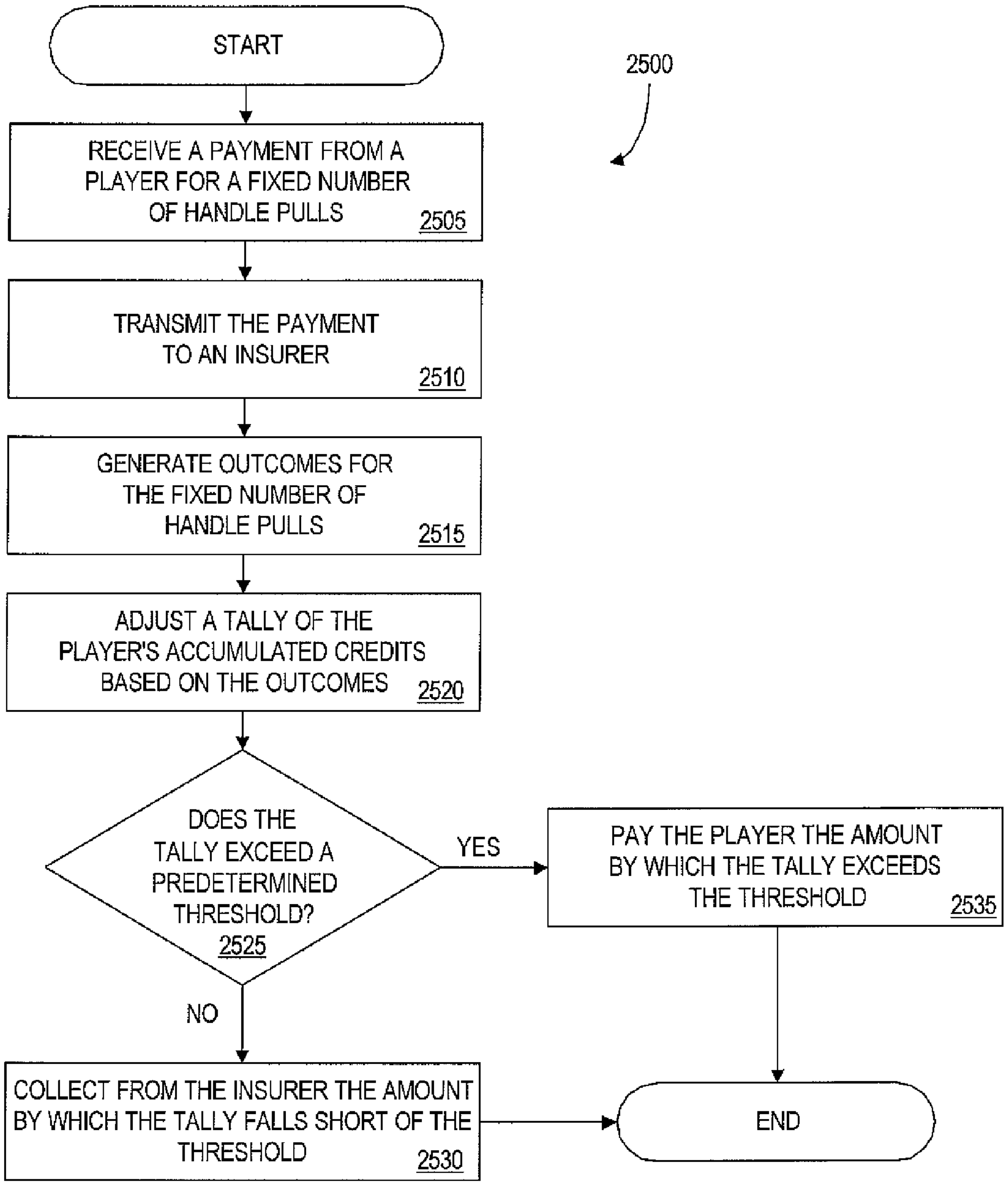
FIG. 25 is a flowchart of a method according some embodiments.

A method that may be used in connection with the system 1700 of FIG. 17 according to some embodiments will now be described in detail with respect to FIG. 25. In FIG. 25, a flowchart of a method 2500 according to some embodiments is shown. The method 2500 may be performed, for example, by the casino server 1705 of FIG. 17 in response to a player's request to purchase a contract and after determining the price and terms of the contract the player wishes to purchase. The flowcharts depicted herein do not imply a fixed order to the steps, and embodiments may be practiced in any order that is or becomes practicable.

In some embodiments, the method 2500 begins upon receipt of payment from a player for a fixed number of pulls, in step 2505. In other embodiments this step may comprise receipt of payment for a fixed duration of time during which the player may play. Receipt of payment may comprise, for example, receipt of a monetary input into a gaming device (such as the gaming device 1715 of FIG. 17 and/or FIG. 20) or receipt of (and, e.g., approval of a charge on) a financial account identifier. The received payment, or an indication of it, is then transmitted to an insurer in step 2510. Outcomes are then generated for a fixed number of pulls in step 2515. An adjustment of a tally of the player's accumulated credits based on the outcomes is performed in step 2520.

In step 2525 it is determined whether the adjusted tally exceeds a predetermined threshold. If it does, the method 2500 proceeds to step 2535 where the player is paid the amount by which the tally exceeds the threshold. Payment to the player may be achieved by, for example, outputting a monetary amount comprising the payment to the player at the gaming device or by crediting the amount of the payment to a financial account identifier associated with the player. If it is determined in step 2525 that the adjusted tally does not exceed the predetermined threshold then the method 2500 proceeds to step 2530 in which the amount by which the tally falls short of the threshold is collected from the insurer.

Although the foregoing preferred embodiments employ slot machines and video poker machines, it is within the scope of the present invention to employ other types of gaming devices, such as video poker machines, video roulette machines, video blackjack machines and the like. For example, in an embodiment using a video poker machine, the player selected price parameters include identifying only specific card hands, such as a royal flush, as active in the jackpot structure.

VII. Rules of Interpretation

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments of the invention nor a listing of features of the invention that must be present in all embodiments.

Neither the Title (set forth at the beginning of the first page of this patent application) nor the Abstract (set forth at the end of this patent application) is to be taken as limiting in any way as the scope of the disclosed invention(s). The term "product" means any machine, manufacture and/or composition of matter as contemplated by 35 U.S.C. §101, unless expressly specified otherwise.

The terms "an embodiment", "embodiment", "embodiments", "the embodiment", "the embodiments", "one or more embodiments", "some embodiments", "one embodiment" and the like mean "one or more (but not all) disclosed embodiments", unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase at least one of a widget, a car and a wheel means either (i) a widget, (ii) a car, (iii) a wheel, (iv) a widget and a car, (v) a widget and a wheel, (vi) a car and a wheel, or (vii) a widget, a car and a wheel.

The phrase "based on" does not mean "based only on", unless expressly specified otherwise. In other words, the phrase "based on" describes both "based only on" and "based at least on".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device or article is described herein, more than one device or article (whether or not they cooperate) may alternatively be used in place of the single device or article that is described. Accordingly, the functionality that is described as being possessed by a device may alternatively be possessed by more than one device or article (whether or not they cooperate).

Similarly, where more than one device or article is described herein (whether or not they cooperate), a single device or article may alternatively be used in place of the more than one device or article that is described. For example, a plurality of computer-based devices may be substituted with a single computer-based device. Accordingly, the various functionality that is described as being possessed by more than one device or article may alternatively be possessed by a single device or article.

The functionality and/or the features of a single device that is described may be alternatively embodied by one or more other devices that are described but are not explicitly described as having such functionality and/or features. Thus, other embodiments need not include the described device itself, but rather can include the one or more other devices which would, in those other embodiments, have such functionality and/or features.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not indicate that all or even any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list “a computer, a laptop, a PDA” does not imply that any or all of the three items of that list are mutually exclusive and does not imply that any or all of the three items of that list are comprehensive of any category.

Headings of sections provided in this patent application and the title of this patent application are for convenience only, and are not to be taken as limiting the disclosure in any way.

“Determining” something can be performed in a variety of manners and therefore the term “determining” (and like terms) includes calculating, computing, deriving, looking up (e.g., in a table, database or data structure), ascertaining and the like.

It will be readily apparent that the various methods and algorithms described herein may be implemented by, e.g., appropriately programmed general purpose computers and computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software A “processor” means any one or more microprocessors, CPU devices, computing devices, microcontrollers, digital signal processors, or like devices.

The term “computer-readable medium” refers to any medium that participates in providing data (e.g., instructions) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth™, TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

The present invention can be configured to work in a network environment including a computer that is in communication, via a communications network, with one or more devices. The computer may communicate with the devices directly or indirectly, via a wired or wireless medium such as the Internet, LAN, WAN or Ethernet, Token Ring, or via any appropriate communications means or combination of communications means. Each of the devices may comprise computers, such as those based on the Intel® Pentium® or Centrino™ processor, that are adapted to communicate with the computer. Any number and type of machines may be in communication with the computer.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

What is claimed is:

1. A method, comprising:

receiving an indication of a price a particular player is willing to pay for flat rate play of a gaming device, wherein flat rate play comprises a player providing a pre-payment of the price in exchange for an interval of play of a wagering game that includes a plurality of discrete intervals that otherwise are separately priced and wherein the price for the flat rate play is less than the player would otherwise pay for the discrete intervals if the player were not providing the prepayment for flat rate play;

determining, by a computing device operable to facilitate a wagering game, a desired profit of the flat rate play of the gaming device;

calculating, by the computing device, in response to the price the particular player is willing to pay and based at least upon the price and the desired profit, a target cost to an operator of the gaming device for the flat rate play of the gaming device;

determining, by the computing device for the particular player a particular flat rate play session with an expected cost substantially equal to the target cost, wherein the flat rate play session is defined by one or more parameters, wherein at least one of the parameters comprises a number of the discrete intervals comprising the flat rate play session, the number being greater than one; and initializing play of the flat rate play session in accordance with the one or more parameters.

2. The method of claim 1, further comprising:

offering the particular flat rate play session to the player; and determining an acceptance of the offer by the player.

3. The method of claim 2, wherein the determining of the acceptance comprises:

receiving an indication of an acceptance of the offer by the player.

4. The method of claim 1, wherein the desired profit comprises at least one of a desired profit margin and a desired profit rate.

5. The method of claim 1, wherein the determining of the flat rate play session comprises:

determining a plurality of flat rate play sessions;

determining an expected cost for each of the plurality of flat rate play sessions; and selecting the flat rate play session with the expected cost most substantially equal to the target cost.

6. The method of claim 1, further comprising:

displaying the one or more parameters that define the particular flat rate play session.

7. The method of claim 1, further comprising:

receiving payment in the amount of the price the player is willing to pay.

8. The method of claim 1, further comprising:

determining the expected cost of the flat rate play session.

9. The method of claim 1, wherein the expected cost of the flat rate play session is determined based on at least one of (i) a simulation, (ii) a mathematical simulation, (iii) a mathematical model, and (iv) a history of flat rate play session costs.

10. The method of claim 1, wherein the one or more parameters comprises at least one of:

(i) an amount wagered;
(ii) a jackpot structure;
(iii) a time of a day;
(iv) a day of a week;
(v) a day of a month;
(vi) a day of a year;
(vii) a week of a month;
(viii) a week of a year;
(ix) a month of a year;
(x) a type of gaming device;
(xi) a player status rating;
(xii) an availability of a gaming device;
(xiii) a forecasted availability of a gaming device;
(xiv) a number of active jackpots;
(xv) a number of winning plays;
(xvi) a time between plays;
(xvii) a traffic of potential players;
(xviii) stakes of play; and
(xix) an external event.

11. The method of claim 1, further comprising:

determining the one or more parameters defining the flat rate play session.

12. An apparatus, comprising:

a processor; and a memory in communication with the processor, the memory storing a program that when executed by the processor results in:

receiving an indication of a price a player is willing to pay for flat rate play of a gaming device, wherein flat rate play comprises a player providing a pre-payment of the price in exchange for an interval of play of a wagering game that includes a plurality of discrete intervals that otherwise are separately priced and wherein the price for the flat rate play is less than the player would otherwise pay for the discrete intervals if the player were not providing the prepayment for flat rate play;

determining a desired profit of the flat rate play of the gaming device;

calculating, in response to receiving the indication of the price the player is willing to pay and based at least upon the price and the desired profit, a target cost to an operator of the gaming device for the flat rate play of the gaming device;

determining for the particular player a particular flat rate play session with an expected cost substantially equal to the target cost, wherein the flat rate play session is defined by one or more parameters, wherein at least one of the parameters comprises a number of the discrete intervals comprising the flat rate play session, the number being greater than one; and initializing play of the flat rate play session in accordance with the one or more parameters.

13. The apparatus of claim 12, further comprising:

an input device to receive the indication of the price from the player.

14. A method, comprising:

determining, by a computing device operable to facilitate a wagering game, a price a player is willing to pay for flat rate play of a gaming device, wherein flat rate play comprises a player providing a pre-payment of the price in exchange for an interval of play of a wagering game that includes a plurality of discrete intervals that otherwise are separately priced and wherein the price for the flat rate play is less than the player would otherwise pay for the discrete intervals if the player were not providing the prepayment for flat rate play;

determining, by the computing device, in response to determining the price is willing to pay and based on the price the player is willing to pay, one or more parameters that define a particular flat rate play session with a retail price substantially equal to the price the player is willing to pay, wherein at least one of the parameters comprises a number of the discrete intervals comprising the flat rate play session, the number being greater than one; and initializing for the player play of the particular flat rate play session in accordance with the one or more parameters.

15. The method of claim 14, wherein the determining of the one or more parameters comprises:

determining a target cost for the flat rate play of the gaming device; and selecting values for the one or more parameters that define the flat rate play session to have an expected cost substantially equal to the target cost.

16. The method of claim 14, wherein the flat rate play session comprises a plurality of flat rate play sessions having retail prices substantially equal to the price the player is willing to pay, further comprising:

selecting one of the plurality of flat rate play sessions.

17. The method of claim 16, wherein the selected flat rate play session is a flat rate play session from the plurality of flat rate play sessions that has a retail price most substantially equal to the price the player is willing to pay.

18. The method of claim 14, wherein the flat rate play session comprises a plurality of flat rate play sessions having retail prices substantially equal to the price the player is willing to pay, further comprising:

providing a menu of the plurality of flat rate play sessions to the player.

19. The method of claim 18, further comprising:

receiving an indication of a menu selection made by the player.

20. The method of claim 14, wherein the price the player is willing to pay comprises a balance of credits associated with the player.

* * * * *